US009141870B2

(12) United States Patent
Fukata et al.

(10) Patent No.: US 9,141,870 B2
(45) Date of Patent: Sep. 22, 2015

(54) THREE-DIMENSIONAL OBJECT DETECTION DEVICE AND THREE-DIMENSIONAL OBJECT DETECTION METHOD

(71) Applicant: Nissan Motor Co., Ltd., Yokohama-shi, Kanagawa (JP)

(72) Inventors: Osamu Fukata, Commerce Township, MI (US); Yasuhisa Hayakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/385,540

(22) PCT Filed: Feb. 25, 2013

(86) PCT No.: PCT/JP2013/054765
§ 371 (c)(1),
(2) Date: Sep. 16, 2014

(87) PCT Pub. No.: WO2013/157301
PCT Pub. Date: Oct. 24, 2013

(65) Prior Publication Data
US 2015/0071490 A1   Mar. 12, 2015

(30) Foreign Application Priority Data
Apr. 16, 2012 (JP) ................................. 2012-092912

(51) Int. Cl.
*G06K 9/46* (2006.01)
*G06K 9/00* (2006.01)
(Continued)

(52) U.S. Cl.
CPC .............. *G06K 9/46* (2013.01); *G06K 9/00791* (2013.01); *G08G 1/165* (2013.01); *G08G 1/166* (2013.01); *H04N 7/18* (2013.01)

(58) Field of Classification Search
CPC ...................................................... G06K 9/46
USPC ....................................................... 382/103
See application file for complete search history.

(56) References Cited

U.S. PATENT DOCUMENTS 6,411,898 B2 * 6/2002 Ishida et al. ................... 701/428
6,923,080 B1 * 8/2005 Dobler et al. ................ 73/866.1
(Continued)

FOREIGN PATENT DOCUMENTS

EP        2400315 A1   12/2011
JP     2007-219393 A    8/2007
(Continued)

OTHER PUBLICATIONS

Chin-Teng Lin et al, Construction of Fisheye Lens Inverse Perspective Mapping Model and Its Applications of Obstacle Detection, EURASIP Journal on Advances in Signal Processing, Jul. 6, 2010, vol. 2010, Hindawi Publishing Corporation.

*Primary Examiner* — Nirav G Patel
*Assistant Examiner* — Delomia Gilliard
(74) *Attorney, Agent, or Firm* — Global IP Counselors, LLP

(57) ABSTRACT

A three-dimensional object detection device includes an image capturing unit, an image conversion unit, a three-dimensional object detection unit, a three-dimensional object assessment unit and a control unit. The image conversion unit converts images obtained by the image capturing unit to create bird's-eye view images. The three-dimensional object detection unit detects a presence of a three-dimensional object within a detection area based on differential waveform information or edge information. The stationary three-dimensional object assessment unit assesses whether the detected three-dimensional object is a shadow of a tree along a road traveled by the host vehicle. The three-dimensional object assessment unit assesses whether the three-dimensional object detected is a vehicle within the detection area. The control unit suppresses the assessment that the three-dimensional object is a vehicle when the detected three-dimensional object was determined to be a shadow of a tree along the road traveled by the host vehicle.

16 Claims, 36 Drawing Sheets

(51) Int. Cl.
  *G08G 1/16* (2006.01)
  *H04N 7/18* (2006.01)

(56) References Cited

U.S. PATENT DOCUMENTS

| | | | |
|---|---|---|---|
| 7,365,653 B2 * | 4/2008 | Yang et al. ............... | 340/988 |
| 8,903,133 B2 * | 12/2014 | Tsuchiya et al. .......... | 382/104 |
| 2009/0268027 A1 | 10/2009 | Yang | |
| 2010/0149333 A1 | 6/2010 | Yang | |
| 2013/0141542 A1 | 6/2013 | Tsuchiya et al. | |
| 2013/0322688 A1 | 12/2013 | Tsuchiya et al. | |
| 2014/0168440 A1 | 6/2014 | Tsuchiya et al. | |

FOREIGN PATENT DOCUMENTS

| | | |
|---|---|---|
| JP | 2008-158958 A | 7/2008 |
| JP | 2008-219063 A | 9/2008 |
| JP | 2008-227646 A | 9/2008 |
| JP | 2009-265783 A | 11/2009 |
| JP | 2010-533282 A | 10/2010 |
| WO | 2012/023412 A1 | 2/2012 |
| WO | 2012/115009 A1 | 8/2012 |

* cited by examiner

| H3 | PERIODICITY | IRREGULARITY |
|---|---|---|
| TREE SHADOWS Q1 | RELATIVELY HIGH (COMPARED WITH VX) | RELATIVELY HIGH (COMPARED WITH VX) |
| OTHER VEHICLE VX | RELATIVELY LOW (COMPARED WITH Q1) | RELATIVELY LOW (COMPARED WITH Q1) |

|  | PERIODICITY EVALUATION VALUE | IRREGULARITY EVALUATION VALUE |
|---|---|---|
| GUARD RAILS, STRUCTURES Q2 | HIGH | LOW |
| | 2ND PERIODICITY EVALUATION THRESHOLD VALUE | |
| TREE SHADOWS Q1 | INTERMEDIATE | INTERMEDIATE |
| | | IRREGULARITY EVALUATION THRESHOLD VALUE |
| GRASS, SNOW Q3 | LOW | HIGH |
| | 1ST PERIODICITY EVALUATION THRESHOLD VALUE | |
| OTHER VEHICLE VX | LOW | LOW |

FIG. 23

THREE-DIMENSIONAL OBJECT DETECTION DEVICE AND THREE-DIMENSIONAL OBJECT DETECTION METHOD

CROSS-REFERENCE TO RELATED APPLICATIONS

This application is a U.S. National stage application of International Application No. PCT/JP2013/054765, filed Feb. 25, 2013, which claims priority to Japanese Patent Application No. 2012-092912 filed in Japan on Apr. 16, 2012. The entire disclosure of Japanese Patent Application No. 2012-037472 is hereby incorporated herein by reference.

BACKGROUND

1. Field of the Invention

The present invention relates to a three-dimensional object detection device and a three-dimensional object detection method.

2. Background Information

In the past, detection devices have been known in which a camera for capturing images in a vehicle-lateral direction is provided, and images captured by the camera are matched with patterns stored in advance, whereby plants and other three-dimensional objects outside of the road are detected (see Japanese Laid-Open Patent Application No. 2008-227646).

SUMMARY

However, images of the shadows of trees having trunks with regular shapes and leaves with changing shapes, such as are seen on tree-lined roadways, have periodicity and irregularity, and consequently problems arise in that it is difficult to uniformly ascertain features of the image, and it is difficult to differentiate figures of the shadows of trees from captured images including the figures of various three-dimensional objects.

The problem to be solved by the present invention is to provide a three-dimensional object detection device that prevents the erroneous detection of shadows of trees having periodicity and irregularity as other vehicles traveling in lanes adjacent to the lane of travel of a host vehicle, and that is capable of detecting other vehicles traveling in adjacent lanes with high precision.

The present invention solves the problem by calculating a periodicity evaluation value for evaluating periodicity and an irregularity evaluation value for evaluating irregularity based on differential waveform information or edge information of a captured image, and determining that a detected three-dimensional object is the shadows of trees present along the road being traveled by a host vehicle when the calculated periodicity evaluation value is equal to or greater than a first periodicity evaluation threshold value but less than a second periodicity evaluation threshold value, and the calculated irregularity evaluation value is less than a predetermined irregularity evaluation threshold value.

According to the present invention, it is possible to differentiate the inclusion of shadows of trees having periodicity and irregularity in the image information when a periodicity evaluation value calculated from differential waveform information or edge information calculated from a captured image is within a predetermined value range, and an irregularity evaluation value calculated from the same differential waveform information or edge information is equal to or greater than a predetermined threshold value. It is therefore possible to prevent the erroneous detection of the shadows of trees present along the road traveled by the vehicle as another vehicle traveling in an adjacent lane adjacent to the lane of travel of the host vehicle. As a result, it is possible to provide a three-dimensional object detection device for detecting another vehicle traveling in an adjacent lane adjacent to the lane of travel of the host vehicle with high precision.

BRIEF DESCRIPTION OF THE DRAWINGS

Referring now to the attached drawings which form a part of this original disclosure.

FIG. 23 is a table illustrating one example of the relationship between the periodicity evaluation value and irregularity evaluation value for each object to be detected.

DETAILED DESCRIPTION OF THE EMBODIMENTS

Figure 1:
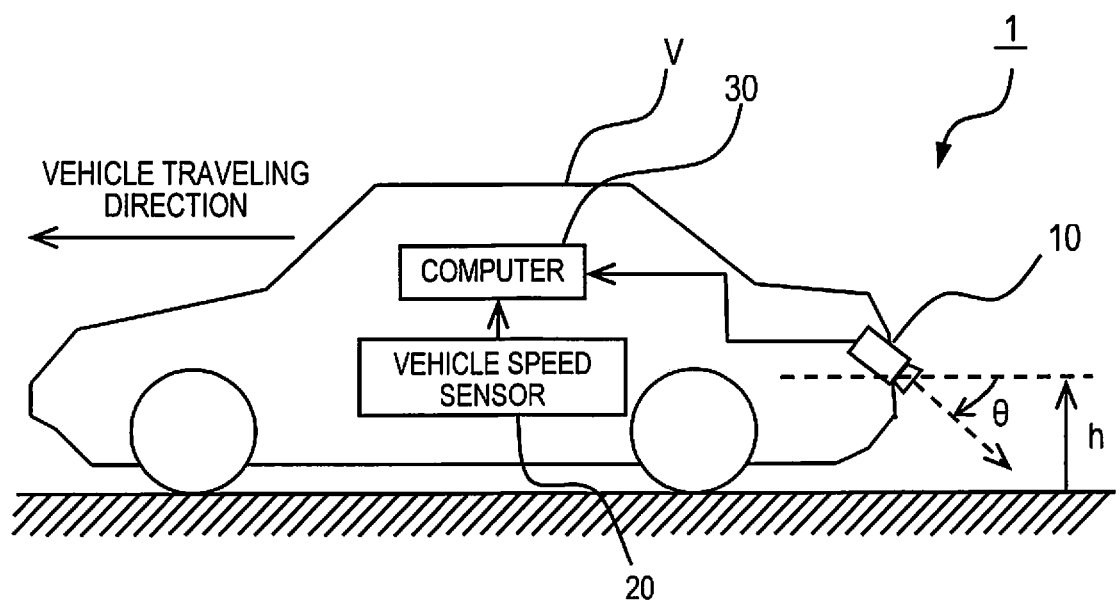
FIG. 1 is a schematic structural diagram of a vehicle pertaining to an embodiment of the invention to which the three-dimensional object detection device of the present invention is applied.

FIG. 1 is a schematic structural diagram of a vehicle pertaining to an embodiment of the invention to which the three-dimensional object detection device 1 of the present invention is applied. The three-dimensional object detection device 1 of the present example is a device for detecting another vehicle to which the driver of the host vehicle V must pay focus, e.g., another vehicle with which contact is possible should the host vehicle V change lanes, as an obstacle. In particular, the three-dimensional object detection device 1 of the present example detects another vehicle traveling in an adjacent lane adjacent to the lane in which the host vehicle is traveling (hereinbelow be referred to simply as "adjacent lane"). The three-dimensional object detection device 1 of the present example can calculate the travel distance and travel speed of another vehicle that has been detected. Accordingly, one example described below is an example in which the three-dimensional object detection device 1 is mounted on the host vehicle V, and detects another vehicle traveling in an adjacent lane adjacent to the lane in which the host vehicle V is traveling from among three-dimensional objects detected in the surroundings of the host vehicle V. As illustrated in the drawing, the three-dimensional object detection device 1 of the present example is provided with a camera 10, a vehicle speed sensor 20, a computer 30, a brightness sensor 50, and a current position detection device 60.

The camera 10 is attached to the host vehicle V so that the optical axis is an angle θ downward from the horizontal in a location at a height h at the rear of the host vehicle V, as illustrated in FIG. 1. From this position, the camera 10 captures a predetermined area of the surrounding environment of the host vehicle V. In this embodiment, a single camera 1 is provided to detect three-dimensional objects rearward of the host vehicle V, but other cameras for acquiring images of, e.g., the surroundings of the vehicle can be provided for other applications. The speed sensor 20 detects the travel speed of the host vehicle V and calculates the vehicle speed from a wheel speed detected by, e.g., a wheel speed sensor for detecting the rotational speed of a wheel. The computer 30 detects a three-dimensional object rearward of the vehicle, and in the present example calculates the travel distance and travel speed of the three-dimensional object. The brightness sensor 50 detects the brightness of the surroundings of the host vehicle V. The brightness sensor 50 may be configured using an illuminometer, or may be configured to enable acquisition of brightness information from the image information of the camera 10. Rather than directly detecting brightness, the brightness sensor 50 can reference almanac information associated with geographic location and sunrise/sunset times and detect the current brightness of the surroundings of the host vehicle V based on the current position and time. The current position detection device 60 can acquire position information from a navigation device of the host vehicle V provided with a GPS function or a portable navigation device incorporating a GPS function.

Figure 2:
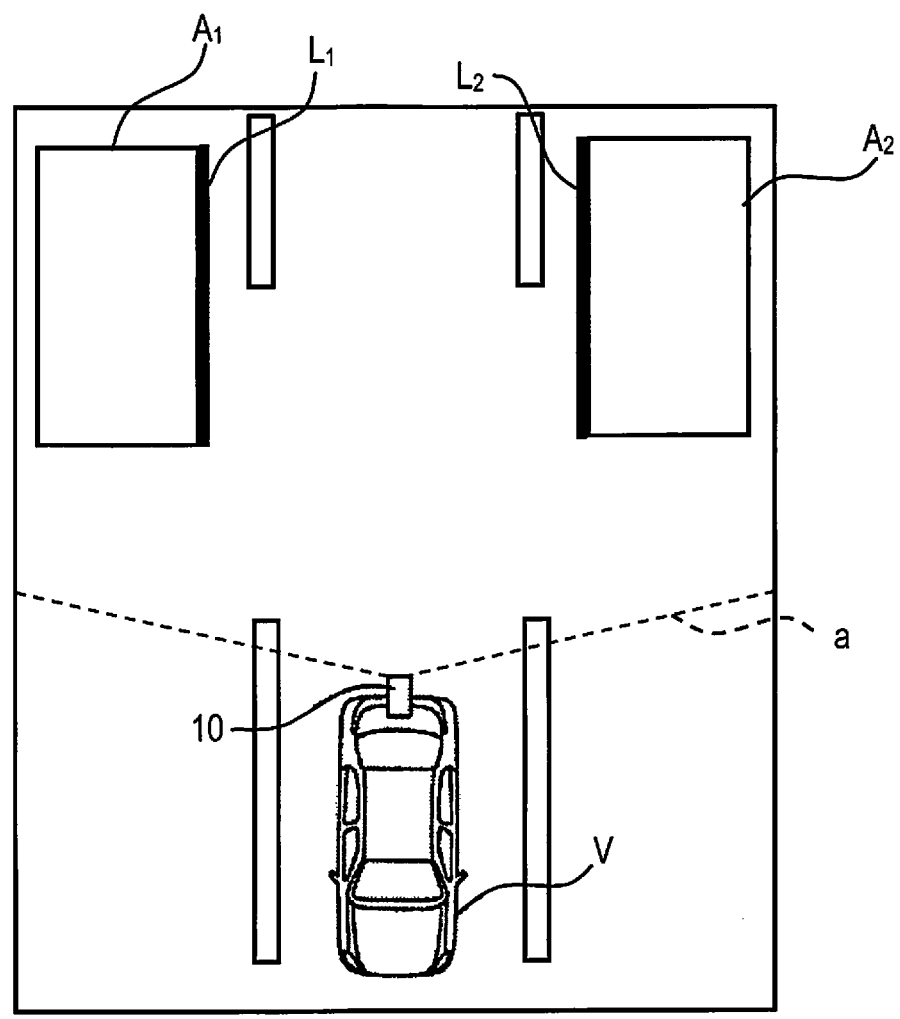
FIG. 2 is a plan view (three-dimensional object detection using differential waveform information) illustrating a travel state of the vehicle.

FIG. 2 is a plan view illustrating a state of travel of the host vehicle V in FIG. 1. As illustrated in the drawing, the camera 10 captures the rearward side of the vehicle at a predetermined view angle a. At this time, the view angle "a" of the camera 10 is set to a view angle that allows the left and right lanes to be captured in addition to the lane in which the host vehicle V is traveling. The area that can be captured is rearward of the host vehicle V, and includes the areas A1, A2 to be detected in the adjacent lanes that are right- and left-adjacent to the lane of travel of the host vehicle V.

Figure 3:
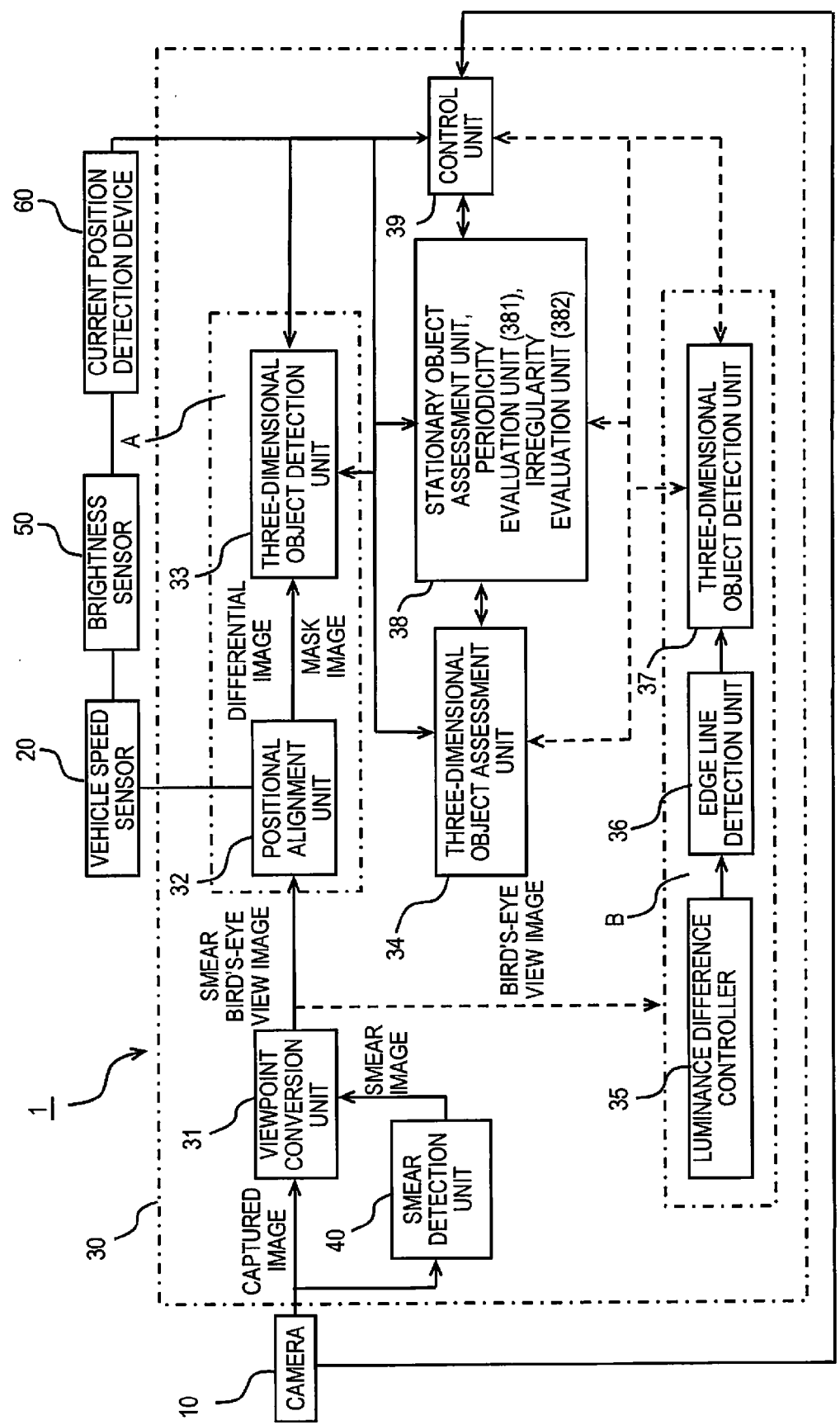
FIG. 3 is a block diagram illustrating details of the computer in FIG. 1.

FIG. 3 is a block diagram illustrating the details of the computer 30 in FIG. 1. The camera 10, the speed sensor 20, the brightness sensor 50, and the current position detection device 60 are also illustrated in FIG. 3 in order to distinctly indicate connection relationships.

As illustrated in FIG. 3, the computer 30 is provided with a viewpoint conversion unit 31, a positional alignment unit 32, a three-dimensional object detection unit 33, a three-dimensional object assessment unit 34, and a smear detection unit 40. The computer 30 in the present embodiment has a configuration relating to a block for detection of three-dimensional objects using differential waveform information. The computer 30 in the present embodiment can also have a configuration relating to a block for detection of three-dimensional objects using edge information. In this case, in the configuration illustrated in FIG. 3, the block configuration A including the positional alignment unit 32 and the three-dimensional object detection unit 33 can be replaced by a block configuration B surrounded by a dashed line and including a luminance difference calculation unit 35, an edge line detection unit 36, and a three-dimensional object detection unit 37. Of course, both the block configuration A and the block configuration B can be provided, such that three-dimensional object detection using differential waveform information can be performed, and three-dimensional object detection using edge information can also be performed. When both the block configuration A and the block configuration B are provided, either the block configuration A or the block configuration B can be operated according to, e.g., brightness or other environment factors. Each of the configurations is described below.

Three-Dimensional Object Detection Using Differential Waveform Information

The three-dimensional object detection device 1 of the present embodiment detects a three-dimensional object present in the detection area A1 in the right-side adjacent lane or in the detection area A2 in the left-side adjacent lane, rearward of the vehicle, based on image information obtained by the monocular camera 1 for capturing an image of the rear of the vehicle. The three-dimensional object assessment unit 34 sets the detection areas A1, A2 on the right side and left side, respectively, rearward of the host vehicle V, which are included in captured image information. No limitation in particular is imposed on the positions of the detection areas A1, A2, and the detection areas can be set appropriately according to processing conditions.

The viewpoint conversion unit is described next. The viewpoint conversion unit 31 inputs captured image data from a predetermined area obtained by capturing by the camera 10, and performs viewpoint conversion of the inputted captured-image data into bird's-eye view image data, which is in a bird's-eye view state. A bird's-eye view state is a state of viewing from a viewpoint of an imaginary camera that is looking down from above, e.g., vertically downward. The viewpoint conversion can be carried out in the manner described in, e.g., Japanese Laid-Open Patent Application No. 2008-219063. The reason that captured image data is converted to bird's-eye view image data is based on the principle that perpendicular edges unique to a three-dimensional object are converted to a straight-line group that passes through a specific fixed point by viewpoint conversion to bird's-eye view image data, and utilizing this principle allows a planar object and a three-dimensional object to be differentiated. The results of image conversion processing by the viewpoint conversion unit 31 are used in detection of three-dimensional objects using edge information, described below.

Figure 4:
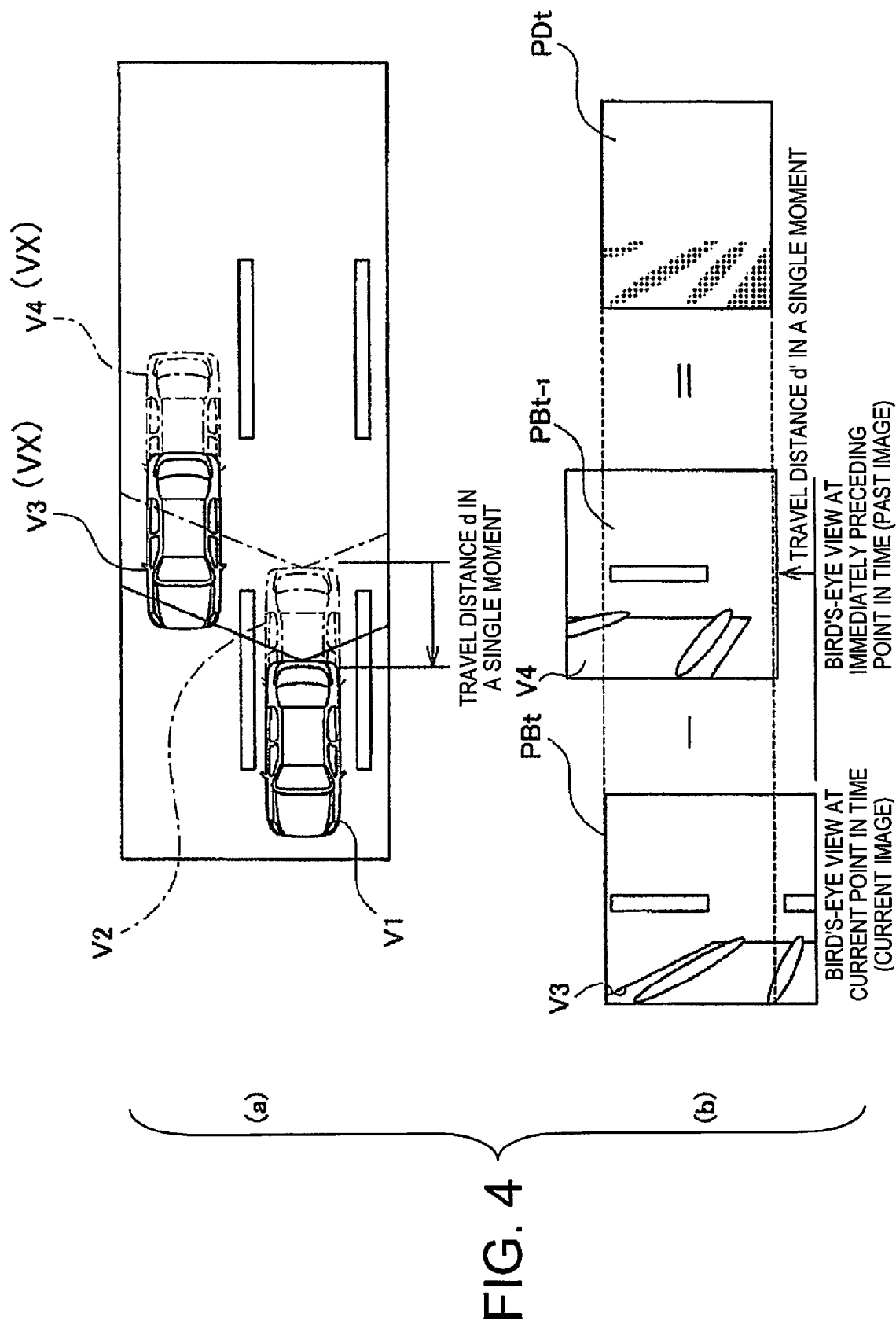
FIG. 4 is a view for describing the general overview of the processing of the positional alignment unit in FIG. 3, with part (a) illustrating the state of movement of the vehicle from a top plan view, and part (b) illustrating a general overview of alignment.

The bird's-eye view image data obtained by viewpoint conversion carried out by the viewpoint conversion unit 31 is sequentially inputted to the positional alignment unit 32, and the inputted positions of the bird's-eye view image data at different times are aligned. FIG. 4 is a view for describing the general overview of the processing of the positional alignment unit 32, with part (a) illustrating the movement state of the host vehicle V from a top plan view, and part (b) illustrating a general overview of alignment.

As illustrated in part (a) of FIG. 4, the host vehicle V at the current moment is positioned at V1, and the host vehicle V at a single moment prior is positioned at V2. It is assumed that another vehicle VX is positioned in the rear-side direction of the host vehicle V and is traveling parallel to the host vehicle V, and that the other vehicle VX at the current moment is positioned at V3, and that the other vehicle VX at a single moment prior was positioned at V4. Also, it is assumed that the host vehicle V has moved a distance d in a single moment. The phrase "at a single moment prior" may be a moment in the past by a time set in advance (e.g., a single control cycle) from the current moment, or may be a moment in the past by an arbitrary time.

In such a state, a bird's-eye view image $PB_t$ at the current moment is illustrated in part (b) of FIG. 4. The white lines drawn on the road surface are rectangular in this bird's-eye view image PBt and are relatively accurate in a planar view, but the other vehicle VX at position V3 is collapsed. The same applies to the bird's-eye view image $PB_{t-1}$ at a single moment prior; the white lines drawn on the road surface are rectangular and are relatively accurate in a planar view, but the other vehicle VX at position V4 is collapsed. As previously described, perpendicular edges of a three-dimensional object (edges that stand erect in three-dimensional space from the road surface are also included in a strict meaning of perpendicular edge) appear as a straight-line group along a collapsing direction due to the processing for converting the viewpoint to bird's-eye view image data, but because a planar image on the road surface does not include perpendicular edges, such collapsing does not occur even when the viewpoint has been converted.

The positional alignment unit 32 aligns the bird's-eye view images PBt, PBt–1, such as those described above, in terms of data. When this is carried out, the positional alignment unit 32 offsets the bird's-eye view image PBt–1 at a single moment prior, and matches the position with the bird's-eye view image PBt at the current moment. The left-side image and the center image in part (b) of FIG. 4 illustrate the offset state by a travel distance d'. The offset amount d' is the amount of movement in the bird's-eye view image data that corresponds to the actual travel distance d of the host vehicle V illustrated in part (a) of FIG. 4, and is decided based on a signal from the speed sensor 20 and the time from a single moment prior to the current moment.

After alignment, the positional alignment unit 32 takes the difference between the bird's-eye view images $PB_t$ and $PB_{t-1}$ and generates data for a differential image $PD_t$. The pixel values of the differential image $PD_t$ may be the absolute values of the differences in the pixel values of the bird's-eye view images $PB_t$ and $PB_{t-1}$, or, in order to correspond to changes in the illumination environment, may be such that when the absolute value exceeds a predetermined threshold value p the value is "1," and otherwise the value is "0." The image on the right side in part (b) of FIG. 4 is a differential image $PD_t$.

Returning to FIG. 3, the three-dimensional object detection unit 33 detects a three-dimensional object based on data of the differential image $PD_t$ data illustrated in part (b) of FIG. 4. In this case, the three-dimensional object detection unit 33 of the present example also calculates the travel distance of the three-dimensional object in real space. The three-dimensional object detection unit 33 first generates a differential waveform when the three-dimensional object is detected and the travel distance is to be calculated. The travel distance per unit time of the three-dimensional object is used in calculating the travel speed of the three-dimensional object. The travel speed of the three-dimensional object can be used to determine whether the three-dimensional object is a vehicle.

In generating the differential waveform, the three-dimensional object detection unit 33 in the present embodiment sets a detection area in the differential image $PD_t$. The three-dimensional object detection device 1 of the present example detects, as an object for detection, another vehicle to which the driver pays focus, particularly another vehicle traveling in a lane adjacent to the lane in which the host vehicle V is traveling and with which contact is possible should the host vehicle V change lanes. Accordingly, in the present example of detecting a three-dimensional object based on image information, two detection areas on the right side and on the left side of the host vehicle V are set in an image obtained by the camera 10. Specifically, in the present embodiment, rectangular detection areas A1, A2 are set on the left side and on the right side rearward of the host vehicle V, as illustrated in FIG. 2. Another vehicle detected in the detection areas A1, A2 is detected as an obstacle traveling in an adjacent lane adjacent to the lane in which the host vehicle V is traveling. Such detection areas A1, A2 may be set from positions relative to the host vehicle V, or may be set with the positions of white lines as reference. When setting is with reference to the positions of white lines, the three-dimensional object detection device 1 may use, e.g., an existing white line recognition technique or the like.

The three-dimensional object detection unit 33 recognizes as ground lines L1, L2 the borders of the detection areas A1, A2 thus set, on the host vehicle V side (borders along the traveling direction) (FIG. 2). Generally, a ground line refers to a line in which a three-dimensional object is in contact with the ground, but in the present embodiment, a ground line is not a line in contact with the ground, but is rather set in the manner described above. Even in such a case, the difference between the ground line according to the present embodiment and the normal ground line determined from the position of the other vehicle VX is not exceedingly great as determined by experience, and there is no problem in actuality.

Figure 5:
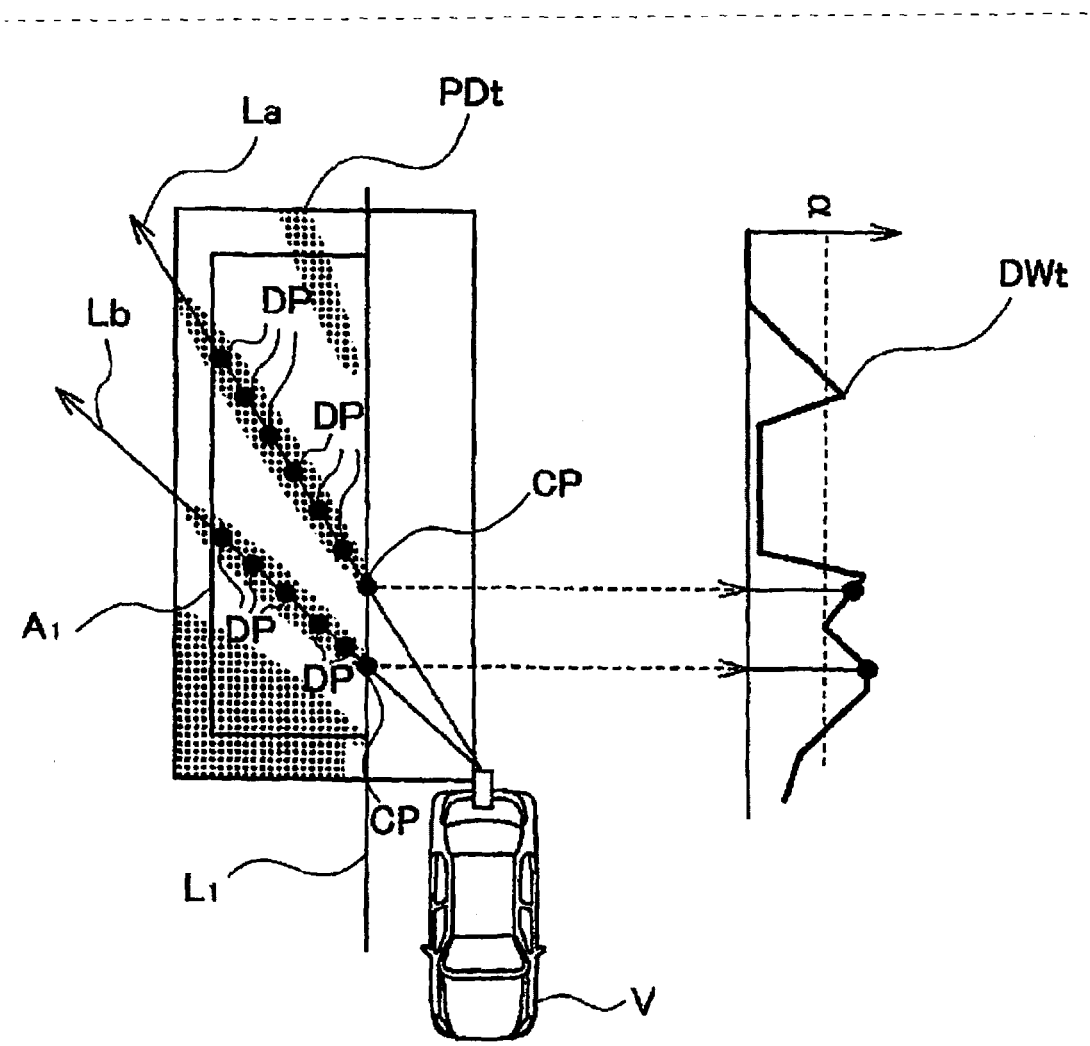
FIG. 5 is a schematic view illustrating the manner in which the differential waveform is generated by the three-dimensional object detection unit in FIG. 3.

FIG. 5 is a schematic view illustrating the manner in which the differential waveform is generated by the three-dimensional object detection unit 33. As illustrated in FIG. 5, the three-dimensional object detection unit 33 generates a differential waveform $DW_t$ from the portion that corresponds to the detection areas A1, A2 in the differential image $PD_t$ (drawing on the right in part (b) of FIG. 4) calculated by the positional alignment unit 32. In this case, the three-dimensional object detection unit 33 generates the differential waveform $DW_t$ along the collapsing direction of the three-dimensional object by viewpoint conversion. In the example illustrated in FIG. 5, only the detection area A1 will be described for the sake of convenience, but the differential waveform $DW_t$ is generated for the detection area A2 as well using the a similar procedure.

More specifically, the three-dimensional object detection unit 33 defines a line La in the direction in which the three-dimensional object collapses in the differential image $DW_t$ data. The three-dimensional object detection unit 33 then counts the number of difference pixels DP indicating a predetermined difference on the line La. When the pixel values of the differential image $DW_t$ are the result of taking the absolute values of the differences of pixel values for the bird's-eye view images $PB_t$, $PB_{t-1}$, the difference pixels DP indicating a predetermined difference are pixels having values exceeding the predetermined threshold value, and when the pixel values of the difference pixels $DW_t$ are represented by "0" and "1," the difference pixels DP are pixels indicating the value "1."

The three-dimensional object detection unit 33 counts the number of difference pixels DP, and thereafter determines the crossing point CP of the line La and the ground line L1. The three-dimensional object detection unit 33 then correlates the crossing point CP and the count number, decides horizontal-axis position, i.e., the position on the axis in the vertical direction in the drawing on the right in FIG. 5, based on the position of the crossing point CP, decides the vertical-axis position, i.e., the position on the axis in the lateral direction in the drawing on the right in FIG. 5, from the count number, and plots the positions as the count number at the crossing point CP.

Similarly, the three-dimensional object detection unit 33 defines the lines Lb, Lc, . . . in the direction in which the three-dimensional object collapses, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution and thereby generate a differential waveform $DW_t$ as illustrated in the drawing on the right in FIG. 5.

The lines La and Lb in the direction in which the three-dimensional object collapses have different distances that overlap the detection area A1, as illustrated in the drawing on the left in FIG. 5. Accordingly, the number of difference pixels DP is greater on the line La than on the line Lb when it is assumed that the detection area A1 is filled with the difference pixels DP. For this reason, the three-dimensional object detection unit 33 performs normalization based on the distance that the lines La, Lb in the direction in which the three-dimensional object collapses and the detection area A1 overlap when the vertical-axis position is decided from the count number of the difference pixels DP. In a specific example, there are six difference pixels DP on the line La and there are five difference pixels DP on the line Lb in the drawing on the left in FIG. 5. Accordingly, when the vertical-axis position is decided from the count number in FIG. 5, the three-dimensional object detection unit 33 divides the count number by the overlapping distance or performs normalization in another manner. The values of the differential waveform $DW_t$ that correspond to the lines La, Lb in the direction in which the three-dimensional object collapses are thereby made substantially the same.

After generation of the differential waveform $DW_t$, the three-dimensional object detection unit 33 calculates the travel distance by comparison with the differential waveform $DW_{t-1}$ for the moment prior. That is, the three-dimensional object detection unit 33 calculates the travel distance from the change over time in the differential waveforms $DW_t$, $DW_{t-1}$.

Figure 6:
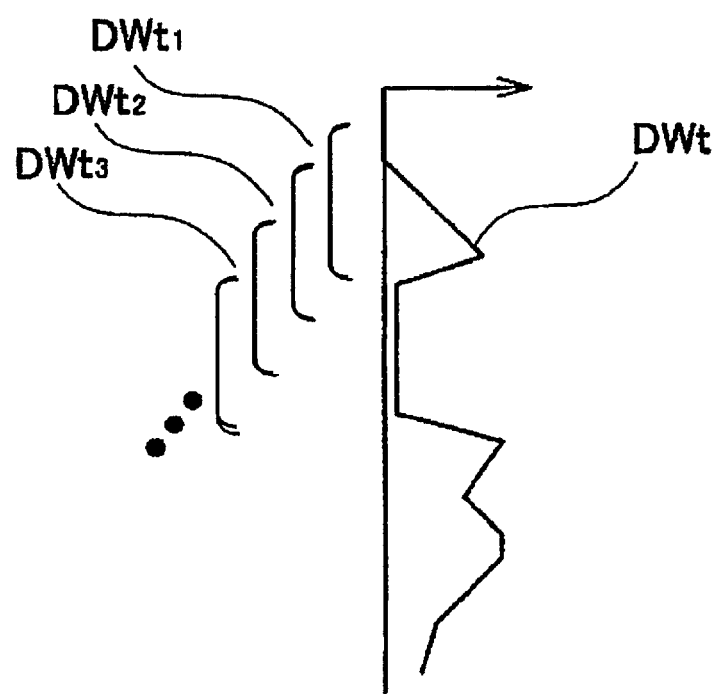
FIG. 6 is a view illustrating small areas divided by the three-dimensional object detection unit in FIG. 3.

More specifically, the three-dimensional object detection unit 33 divides the differential waveform $DW_t$ into a plurality of small areas $DW_{t1}$ to $DW_{tn}$ (where n is an arbitrary integer of 2 or greater), as illustrated in FIG. 6. FIG. 6 is a view illustrating the small areas $DW_{t1}$ to $DW_{tn}$ divided by the three-dimensional object detection unit 33. The small areas $DW_{t1}$ to $DW_{tn}$ are divided so as to be mutually overlapping, as illustrated in, e.g., FIG. 13. For example, the small area $DW_{t1}$ and the small area $DW_{t2}$ overlap each other, and the small area $DW_{t2}$ and the small area $DW_{t3}$ overlap each other.

Next, the three-dimensional object detection unit 33 determines the offset amount (the amount of movement in the horizontal-axis direction (vertical direction in FIG. 6) of the differential waveform) for each of the small areas $DW_{t1}$ to $DW_{tn}$. Here, the offset amount is determined from the difference (distance in the horizontal-axis direction) between the differential waveform $DW_{t-1}$ at a single moment prior and the differential waveform $DW_t$ at the current moment. In this case, the three-dimensional object detection unit 33 moves the differential waveform $DW_{t-1}$ at a single moment prior in the horizontal-axis direction for each of the small areas $DW_{t1}$ to $DW_{tn}$, and thereupon assesses the position (the position in the horizontal-axis direction) in which the error from the differential waveform $DW_t$ at the current moment is at a minimum, and determines as the offset amount the movement amount in the horizontal-axis direction at the position in which the error from the original position of the differential waveform $DW_{t-1}$ is at a minimum. The three-dimensional object detection unit 33 then counts the offset amount determined for each of the small areas $DW_{t1}$ to $DW_{tn}$ and forms a histogram.

Figure 7:
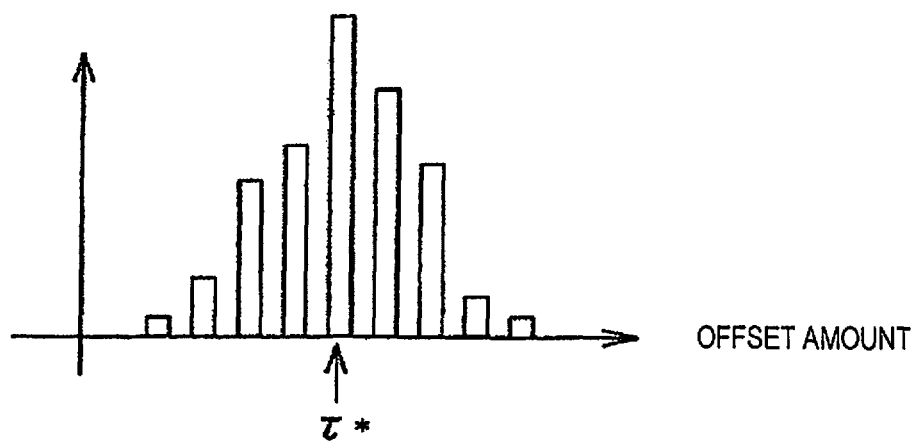
FIG. 7 is a view illustrating one example of a histogram obtained by the three-dimensional object detection unit in FIG. 3.

FIG. 7 is a view illustrating an example of the histogram obtained by the three-dimensional object detection unit 33. As illustrated in FIG. 7, some amount of variability occurs in the offset amount, which is the travel distance in which the error between the small areas $DW_{t1}$ to $DW_{tn}$ and the differential waveform $DW_{t-1}$ at a single moment prior is at a minimum. Accordingly, the three-dimensional object detection unit 33 forms the offset amounts including the variability into a histogram and calculates the travel distance from the histogram. At this point, the three-dimensional object detection unit 33 calculates the travel distance of the three-dimensional object from the local maximum value in the histogram. In other words, in the example illustrated in FIG. 7, the three-dimensional object detection unit 33 calculates the offset amount indicating the local maximum value of the histogram as the travel distance $\tau^*$. In this manner, in the present embodiment, a more highly accurate travel distance can be calculated from the local maximum value, even when there is variability in the offset amount. The travel distance $\tau^*$ is the relative travel distance of the other vehicle VX in relation to the host vehicle V. Accordingly, the three-dimensional object detection unit 33 calculates the absolute travel distance based on the travel distance $\tau^*$ thus obtained and the speed sensor 20 when the absolute travel distance is to be calculated.

Figure 8:
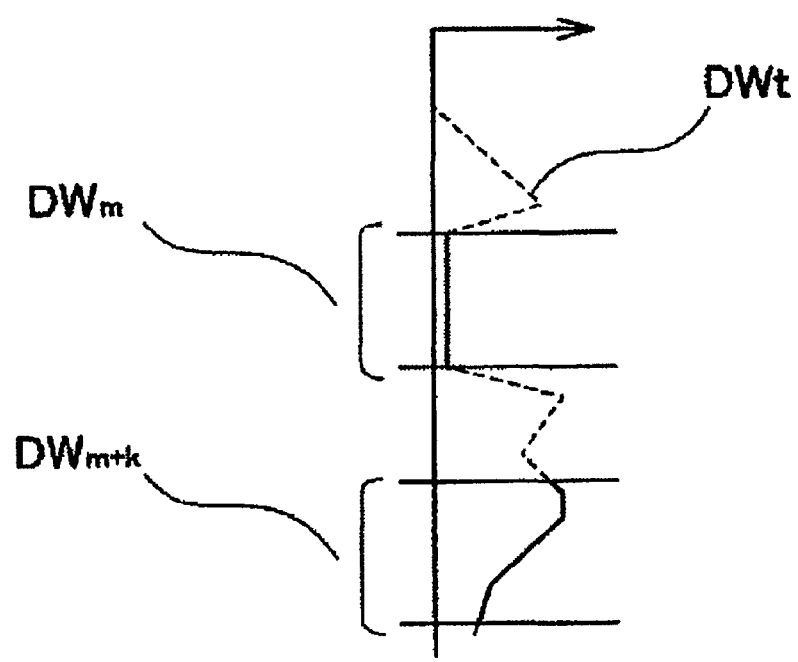
FIG. 8 is a view illustrating weighting by the three-dimensional object detection unit in FIG. 3.

When a histogram is to be formed, the three-dimensional object detection unit 33 may impart a weighting to the plurality of small areas $DW_{t1}$ to $DW_{tn}$, and count the offset amounts determined for each of the small areas $DW_{t1}$ to $DW_{tn}$ in accordance with the weighting to form a histogram. FIG. 8 is a view illustrating the weighting used by the three-dimensional object detection unit 33.

As illustrated in FIG. 8, a small area $DW_m$ (where m is an integer 1 or greater and n−1 or less) is flat. In other words, in the small area $DW_m$, there is little difference between the maximum and minimum values of the count of number of pixels indicating a predetermined difference. The three-dimensional object detection unit 33 reduces the weighting of this type of small area $DW_m$. This is because the flat small area $DW_m$ lacks a characteristic and there is a high possibility that an error will be magnified when the offset amount is calculated.

On the other hand, a small area $DW_{m+k}$ (where k is an integer n−m or less) has abundant undulation. In other words, in the small area $DW_{m+k}$, there is considerable difference between the maximum and minimum values of the count of number of pixels indicating a predetermined difference. The three-dimensional object detection unit 33 increases the weighting of this type of small area $DW_{m+k}$. This is because the small area $DW_{m+k}$ abundant in undulation is characteristic and there is a high possibility that the offset amount will be accurately calculated. Weighting the small areas in this manner makes it possible to enhance the precision for calculating the travel distance.

The differential waveform $DW_t$ is divided into a plurality of small areas $DW_{t1}$ to $DW_{tn}$ in the present embodiment in order to enhance the precision for calculating the travel distance, but division into the small areas $DW_{t1}$ to $DW_{tn}$ is not required when the precision for calculating travel distance is not so needed. In this case, the three-dimensional object detection unit 33 calculates the travel distance from the offset amount of the differential waveform $DW_t$ when the error between the differential waveform $DW_t$ and the differential waveform $DW_{t-1}$ is at a minimum. In other words, the method for determining the offset amount between the differential waveform $DW_{t-1}$ at a single moment prior and the differential waveform $DW_t$ at the current moment is not limited to the details described above.

Returning to FIG. 3, the computer 30 is provided with a smear detection unit 40. The smear detection unit 40 detects smear occurrence areas from captured image data obtained by capturing by the camera 10. Smear is a blown-out highlight phenomenon occurring in CCD image sensors and the like, and therefore when a camera 10 using a CMOS image sensor or the like in which smear does not occur is used, the smear detection 40 may be omitted.

Figure 9:
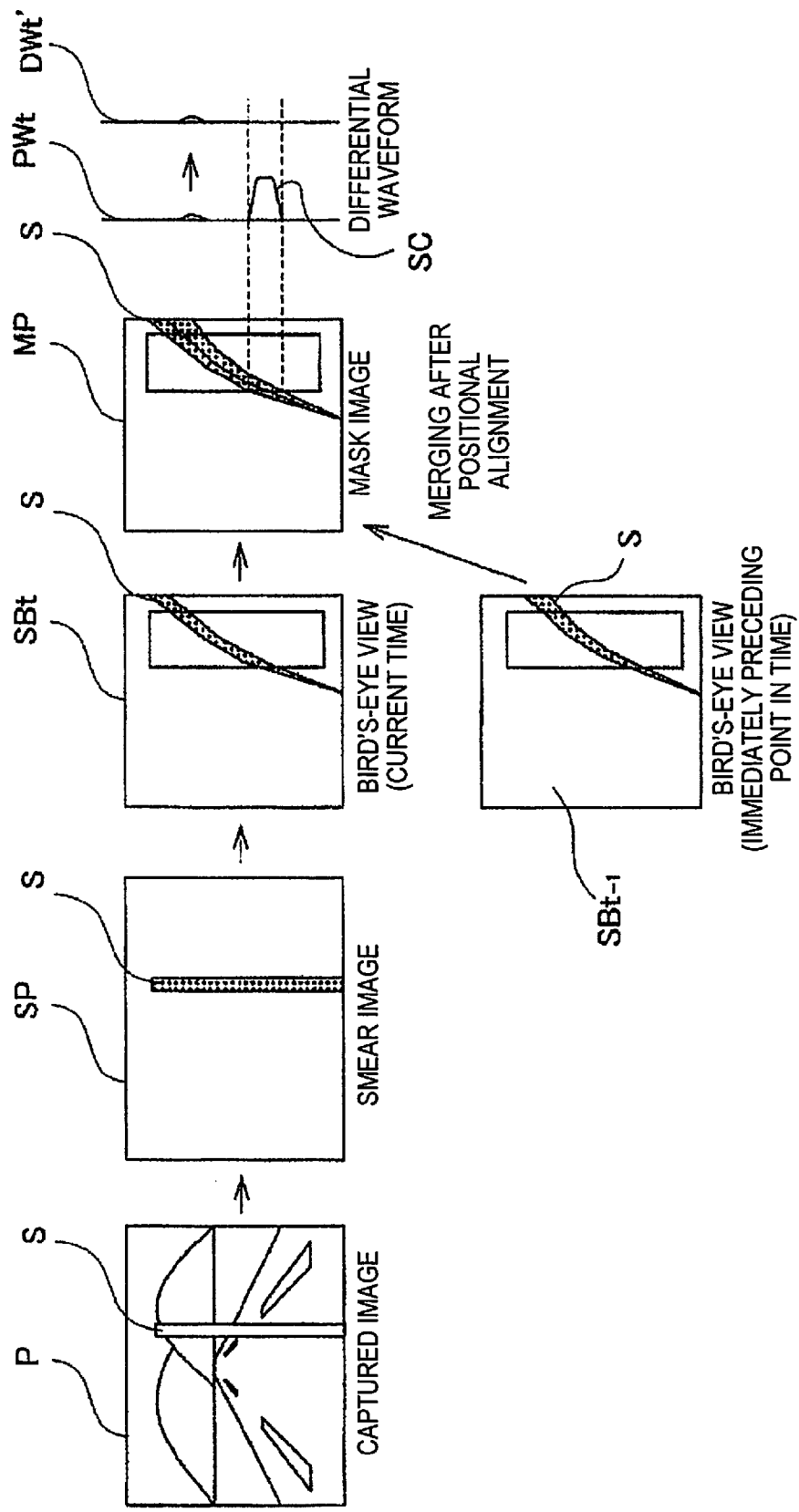
FIG. 9 is a view illustrating processing by the smear detection unit in FIG. 3 and differential waveform calculation processing by the same.

FIG. 9 is a view of an image describing the processing by the smear detection unit 40 and the processing to thereby calculate the differential waveform $DW_t$. First, it is assumed that data of a captured image P in which a smear S is present is inputted to the smear detection unit 40. At this time, the smear detection unit 40 detects the smear S in the captured image P. There are a variety of methods for detection of a smear S, but in the case of, e.g., a typical CCD (Charge-Coupled Device) camera, smears S occur only in the image-downward direction from the light source. Accordingly, in the present embodiment, a search is performed for an area that has luminance values equal to or greater than a predetermined value from the lower side of the image upwards in the image, and is continuous in the vertical direction.

The smear detection unit 40 generates data for a smear image SP which takes pixel values in the location of occurrence of the smear S to be "1" and pixels in other locations to be "0." After generation, the smear detection unit 40 transmits the data of the smear image SP to the viewpoint conversion unit 31. Having inputted the data of the smear image SP, the viewpoint conversion unit 31 converts the viewpoint of the data into a bird's-eye view. Consequently, the viewpoint conversion unit 31 generates data for a smear bird's-eye view image $SB_t$. After generation, the viewpoint conversion unit 31 transmits the data of the smear bird's-eye view image $SB_t$ to the positional alignment unit 32. The viewpoint conversion unit 31 transmits the data of the smear bird's-eye view image from a single moment prior $SB_{t-1}$ to the positional alignment unit 32.

The positional alignment unit 32 executes data alignment on the smear bird's-eye view images $SB_t$, $SB_{t-1}$. The specific alignment is the same as to the case of execution of data alignment of the bird's-eye view images $PB_t$, $PB_{t-1}$. After alignment, the positional alignment unit 32 takes the logical sum of the areas of occurrence of the smear S for each of the smear bird's-eye view images $SB_t$, $SB_{t-1}$, and thereby generates data for a mask image MP. After generation, the positional alignment unit 32 transmits the data of the mask image MP to the three-dimensional object detection unit 33.

The three-dimensional object detection unit 33 sets the frequency distribution count number to zero for the locations corresponding to the area of occurrence of the smear S in the mask image MP. That is, when a differential waveform $DW_t$ such as that illustrated in FIG. 9 has been generated, the three-dimensional object detection unit 33 sets the count number SC for the smear S to zero and generates a corrected differential waveform $DW_t'$.

The three-dimensional object detection unit 33 in the present embodiment determines the travel speed of the host vehicle V (camera 10) and determines the offset amount for a stationary object from the determined travel speed. After determining the offset amount for the stationary object, the three-dimensional object detection unit 33, having ignored the offset amount corresponding to the stationary object among the local maximum values in the histogram, calculates the travel distance of the three-dimensional object.

Figure 10:
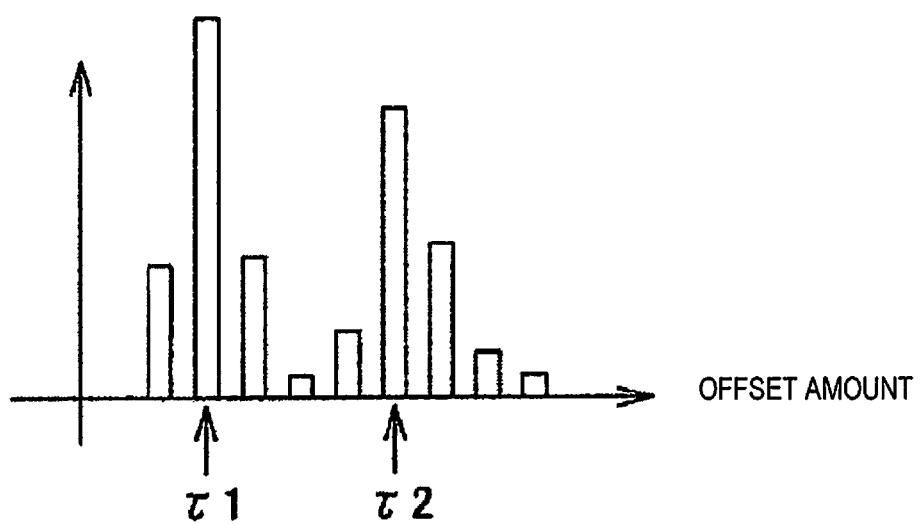
FIG. 10 is a view illustrating another example of a histogram obtained by the three-dimensional object detection unit in FIG. 3.

FIG. 10 is a view illustrating another example of the histogram obtained by the three-dimensional object detection unit 33. When a stationary object other than the other vehicle VX is present within the view angle of the camera 10, two local maximum values $\tau 1$, $\tau 2$ appear in the resulting histogram. In this case, one of the two local maximum values $\tau 1$, $\tau 2$ is the offset amount of the stationary object. Accordingly, the three-dimensional object detection unit 33 determines the offset amount for the stationary object from the travel speed, ignores the local maximum value that corresponds to the offset amount, and calculates the travel distance of the three-dimensional object using the remaining local maximum value.

Even when the offset amount corresponding to the stationary object is ignored, there may be a plurality of other vehicles VX present within the view angle of the camera 10 when there is a plurality of local maximum values. However, a plurality of other vehicles VX present within the detection areas A1, A2 occurs very rarely. Accordingly, the three-dimensional object detection unit 33 stops calculating the travel distance.

Figure 11:
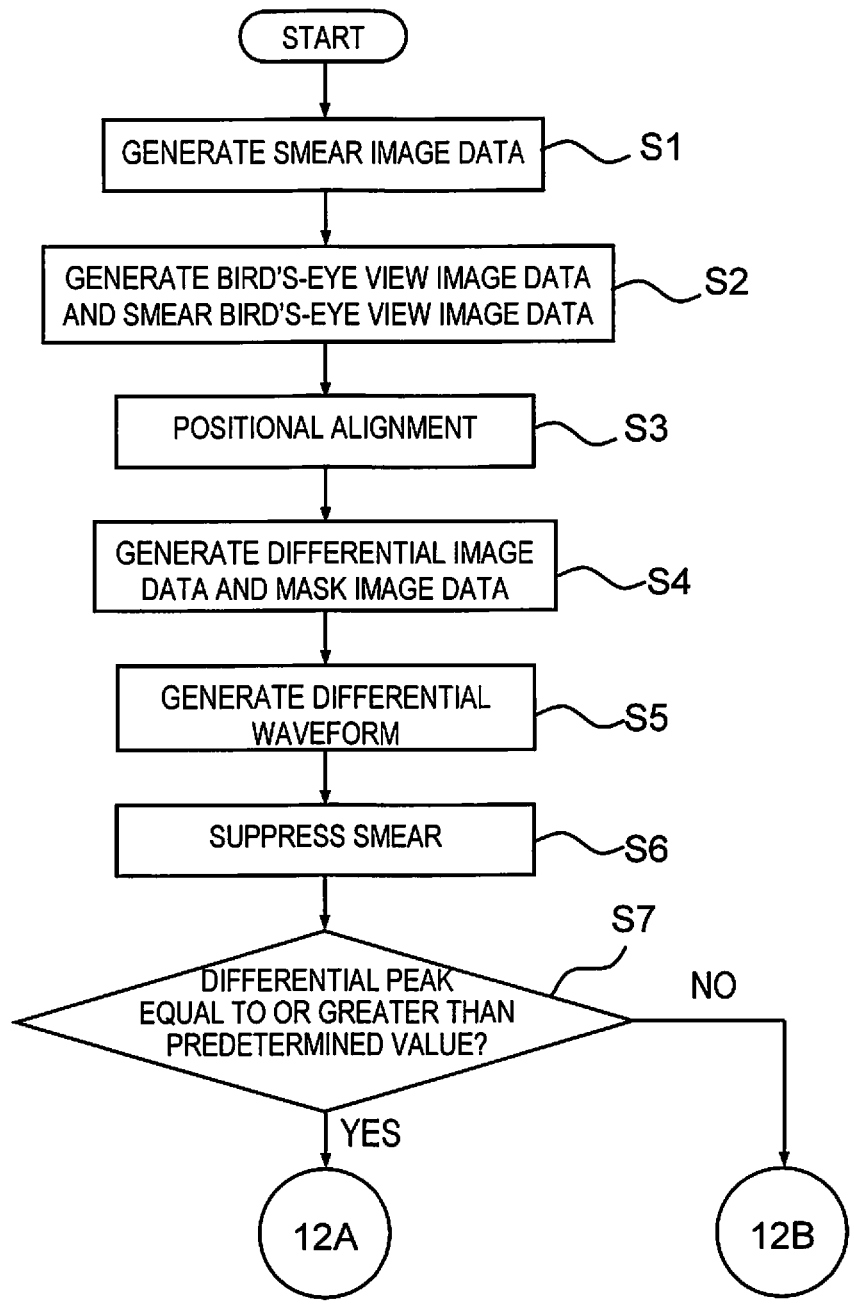
FIG. 11 is a first part of a flowchart illustrating a three-dimensional object detection method using differential waveform information, executed by the viewpoint conversion unit, positional alignment unit, smear detection unit, and three-dimensional object detection unit in FIG. 3.
Figure 12:
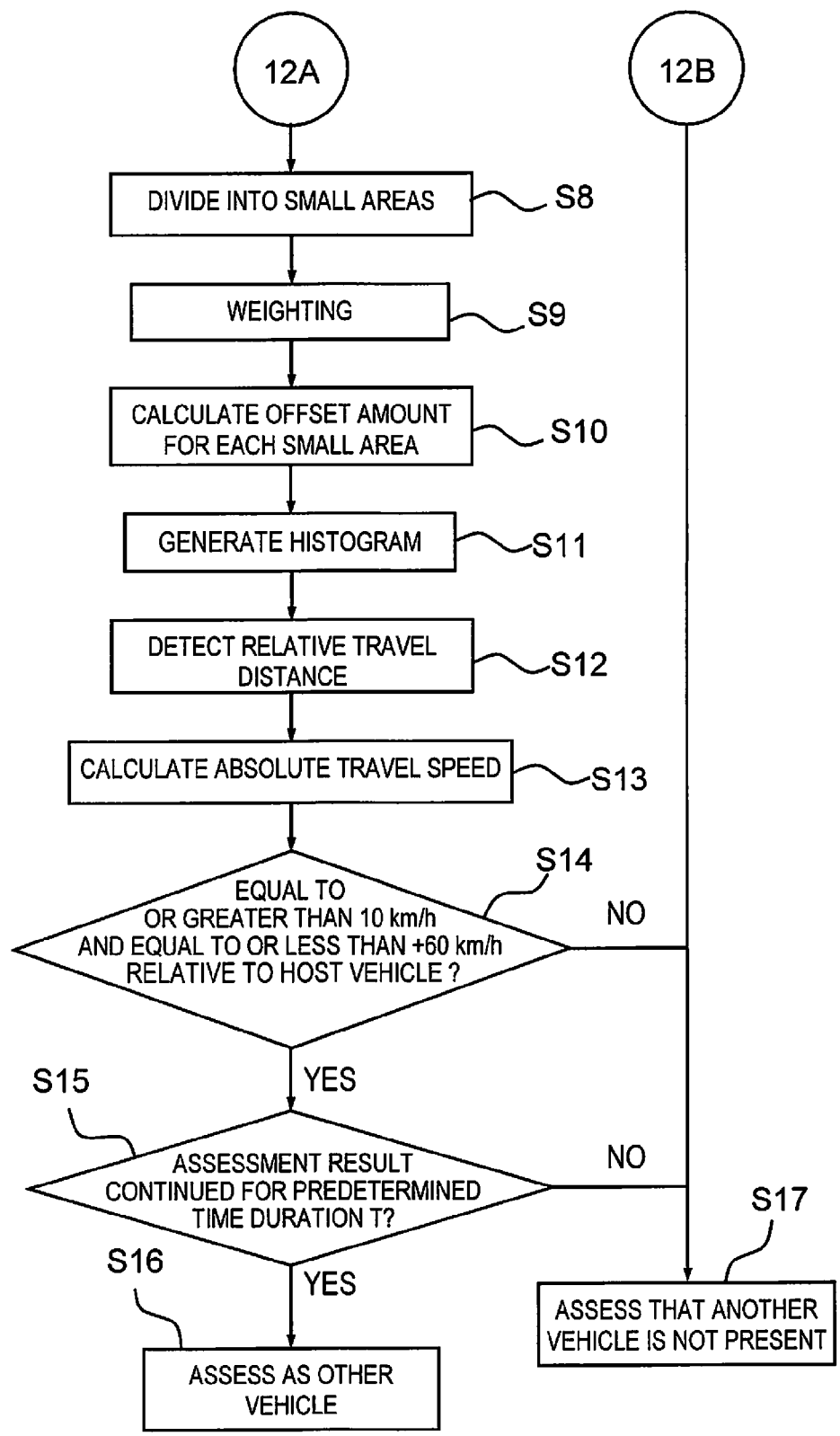
FIG. 12 is a second part of a flowchart illustrating a three-dimensional object detection method using differential waveform information, executed by the viewpoint conversion unit, positional alignment unit, smear detection unit, and three-dimensional object detection unit in FIG. 3.

The procedure for three-dimensional object detection using differential waveform information is described next. FIGS. 11 and 12 are flowcharts illustrating the procedure for three-dimensional object detection of the present embodiment. As illustrated in FIG. 11, first in step S0 the computer 30 sets a detection area based on a predetermined rule. The method for setting the detection area is described in detail below. The computer 30 then inputs data of an image P captured by the camera 10, and the smear detection unit 40 generates a smear image SP (S1). Next, the viewpoint conversion unit 31 generates data of a bird's-eye view image $PB_t$ from the data of the captured image P from the camera 10, and generates the data of a smear bird's-eye view image $SB_t$ from the smear image SP (S2).

The positional alignment unit 33 then aligns the data of the bird's-eye view image $PB_t$ and the data of the bird's-eye view image of the prior moment $PB_{t-1}$, and aligns the data of the smear bird's-eye view image $SB_t$ and the data of the smear bird's-eye view image of the prior moment $SB_{t-1}$ (S3). After the alignment, the positional alignment unit 33 generates the data of a differential image $PD_t$, and generates the data of a mask image MP (S4). Then, the three-dimensional object detection unit 33 generates a differential waveform $DW_t$ from the data of the differential image $PD_t$ and the data of the differential image of the prior moment $PD_{t-1}$ (S5). After generating the differential waveform $DW_t$, the three-dimensional object detection unit 33 sets to zero the count number corresponding to the area of occurrence of the smear S among the differential waveform $DW_t$, and suppresses the effect of the smear S (S6).

Then, the three-dimensional object detection unit 33 determines whether the peak of the differential waveform $DW_t$ is equal to or greater than a first threshold value $\alpha$ (S7). When the peak of the differential waveform $DW_t$ is not equal to or greater than the first threshold value $\alpha$, that is, in a case in which there is almost no difference, it is thought that a three-dimensional object is not present within the captured image P. Accordingly, when it is determined that the peak of the differential waveform $DW_t$ is not equal to or greater than the first threshold value $\alpha$ (S7: NO), the three-dimensional object detection unit 33 determines that a three-dimensional object is not present, and that another vehicle is not present as an obstacle (FIG. 12: S16). Then the processing illustrated in FIGS. 11 and 12 ends.

However, when it is determined that the peak of the differential waveform $DW_t$ is equal to or greater than the first threshold value $\alpha$ (S7: YES), the three-dimensional object detection unit 33 determines that a three-dimensional object is present, and divides the differential waveform $DW_t$ into a plurality of small areas $DW_{t1}$-$DW_{tn}$ (S8). Next, the three-dimensional object detection unit 33 performs weighting by small area $DW_{t1}$-$DW_{tn}$ (S9). Then, the three-dimensional object detection unit 33 calculates the offset amount by small area $DW_{t1}$-$DW_{tn}$ (S10), and adds the weightings to generate a histogram (S11).

Then, based on the histogram, the three-dimensional object detection unit 33 calculates a relative travel distance, which is the travel distance of the three-dimensional object relative to the host vehicle V (S12). Next, the three-dimensional object detection unit 33 calculates the absolute travel speed of the three-dimensional object from the relative travel distance (S13). At this time, the three-dimensional object detection unit 33 takes the time differential of the relative travel distance and calculates the relative travel speed, and adds the host vehicle speed detected by the vehicle speed sensor 20 to calculate the absolute travel speed.

Then, the three-dimensional object detection unit 33 determines whether the absolute travel speed of the three-dimensional object is 10 km/h or higher and whether the travel speed of the three-dimensional object relative to the host vehicle V is +60 km/h or less (S14). When both conditions are satisfied (S14: YES), the three-dimensional object detection unit 33 determines that the three-dimensional object is other vehicle VX (S15). Then, the processing illustrated in FIGS. 11 and 12 ends. However, when either condition is not satisfied (S14: NO), the three-dimensional object detection unit 33 determines that another vehicle is not present (S16). Then, the processing illustrated in FIGS. 11 and 12 ends.

In the present embodiment, focus is placed on the fact that the direction rearward of the host vehicle V is taken to be the detection areas A1, A2, and that another vehicle VX traveling in a lane adjacent to the lane of travel of the host vehicle, and to which focus should be paid during traveling of the host vehicle V, is detected, and in particular whether there is a possibility of contact should the host vehicle V change lanes. This is in order to determine whether there is a possibility of contact with another vehicle VX traveling in an adjacent lane adjacent to the lane of travel of the host vehicle when the host vehicle V changes lanes. Accordingly, the processing of step S14 is executed. That is, when it is assumed that the system of the present embodiment is operated on a high-speed road, when the speed of a three-dimensional object is less than 10 km/h, even when another vehicle VX were present, the position is far rearward from the host vehicle V when the host vehicle changes lanes, and thus no problems arise. Similarly, when the travel speed of the three-dimensional object relative to the host vehicle V exceeds +60 km/h (that is, when the three-dimensional object is moving at a speed more than 60 km/h greater than the speed of the host vehicle V), the movement is ahead of the host vehicle V when the host vehicle V changes lanes, and thus no problems arise. Accordingly, in step S14 it can be said that a determination is made regarding another vehicle VX that may present a problem when changing lanes.

By determining in step S14 whether the absolute travel speed of the three-dimensional object is 10 km/h or greater and whether the travel speed of the three-dimensional object relative to the host vehicle V is +60 km/h or less, there is the following advantageous result. For example, there may be cases in which, due to error in installing the camera 10, the absolute travel speed of a stationary object is detected as several km/h. Accordingly, it is possible to reduce the possibility of determining a stationary object to be another vehicle VX by determining whether the travel speed is 10 km/h or greater. There may be cases in which, due to noise, the relative speed of a three-dimensional object relative to the host vehicle V is detected as a speed exceeding +60 km/h. Accordingly, it is possible to reduce the possibility of erroneous detection due to noise by determining whether the relative speed is +60 km/h or less.

In lieu of the processing in step S14, it may be determined that the absolute travel speed of the other vehicle is not a negative value, or is not 0 km/h. Also, in the present embodiment, since focus is placed on whether there is a possibility that contact will be made should the host vehicle make a lane change, a warning sound may be emitted to the driver of the host vehicle, or a display corresponding to a warning may be provided by a predetermined display device when another vehicle VX has been detected in step S15.

Thus, through the procedure for detection of a three-dimensional object using differential waveform information of the present example, the number of pixels indicating a predetermined difference in the data of the differential image $PD_t$ is counted along the direction of collapse of the three-dimensional object by viewpoint conversion, and the differential waveform $DW_t$ is generated by taking the frequency distribution. Here, a pixel indicating a predetermined difference in the data of the differential image $PD_t$ is a pixel for which there has been a change in the image at different moments, or in other words, a location at which a three-dimensional object was present. Accordingly, it is possible to generate the differential waveform $DW_t$ by counting the number of pixels along the direction of collapse of the three-dimensional object at the location at which the three-dimensional object was present and taking the frequency distribution. In particular, the number of pixels is counted along the direction of collapse of the three-dimensional object, and therefore the differential waveform $DW_t$ is generated from information in the height direction of the three-dimensional object. Then, the travel distance of the three-dimensional object is calculated from the change over time in the differential waveform $DW_t$ including height-direction information. Accordingly, compared with a case of simply focusing on the movement of a single point alone, the detection location prior to change in time and the detection location after change in time are specified with height-direction information included and accordingly readily end up being the same location in the three-dimensional object; the travel distance is calculated from the change in time at the same location; and the precision of calculation of the travel distance can be improved.

For a location corresponding to the area of occurrence of a smear S in the differential waveform $DW_t$, the count number of the frequency distribution is made zero. As a result the waveform region generated in the differential waveform $DW_t$ due to the occurrence of the smear S is removed, and a situation in which a smear S is erroneously recognized as a three-dimensional object can be prevented.

The travel distance of the three-dimensional object is calculated from the offset amount of the differential waveform $DW_t$ when the error in the differential waveforms $DW_t$ generated at different moments is minimal. Accordingly, the travel distance is calculated from the offset amount of the one-dimensional information of a waveform, and so the calculation cost when calculating the travel distance can be suppressed.

The differential waveforms $DW_t$ generated at different moments are divided into a plurality of small areas $DW_{t1}$-$DW_{tn}$. By thus dividing into a plurality of small areas $DW_{t1}$-$DW_{tn}$, a plurality of waveforms representing respective locations of the three-dimensional object are obtained. When the error in each of the waveforms is minimum, offset amounts are determined for each small area $DW_{t1}$-$DW_{tn}$, and the travel distance of the three-dimensional object is calculated by counting the offset amounts determined for each small area $DW_{t1}$-$DW_{tn}$ and generating a histogram. Accordingly, offset amounts are determined for each location of the three-dimensional object, the travel distance is determined from a plurality of offset amounts, and the precision of calculation of the travel distance can be improved.

Weighting is performed for each of the plurality of small areas $DW_{t1}$-$DW_{tn}$, the offset amounts are counted according to the weighting for each of the plurality of small areas $DW_{t1}$-$DW_{tn}$, and a histogram is generated. Accordingly, it is possible to calculate the travel distance more appropriately by increasing the weighting for characteristic areas and decreasing the weighting for areas that are not characteristic. Consequently, the precision of calculation of the travel distance can be further improved.

For each of the small areas $DW_{t1}$-$DW_{tn}$ of the differential waveform $DW_t$, the greater the difference in the maximum value and the minimum value of the counted number of pixels indicating a predetermined difference, the greater is the weighting. Accordingly, the more an area has a characteristic undulation with a large difference between maximum value and minimum value, the greater is the weighting, whereas the weighting is small for flat areas with small undulations. Because the offset amount can be accurately determined more easily for an area with large undulations than for a flat area due to the shapes, the precision of calculation of the travel distance can be further improved by making the weighting greater for areas with greater difference in maximum value and minimum value.

The travel distance of the three-dimensional object is calculated from the local maximum value of the histogram obtained by counting offset amounts determined for each of the small areas $DW_{t1}$-$DW_{tn}$. Accordingly, even when there has been variability in offset amounts, the travel distance can be calculated with greater accuracy from the local maximum value.

Offset amounts are determined for a stationary object, and the offset amounts are ignored, and consequently a situation in which the precision of calculation of the travel distance of a three-dimensional object is reduced due to a stationary object can be prevented. The offset amounts corresponding to a stationary object having been ignored, calculation of the travel distance of the three-dimensional object is stopped when there is a plurality of local maximum values. Accordingly, a situation in which the travel distance is erroneously calculated, such as when there is a plurality of local maximum values, can be prevented.

In the above-described embodiment, the vehicle speed of the host vehicle V is determined based on a signal from the vehicle speed sensor 20, but other configurations are possible, and the vehicle speed may be estimated from a plurality of images at different times. In this case a vehicle speed sensor is unnecessary, and the configuration can be simplified.

In the above-described embodiment, the image captured at the current moment and the image from a moment prior are converted into bird's-eye views, and upon alignment of the converted bird's-eye views, a differential image $PD_t$ is generated, the generated differential image $PD_t$ is evaluated along the direction of collapse (the direction of collapse of a three-dimensional object when converting a captured image to a bird's-eye view), and a differential waveform $DW_t$ is generated, but other configurations are possible. For example, only the image of the prior moment may be converted into a bird's-eye view, and after alignment of the converted bird's-eye view the image may again be converted to correspond to a captured image, this image and the image of the current moment may be used to generate a differential image, the generated differential image may be evaluated along the direction corresponding to the direction of collapse (that is, the direction resulting when the direction of collapse is converted into a direction in the captured image), and a differential waveform $DW_t$ may be generated. That is, when the image of the current moment and the image of the prior moment can be aligned, a differential image $PD_t$ can generated from the difference in the two aligned images, and evaluation along the direction in which the three-dimensional object collapses when the differential image $PD_t$ is converted to a bird's-eye view can be performed, then a bird's-eye view need not be generated.

Three-Dimensional Object Detection Using Edge Information

Figure 13:
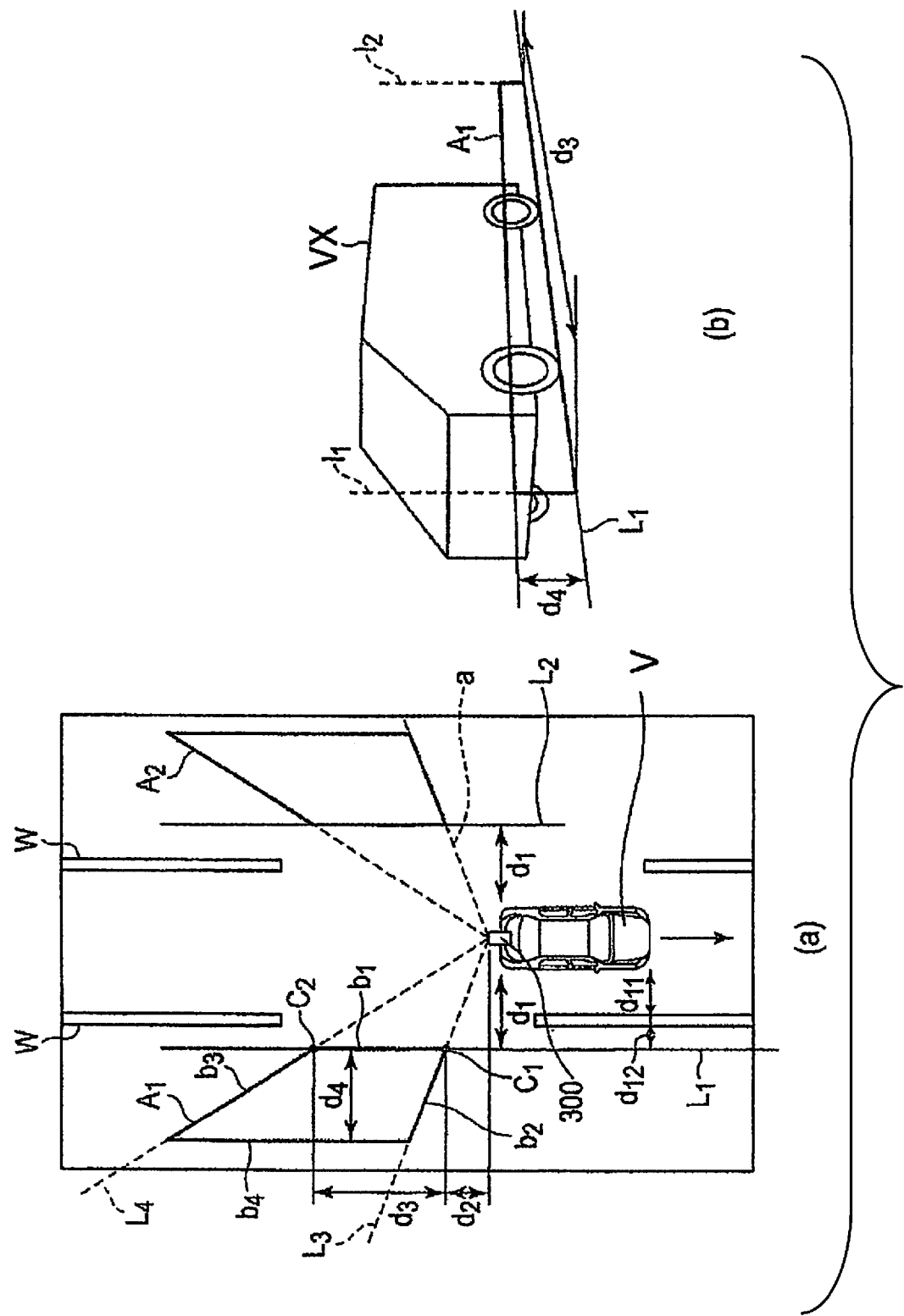
FIG. 13 is a view illustrating a travel state of the vehicle (three-dimensional object detection using edge information), with part (a) illustrating the positional relationship of the detection area and the like from a top plan view, and part (b) illustrating the positional relationship of the detection area and the like in real space from a perspective view.

A block B for detection of a three-dimensional object using edge information that can be operated in place of the block A illustrated in FIG. 3, provided with a luminance difference calculation unit 35, an edge line detection unit 36, and a three-dimensional object detection unit 37, is described next. FIG. 13 illustrates the capture range and the like of the camera 10 in FIG. 3, with part (a) being a plan view, and part (b) being a perspective view illustrating the rearward side of the host vehicle V in real space. As illustrated in part (a) of FIG. 13, the camera 10 has a predetermined view angle a, and captures the rearward side of the host vehicle V included in the predetermined view angle a. Similarly to the case illustrated in FIG. 2, the view angle a of the camera 10 is set so as to include in the capture range of the camera 10 adjacent lanes in addition to the lane in which the host vehicle V is traveling.

The detection areas A1, A2 in the present example are trapezoidal in a plan view (bird's-eye view state), and the position, size, and shape of the detection areas A1, A2 are decided based on distances $d_1$ to $d_4$. The detection areas A1, A2 of the example illustrated in the drawing are not limited to being trapezoidal, and may also be rectangular or another shape in a bird's-eye view state, as illustrated in FIG. 2. The three-dimensional object assessment unit 34 in the present embodiment can also set the detection areas A1, A2 by the method previously described.

Here, the distance d1 is the distance from the host vehicle V to the ground lines L1, L2. The ground lines L1, L2 refer to a line in which a three-dimensional object, which is present in a lane adjacent to the lane in which the host vehicle V is traveling, is in contact with the ground. In the present embodiment, an object is to detect another vehicle VX or the like (including two-wheeled vehicles or the like) traveling in the left or right lane behind the host vehicle V and adjacent to the lane of the host vehicle V. Accordingly, the distance d1, which is the position of the ground lines L1, L2 of the other vehicle VX, can be decided so as to be substantially fixed from the distance d11 from the host vehicle V to a white line W and the distance d12 from the white line W to the position in which the other vehicle VX is predicted to travel.

The distance d1 is not limited to being fixedly decided, and may be variable. In this case, the computer 30a recognizes the position of the white line W in relation to the host vehicle V using white line recognition or another technique, and the distance d11 is decided based on the position of the recognized white line W. The distance d1 is thereby variably set using the decided distance d11. In the present embodiment described below, the position in which the other vehicle VX is travelling (the distance d12 from the white line W) and the position in which the host vehicle V is travelling (the distance d11 from the white line W) is mostly predictable, and the distance d1 is fixedly decided.

A distance d2 is the distance extending from the rear end part of the host vehicle V in the vehicle progress direction. The distance d2 is decided so that the detection areas A1, A2 are accommodated within at least the view angle "a" of the camera 10. In the present embodiment in particular, the distance d2 is set so as to be in contact with a range partitioned within the view angle "a". The distance d3 indicates the length of the detection areas A1, A2 in the vehicle progression direction. The distance d3 is decided based on the size of the three-dimensional object to be detected. In the present embodiment, the object to be detected is another vehicle VX or the like, and therefore the distance d3 is set to a length that includes the other vehicle VX.

The distance d4 indicates the height, which has been set so that the tires of the other vehicle VX or the like are included in real space, as illustrated in part (b) of FIG. 13. In a bird's-eye view image, the distance d4 is the length illustrated in part (a) of FIG. 13. The distance d4 may also be a length that does not include lanes further adjacent to the left and right adjacent lanes in the bird's-eye view image (i.e., adjacent-adjacent lanes two lanes away). This is because when the lanes two lanes away from the lane of the host vehicle V are included, it is no longer possible to distinguish whether another vehicle VX is present in the adjacent lanes to the left and right of the lane in which the host vehicle V is traveling, or whether an adjacent-other vehicle is present in an adjacent-adjacent lane two lanes away.

As described above, the distances d1 to d4 are decided, and the position, size, and shape of the detection areas A1, A2 are thereby decided. More specifically, the position of the top side b1 of the detection areas A1, A2 that form a trapezoid is decided by the distance d1. The starting position C1 of the top side b1 is decided by the distance d2. The end position C2 of the top side b1 is decided by the distance d3. The lateral side b2 of the detection areas A1, A2 that form a trapezoid is decided by a straight line L3 extending from the camera 10 toward the starting position C1. Similarly, the lateral side b3 of the detection areas A1, A2 that form a trapezoid is decided by a straight line L4 extending from the camera 10 toward the end position C2. The position of the lower side b4 of the detection areas A1, A2 that form a trapezoid is decided by the distance d4. In this manner, the areas surrounded by the sides b1 to b4 are the detection areas A1, A2. The detection areas A1, A2 are regular squares (rectangles) in real space rearward from the host vehicle V, as illustrated in part (b) of FIG. 13.

Returning to FIG. 3, the viewpoint conversion unit 31 accepts input of captured image data of a predetermined area captured by the camera 10. The viewpoint conversion unit 31 converts the viewpoint of the inputted captured image data into bird's-eye view image data, which is a bird's-eye view state. A bird's-eye view state is a state of viewing from the viewpoint of an imaginary camera that is looking down from above, e.g., vertically downward (or slightly inclined downward). Viewpoint conversion can be carried out using the technique described in, e.g., Japanese Laid-Open Patent Application No. 2008-219063.

The luminance difference calculation unit 35 calculates luminance differences in the bird's-eye view image data, which has undergone viewpoint conversion by the viewpoint conversion unit 31, in order to detect the edges of a three-dimensional object included in the bird's-eye view image. The luminance difference calculation unit 35 calculates, for each of a plurality of positions along a perpendicular imaginary line extending along the perpendicular direction in real space, the luminance difference between two pixels near each position. The luminance difference calculation unit 35 is capable of calculating the luminance difference by a method for setting a single perpendicular imaginary line extending in the perpendicular direction in real space, or a method for setting two perpendicular imaginary lines.

Described below is the specific method for setting two perpendicular imaginary lines. The luminance difference calculation unit 35 sets a first perpendicular imaginary line that corresponds to a line segment extending in the perpendicular direction in real space, and a second perpendicular imaginary line that is different from the first perpendicular imaginary line and that corresponds to the line segment extending in the perpendicular direction in real space. The luminance difference calculation unit 35 determines the luminance difference between a point on the first perpendicular imaginary line and a point on the second perpendicular imaginary line in continuous fashion along the first perpendicular imaginary line and the second perpendicular imaginary line. The operation of the luminance difference calculation unit 35 is described in detail below.

Figure 14:
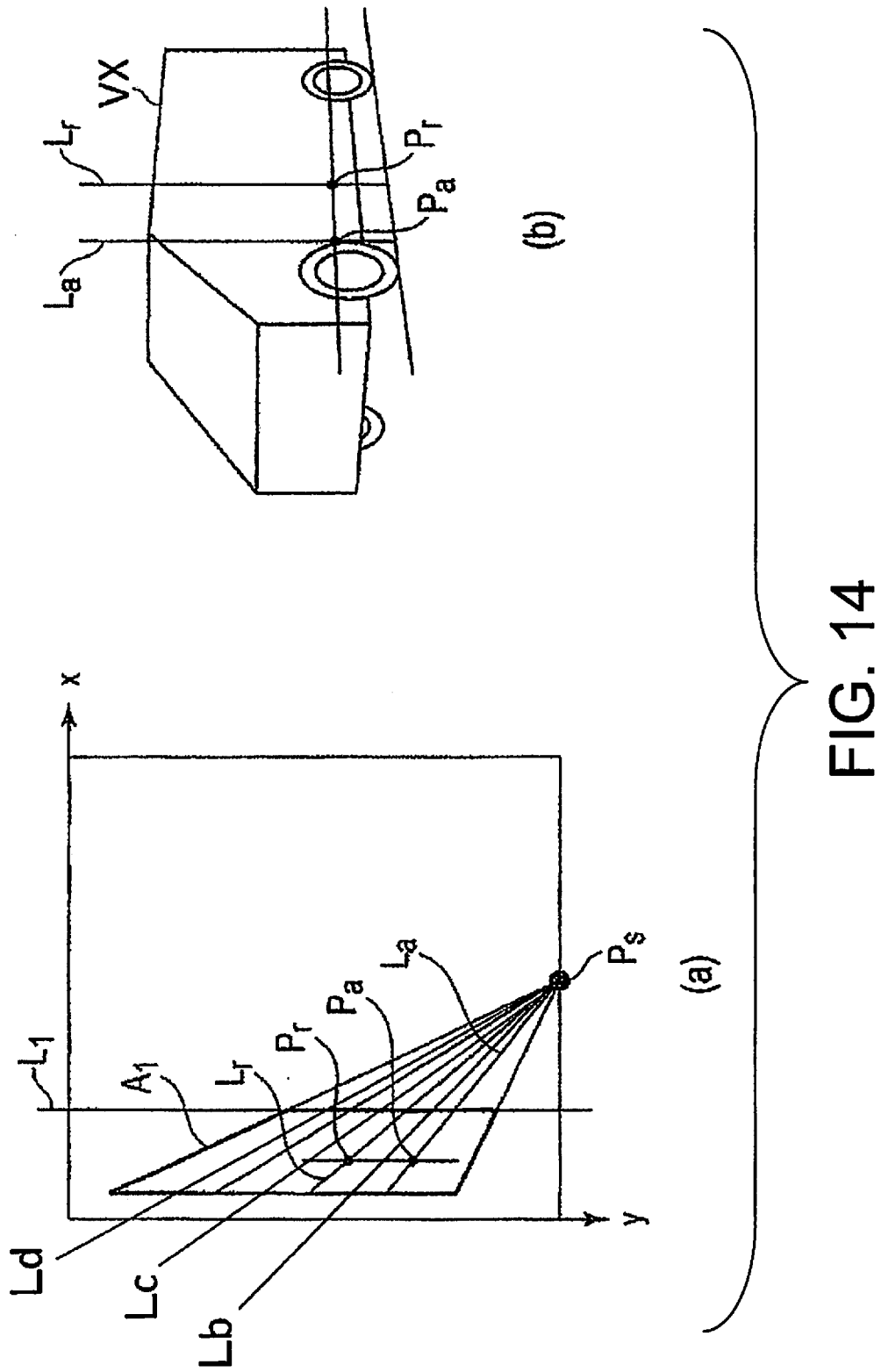
FIG. 14 is a view describing the operation of the luminance difference calculation unit in FIG. 3, with part (a) illustrating the positional relationship between the focus line, reference line, focus point, and reference point in a bird's-eye view image, and part (b) illustrating the positional relationship between the focus line, reference line, focus point, and reference point in real space.

The luminance difference calculation unit 35 sets a first perpendicular imaginary line La (hereinbelow referred to as focus line La) that corresponds to a line segment extending in the perpendicular direction in real space and that passes through the detection area A1, as illustrated in part (a) of FIG. 14. The luminance difference calculation unit 35 sets a second perpendicular imaginary line Lr (hereinbelow referred to as reference line Lr) that is different from the focus line La, corresponds to the line segment extending in the perpendicular direction in real space, and passes through the detection area A1. Here, the reference line Lr is set to a position at a distance from the focus line La by a predetermined distance in real space. The lines that correspond to the line segments extending in the perpendicular direction in real space are lines that spread out in the radial direction from the position Ps of the camera 10 in a bird's eye view image. These lines spreading out in the radial direction are lines that follow the collapsing direction of the three-dimensional object when converted to a bird's-eye view.

The luminance difference calculation unit 35 sets a focus point Pa on the focus line La (a point on the first perpendicular imaginary line). The luminance difference calculation unit 35 sets a reference point Pr on the reference line Lr (a point on the second perpendicular imaginary line). The focus line La, the focus point Pa, the reference line Lr, and the reference point Pr have the relationship in real space illustrated in part (b) of FIG. 14. It is apparent from part (b) of FIG. 14 that the focus line La and the reference line Lr are lines extending in the perpendicular direction in real space, and that the focus point Pa and the reference point Pr are points set to substantially the same height in real space. The focus point Pa and the reference point Pr are not necessarily required to be rigorously kept at the same height, and a certain amount of error that allows for the focus point Pa and the reference point Pr to be deemed to be at the same height is allowed.

The luminance difference calculation unit 35 determines the luminance difference between the focus point Pa and the reference point Pr. When the luminance difference between the focus point Pa and the reference point Pr is great, it is possible that an edge is present between the focus point Pa and the reference point Pr. Accordingly, the edge line detection unit 36 illustrated in FIG. 3 detects an edge line based on the luminance difference between the focus point Pa and the reference point Pr.

Figure 15:
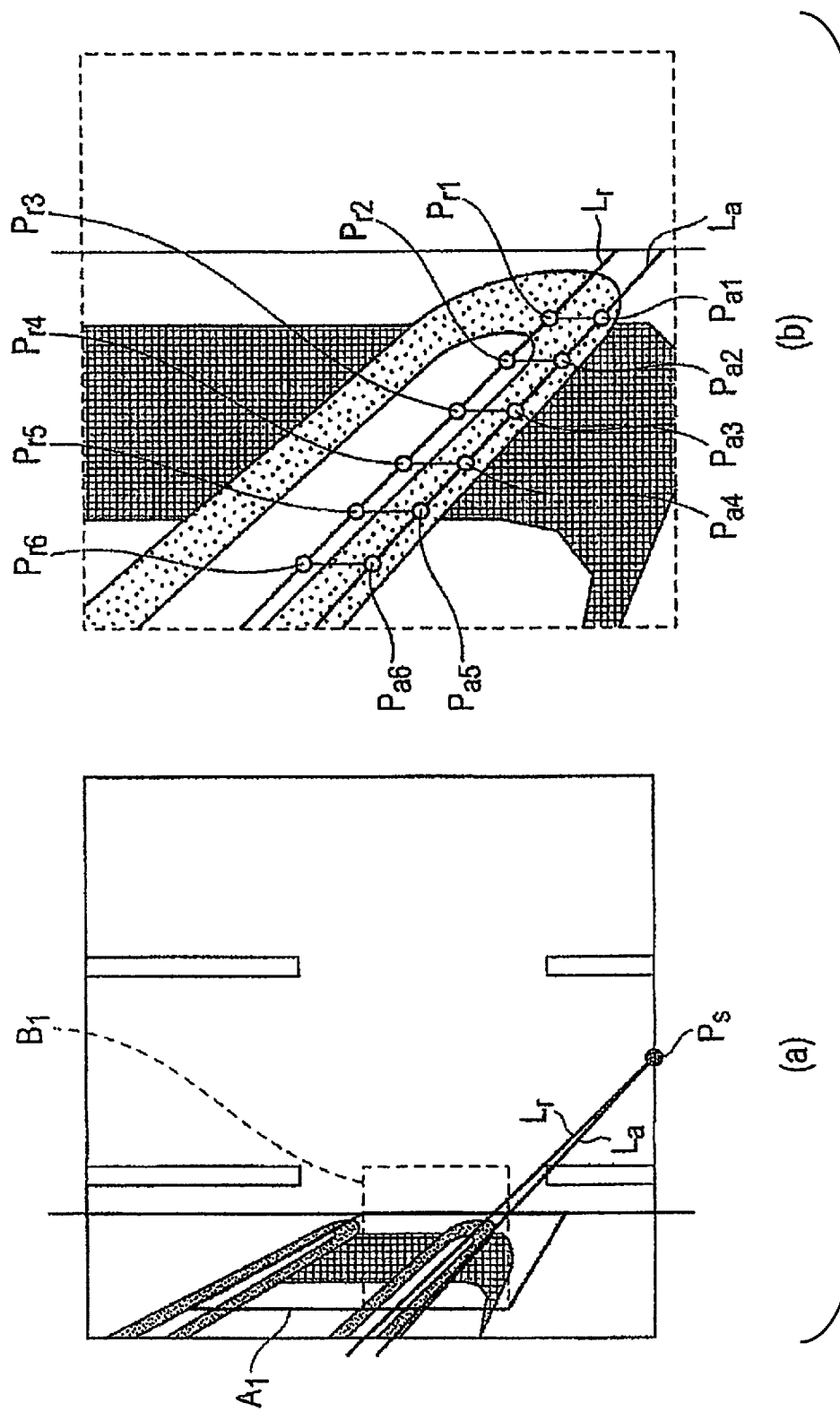
FIG. 15 is a view describing the detailed operation of the luminance difference calculation unit in FIG. 3, with part (a) illustrating the detection area in a bird's-eye view image, and part (b) illustrating the positional relationship between the focus line, reference line, focus point, and reference point in real space.

This point will be described in greater detail. FIG. 15 is a view for describing the detailed operation of the luminance difference calculation unit 35. Part (a) of FIG. 15 illustrates a bird's-eye view image of the bird's-eye view state. Part (b) of FIG. 15 is an enlarged view of the bird's-eye view of a portion B1 of the bird's eye view image illustrated in part (a) of FIG. 15. In FIG. 15, only the detection area A1 is illustrated and described, but the luminance difference is calculated using the same procedure for detection area A2.

When the other vehicle VX is being displayed in the captured image captured by the camera 10, the other vehicle VX appears in the detection area A1 in the bird's-eye view image, as illustrated in part (a) of FIG. 15. The focus line La is set on a rubber portion of a tire of the other vehicle VX in the bird's-eye view image in part (b) of FIG. 15, as illustrated in the enlarged view of area B1 in part (a) of FIG. 15. In this state, first, the luminance difference calculation unit 35 sets the reference line Lr. The reference line Lr is set along the perpendicular direction in a position set at a predetermined distance in real space from the focus line La. Specifically, in the three-dimensional object detection device 1a according to the present embodiment, the reference line Lr is set in a position at a distance of 10 cm away in real space from the focus line La. The reference line Lr is thereby set on the wheel of the tire of the other vehicle VX set, e.g., at a distance that corresponds to 10 cm from the rubber of the tire of the other vehicle VX in the bird's-eye view image.

Next, the luminance difference calculation unit 35 sets a plurality of focus points Pa1 to PaN on the focus line La. In part (b) of FIG. 15, six focus points Pa1 to Pa6 (hereinbelow referred to as focus point Pai when indicating an arbitrary point) are set for convenience of description. An arbitrary number of focus points Pa may be set on the focus line La. In the description below, N focus points Pa are set on the focus line La.

The luminance difference calculation unit 35 subsequently sets the reference points Pr1 to PrN so as to have the same height as the focus points Pa1 to PaN in real space. The luminance difference calculation unit 35 calculates the luminance difference between focus point Pa and reference point Pr pairs at the same height. The luminance difference calculation unit 35 thereby calculates the luminance difference between two pixels for each of the plurality of positions (1-N) along the perpendicular imaginary line extending in the perpendicular direction in real space. The luminance difference calculation unit 35 calculates the luminance difference between, e.g., a first focus point Pa1 and a first reference point Pr1, and calculates the luminance difference between a second focus point Pa2 and a second reference point Pr2. The luminance difference calculation unit 35 thereby determines the luminance difference in continuous fashion along the focus line La and the reference line Lr. In other words, the luminance difference calculation unit 35 sequentially determines the luminance difference between the third to $N^{th}$ focus points Pa3 to PaN and the third to $N^{th}$ reference points Pr3 to PrN.

The luminance difference calculation unit 35 repeats the process of setting the above-described reference line Lr, setting the focus point Pa, setting the reference point Pr, and calculating the luminance difference while shifting the focus line La within the detection area A1. In other words, the luminance difference calculation unit 35 repeatedly executes the above-described process while changing the positions of the focus line La and the reference line Lr by the same distance in real space along the direction in which the ground line L1 extends. The luminance difference calculation unit 35, e.g., sets the line that was the reference line Lr in the previous process to be the focus line La, sets the reference line Lr in relation to the focus line La, and sequentially determines the luminance difference.

Returning to FIG. 3, the edge line detection unit 36 detects the edge line from the continuous luminance difference calculated by the luminance difference calculation unit 35. For example, in the case illustrated in part (b) of FIG. 15, the first focus point Pa1 and the first reference point Pr1 are positioned at the same tire portion, and the luminance difference is therefore small. On the other hand, the second to sixth focus points Pa2 to Pa6 are positioned at the rubber portions of the tire, and the second to sixth reference points Pr2 to Pr6 are positioned at the wheel portion of the tire. Therefore, the luminance difference between the second to sixth focus points Pa2 to Pa6 and the second to sixth reference points Pr2 to Pr6 is great. Accordingly, the edge line detection unit 36 is capable of detecting that an edge is present between the second to sixth focus points Pa2 to Pa6 and the second to sixth reference points Pr2 to Pr6 where the luminance difference is high.

Specifically, when an edge line is to be detected, the edge line detection unit 36 first assigns an attribute to the $i^{th}$ focus point Pai from the luminance difference between the $i^{th}$ focus point Pai (coordinates (xi, yi)) to the $i^{th}$ reference point Pri (coordinates (xi', yi')) in accordance with formula 1 noted below.

$s(xi,yi)=1$ when $I(xi,yi)>I(xi',yi')+t$ $s(xi,yi)=-1$ when $I(xi,yi)<I(xi',yi')-t$ $s(xi,yi)=0$ formula 1 when the above do not hold true.

In formula 1 above, t represents a predetermined threshold value, I(xi, yi) represents the luminance value of the $i^{th}$ focus point Pai, and I(xi', yi') represents the luminance value of the $i^{th}$ reference point Pri. In accordance with formula 1, the attribute s(xi, yi) of the focus point Pai is '1' when the luminance value of the focus point Pai is greater than the luminance value obtained by adding the threshold value t to the reference point Pri. On the other hand, the attribute s(xi, yi) of the focus point Pai is '−1' when the luminance value of the focus point Pai is less than the luminance value obtained by subtracting the threshold value t from the reference point Pri. The attribute s(xi, yi) of the focus point Pai is '0' when the luminance value of the focus point Pai and the luminance value of the reference point Pri are in a relationship other than that stated above.

Next, the edge line detection unit 36 assesses whether the focus line La is an edge line from the continuity c(xi, yi) of the attribute s along the focus line La based on the following formula 2.

$c(xi,yi)=1$ when $s(xi,yi)=s(xi+1,yi+1)$ (excluding when 0=0)

$c(xi,yi)=0$ Formula 2 when the above does not hold true.

The continuity c(xi, yi) is '1' when the attribute s(xi, yi) of the focus point Pai and the attribute s(xi+1, yi+1) of the adjacent focus point Pai+1 are the same. The continuity c(xi, yi) is '0' when the attribute s(xi, yi) of the focus point Pai and the attribute s(xi+1, yi+1) of the adjacent focus point Pai+1 are not the same.

Next, the edge line detection unit 36 determines the sum of the continuities c of all the focus points Pa on the focus line La. The edge line detection unit 36 divides the sum of the continuities c thus determined by the number N of focus points Pa to thereby normalize the continuity c. The edge line detection unit 36 determines the focus line La to be an edge line when the normalized value has exceeded a threshold value θ. The threshold value θ is set in advance by experimentation or other means.

In other words, the edge line detection unit 36 determines whether the focus line La is an edge line based on formula 3 noted below. The edge line detection unit 36 then determines whether all of the focus lines La drawn on the detection area A1 are edge lines.

$\Sigma c(xi,yi)/N>\theta$ Formula 3

Returning to FIG. 3, the three-dimensional object detection unit 37 detects a three-dimensional object based on the amount of edge lines detected by the edge line detection unit 36. As described above, the three-dimensional object detection device 1 in the present embodiment detects edge lines extending in perpendicular directions in real space. Detection of numerous edge lines extending in perpendicular directions means that there is a strong possibility that a three-dimensional object is present in the detection areas A1, A2. Accordingly, the three-dimensional object detection unit 37 detects a three-dimensional object based on the amount of edge lines detected by the edge line detection unit 36. Prior to detecting a three-dimensional object, the three-dimensional object detection unit 37 assesses whether the edge lines detected by the edge line detection unit 36 are correct. The three-dimensional object detection unit 37 assesses whether the luminance change along edge lines in a bird's-eye view image on the edge lines is greater than a predetermined threshold value. When the luminance change in the bird's-eye view image on an edge line is greater than the threshold value, it is determined that the edge line was detected by erroneous assessment. However, when the luminance change in the bird's-eye view image on an edge line is not greater than the threshold value, the edge line is assessed to be correct. The threshold value is a value set in advance by experiments and the like.

Figure 16:
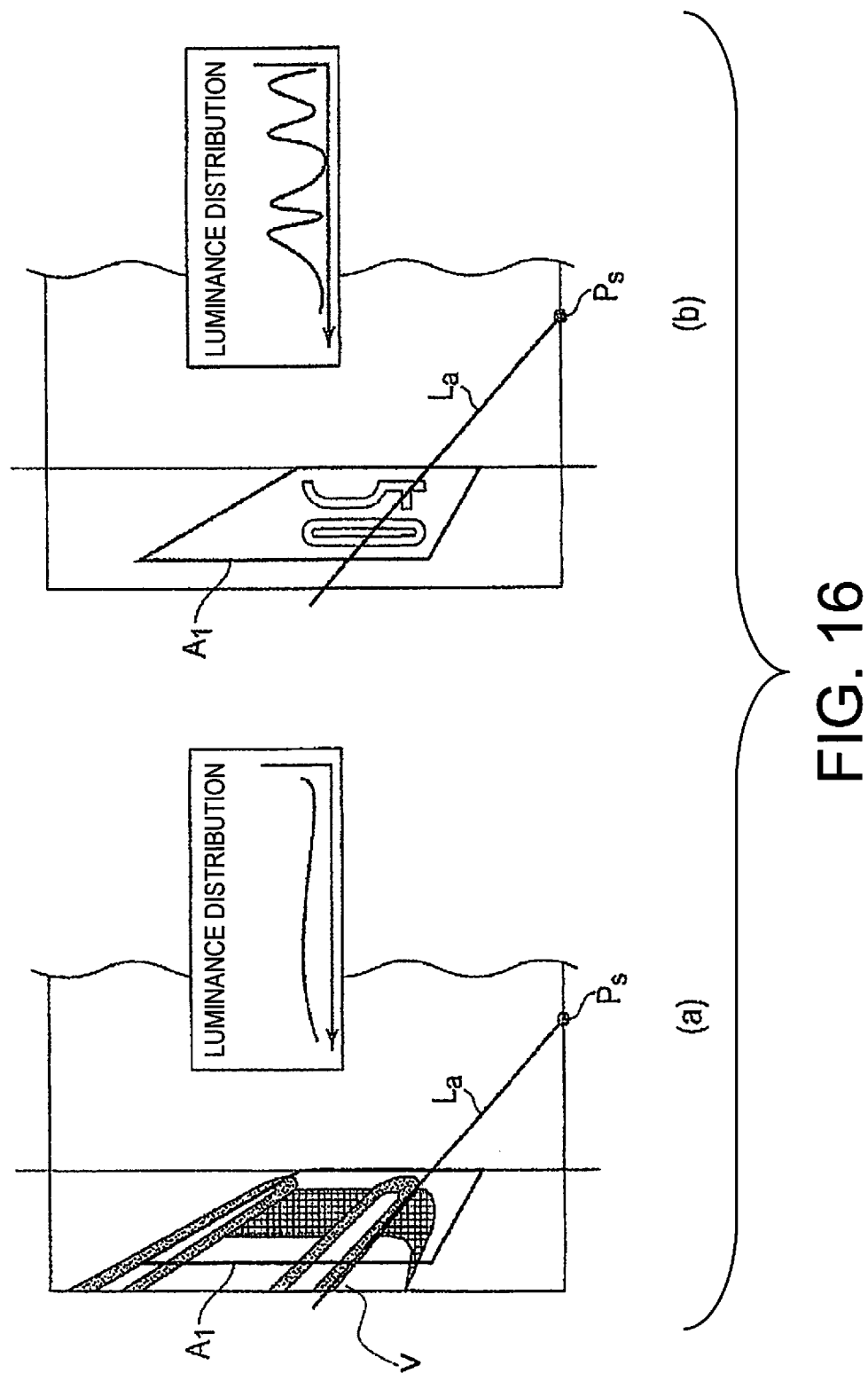
FIG. 16 is a view illustrating the edge line and the luminance distribution on the edge line, with part (a) illustrating the luminance distribution when a three-dimensional object (vehicle) is present in the detection area, and part (b) illustrating the luminance distribution when a three-dimensional object is not present in the detection area.

FIG. 16 is a view illustrating the luminance distribution of the edge line, part (a) of FIG. 16 illustrates the edge line and the luminance distribution when another vehicle VX as a three-dimensional object is present in the detection area A1, and part (b) of FIG. 16 illustrates the edge line and the luminance distribution when a three-dimensional object is not present in the detection area A1.

As illustrated in part (a) of FIG. 16, it is assumed that it has been determined that the focus line La set on the tire rubber portion of the other vehicle VX in on an edge line in the bird's-eye view image. In this case, the change in luminance on the focus line La in the bird's-eye view image is gradual. This is due to the image captured by the camera 10 being converted in viewpoint to a bird's-eye view image, whereby the tire of the other vehicle is enlarged within the bird's-eye view image. On the other hand, the focus line La set in the white character portion "50" drawn on the road surface in the bird's-eye view image is assumed to have been errantly assessed to be an edge line, as illustrated in part (b) of FIG. 16. In this case, the change in luminance on the focus line La in the bird's-eye view image has considerable undulations. This is because the road and other portions of low luminance are mixed with the portions of high luminance in the white characters on the edge line.

The three-dimensional object detection unit 37 assesses whether an edge line has been detected by errant assessment based on differences in the luminance distribution on the focus line La as described above. The three-dimensional object detection unit 37 determines that the edge line has been detected by errant assessment when the change in luminance along the edge line is at a predetermined threshold value tb or greater, and determines that the edge line is not caused by a three-dimensional object. A reduction in precision for detecting a three-dimensional object is thereby suppressed when white characters such as "50" on the road surface, roadside vegetation, and the like are assessed to be edge lines.

Specifically, the three-dimensional object detection unit 37 calculates the change in luminance of the edge line using formula 4 or 5 noted below. The change in luminance of the edge line corresponds to the evaluation value in real space in the perpendicular direction. Formula 4 evaluates the luminance distribution using the total value of the square of the difference between the $i^{th}$ luminance value I(xi, yi) and the adjacent $i^{th}+1$ luminance value I(xi+1, yi+1) on the focus line La. Formula 5 evaluates the luminance distribution using the total value of the absolute value of the difference between the $i^{th}$ luminance value I(xi, yi) and the adjacent $i^{th}+1$ luminance value I(xi+1, yi+1) on the focus line La.

Evaluation value in perpendicular equivalent
direction=$\Sigma[\{I(xi,yi)-I(xi+1,yi+1)\}^2]$     Formula 4

Evaluation value in perpendicular equivalent
direction=$\Sigma|I(xi,yi)-I(xi+1,yi+1)|$     Formula 5

No limitation is imposed in the use of formula 5, and it is also possible to binarize an attribute b of an adjacent luminance value using a threshold value t2, and then sum the binarized attribute b for all of the focus points Pa, as in formula 7 noted below.

Evaluation value in perpendicular equivalent
direction=$\Sigma b(xi,yi)$ where $b(xi,yi)=1$ when $|I(xi,yi)-I(xi+1,yi+1)|>t2$ and $b(xi,yi)=0$     Formula 6 when the above does not hold true.

When the absolute value of the luminance difference between the luminance value of a focus point Pai and the luminance value of a reference point Pri is greater than the threshold value t2, the attribute b(xi,yi) of the focus point Pa(xi,yi) is "1." In the case of some other relationship, the attribute b(xi,yi) of the focus point Pai is "0." This threshold value t2 is set in advance by experiments or the like to assess whether the focus line La is on the same three-dimensional object. The three-dimensional object detection unit 37 takes the sum of the attributes b for all focus points Pa on the focus line La, determines an evaluation value for directions corresponding to perpendicular, and assesses whether the edge line is correct.

Figure 17:
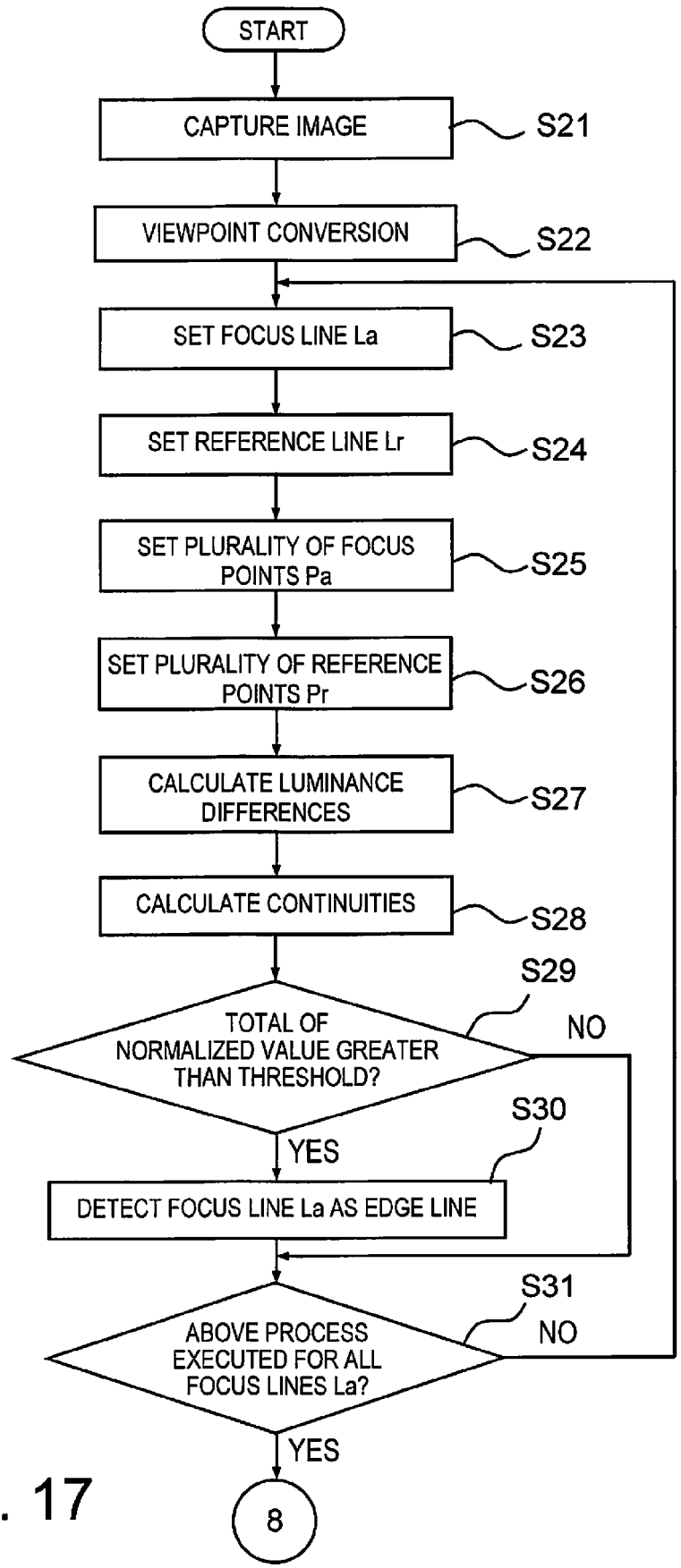
FIG. 17 is a first part of a flowchart illustrating a three-dimensional object detection method using edge information, executed by the viewpoint conversion unit, luminance difference calculation unit, edge line detection unit, and three-dimensional object detection unit in FIG. 3.
Figure 18:
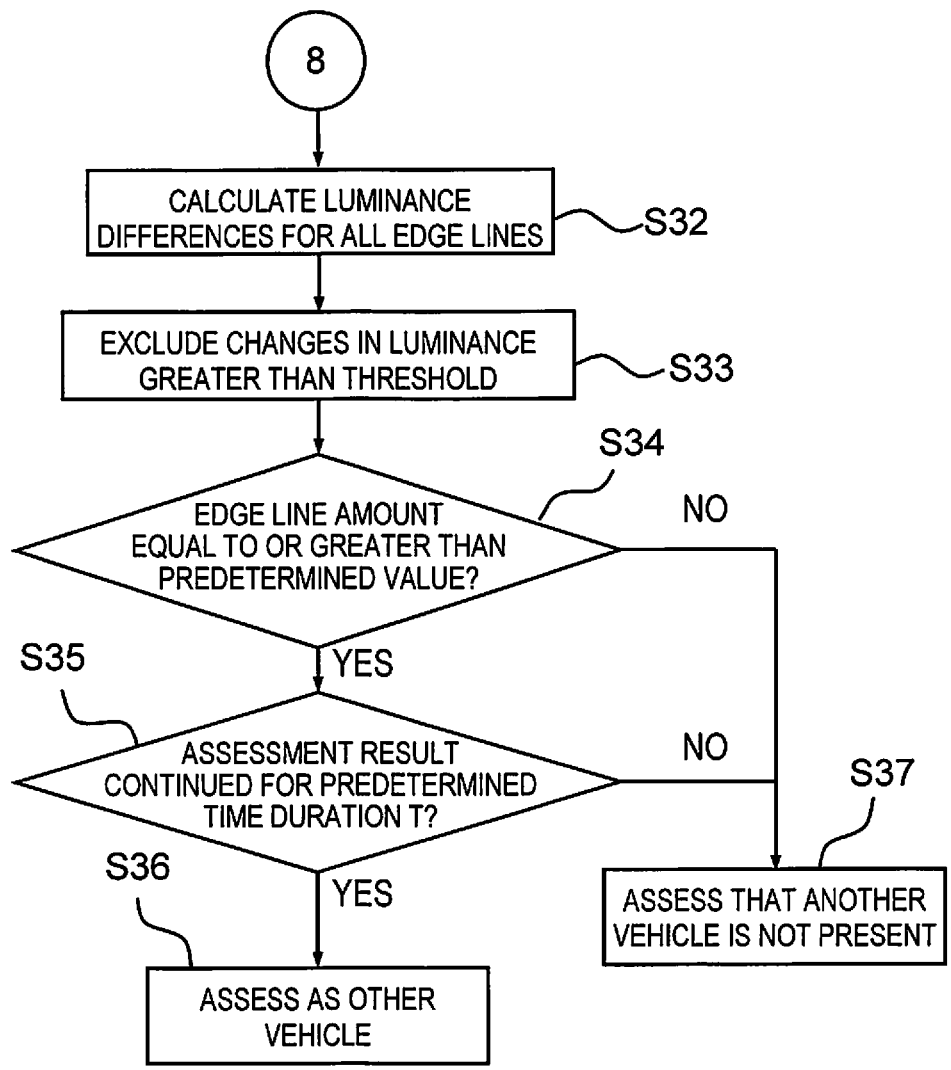
FIG. 18 is a second part of a flowchart illustrating a three-dimensional object detection method using edge information, executed by the viewpoint conversion unit, luminance difference calculation unit, edge line detection unit, and three-dimensional object detection unit in FIG. 3.

The method of three-dimensional object detection using edge information of the present embodiment is described next. FIGS. 17 and 18 are flowcharts illustrating in detail the method of three-dimensional object detection of the present embodiment. In FIGS. 17 and 18, for convenience, processing is described for the detection area A1, but similar processing is executed for the detection area A2 as well.

As illustrated in FIG. 17, first in step S20 the computer 30 sets the detection area based on a predetermined rule. The method for setting the detection area is described in detail below. Then in step S21, the camera 10 captures a predetermined area specified by the view angle a and the installed position. Next, in step S22, the viewpoint conversion unit 31 inputs the captured image data captured by the camera 10 in step S21, performs viewpoint conversion, and generates bird's-eye view image data.

Next, in step S23, the luminance difference calculation unit 35 sets the focus line La on the detection area A1. At this time, the luminance difference calculation unit 35 sets a line corresponding to a line extending in the perpendicular direction in real space as the focus line La. In step S24, the luminance difference calculation unit 35 subsequently sets the reference line Lr on the detection area A1. At this point, the luminance difference calculation unit 35 sets, as the reference line Lr, a line that corresponds to a line extending in the perpendicular direction in real space, the line also being separated by a predetermined distance in real space from the focus line La.

Next, in step S25, the luminance difference calculation unit 35 sets a plurality of focus points on the focus line La. Also, at this time, the luminance difference calculation unit 35 sets a certain number of focus points Pa that will not be problematic during edge detection by the edge line detection unit 36. Also, in step S26 the luminance difference calculation unit 35 sets reference points Pr so that the focus points Pa and the reference points Pr are at substantially the same height in real space. The focus points Pa and the reference points Pr thereby line up in substantially the horizontal direction, and the edge line extending in the perpendicular direction in real space is more readily detected.

Next, in step S27, the luminance difference calculation unit 35 calculates the luminance difference between the focus point Pa and the reference point Pr at the same height in real space. Next, the edge line detection unit 36 calculates the attribute s for each focus point Pa according to the above-described equation (1). Next, in step S28, the edge line detection unit 36 calculates the continuity c of the attributes s of the focus points Pa according to the above-described equation (2). Next, in step S29, the edge line detection unit 36 assesses whether the normalized sum of the continuity c is greater than a threshold value θ according to the above-described equation (3). When the normalized value is determined to be greater than the threshold value θ (S29: YES), the edge line detection unit 36 detects the focus line La as an edge line in step S30, and processing proceeds to step S31. When it is determined that the normalized value is not greater than the threshold value θ (S29: NO), the edge line detection unit 36 does not detect the focus line La as an edge line, and processing proceeds to step S31.

In step S31, the computer 30 determines whether the processing of the above-described steps S23 to S30 has been executed for all focus lines La that can be set in the detection area A1. When it is determined that the above-described processing has not been executed for all focus lines La (S31: NO), processing returns to step S23, a new focus line La is set, and processing is repeated up to step S31. When on the other hand it is determined that the above-described processing has been executed for all focus lines La (S31: YES), processing proceeds to step S32 in FIG. 18.

In step S32 of FIG. 18, the three-dimensional object detection unit 37 calculates luminance changes along the edge line for each edge line detected in step S30 of FIG. 17. The three-dimensional object detection unit 37 calculates edge line luminance changes according to any one among the above-described equations (4), (5) and (6). Next, in step S33, the three-dimensional object detection unit 37 excludes edge lines for which the luminance change is greater than a predetermined threshold value among the edge lines. That is, an edge line for which the luminance change is large is assessed not to be a correct edge line, and the edge line is not used in three-dimensional object detection. As described above, this is to suppress the detection as an edge line of characters on the road surface, weeds on the roadside, and the like included in the detection area A1. Therefore, the predetermined threshold value is a value set based on luminance changes occurring due to characters on the road surface, weeds on the roadside and the like, determined in advance by experiments and the like.

Next, in step S34, the three-dimensional object detection unit 37 determines whether the edge line amount is equal to or greater than a second threshold value β. For example, when a four-wheeled vehicle is set as a three-dimensional object for detection, the second threshold value β is set based on the number of edge lines of a four-wheeled vehicle appearing in the detection area A1, determined in advance by experiments and the like. When the edge line amount is assessed to be equal to or greater than the second threshold value β (S34: YES), the three-dimensional object detection unit 37 detects the presence of a three-dimensional object in the detection area A1 in step S35. When however the edge line amount is assessed as not being equal to or greater than the second threshold value β (S34: NO), the three-dimensional object detection unit 37 determines that a three-dimensional object is not present in the detection area A1. Then, the processing indicated in FIGS. 17 and 18 ends. The detected three-dimensional object may be determined to be another vehicle VX traveling in an adjacent lane adjacent to the lane in which the host vehicle V is traveling, or a determination may be made as to whether the three-dimensional object is another vehicle VX traveling in an adjacent lane taking into consideration the speed of the detected three-dimensional object relative to the host vehicle V.

As described above, in the method of three-dimensional object detection using edge information of the present embodiment, in order to detect a three-dimensional object present in the detection areas A1, A2, for a bird's-eye view image, perpendicular imaginary lines are set as line segments extending in perpendicular directions in real space. Then, at a plurality of positions along the perpendicular imaginary lines, the luminance difference between two pixels near each position is calculated, and whether a three-dimensional object is present is assessed based on the continuity of the luminance differences.

Specifically, for the detection areas A1, A2 in the bird's-eye view image, focus lines La corresponding to line segments extending in perpendicular directions in real space and reference lines Lr different from the focus lines La are set. Then, the luminance differences between focus points Pa on the focus lines La and reference points Pr on the reference lines Lr are determined continuously along the focus lines La and reference lines Lr. By thus continuously determining luminance differences between points, the luminance difference between a focus line La and a reference line Lr is determined. When the luminance difference between a focus line La and a reference line Lr is large, there is a strong possibility that an edge of a three-dimensional object is present at the location at which the focus line La is set. Thus, a three-dimensional object can be detected based on continuous luminance differences. In particular, in order to compare luminance between perpendicular imaginary lines extending in perpendicular directions in real space, even when the three-dimensional object is enlarged according to the height from the road surface by conversion to a bird's-eye view image, there is no effect on processing for detection of the three-dimensional object. Therefore, using the method of the present example, the precision of detection of the three-dimensional object can be improved.

In the present example, the luminance differences between two points at substantially the same height near perpendicular imaginary lines are determined. Specifically, the luminance difference between a focus point Pa on a focus line La and a reference point Pr on a reference line Lr at substantially the same height in real space is determined, and therefore luminance differences can be clearly detected in cases in which edges extending in perpendicular directions are present.

Figure 19:
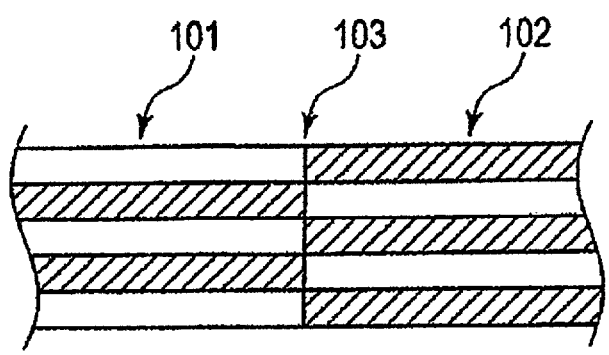
FIG. 19 is a view illustrating an example of an image describing the edge detection operation.

In the present example an attribute is assigned to a focus point Pa based on the luminance difference between the focus point Pa on a focus line La and a reference point Pr on a reference line Lr, and based on the continuity c of attributes along the focus line La, a determination is made as to whether the focus line La is an edge line. Therefore, a boundary between an area of high luminance and an area of low luminance can be detected as an edge line, and edge detection can be performed in accordance with the natural senses of humans. The advantageous results thereof are described in detail. FIG. 19 illustrates an image example for describing processing of the edge line detection unit 36. This image example is an image in which a first stripe pattern 101, exhibiting a stripe pattern in which areas of high luminance and areas of low luminance are repeated, and a second stripe pattern 102 exhibiting a stripe pattern in which areas of low luminance and areas of high luminance are repeated, are adjacent. In this image example, areas of high luminance in the first stripe pattern 101 are adjacent to areas of low luminance in the second stripe pattern 102, and areas of low luminance in the first stripe pattern 101 are adjacent to areas of high luminance in the second stripe pattern 102. The region 103 positioned at the boundary of the first stripe pattern 101 and the second stripe pattern 102 has the tendency of not being perceived as an edge due to human senses.

On the other hand, because areas of low luminance and areas of high luminance are adjacent, the region 103 is recognized as an edge when edge detection is performed using only luminance differences. However, the edge line detection unit 36 assesses the region 103 as an edge only in cases in which there is continuity of the luminance difference attribute, in addition to the luminance difference in the region 103. Consequently, the edge line detection unit 36 can suppress erroneous assessments in which the region 103, which is not recognized as an edge line by the human senses, is recognized as an edge line, and can perform edge detection in accordance with human senses.

In the present example, when the luminance change of an edge line detected by the edge line detection unit 36 is greater than a predetermined threshold value, it is determined that the edge line was detected by an erroneous assessment. When a captured image acquired by the camera 10 is converted into a bird's-eye view image, a three-dimensional object included in the captured image tends to appear in the bird's-eye view image in an enlarged state. For example, when as described above a tire of another vehicle VX is enlarged, because the single region of the tire is enlarged, the luminance change in the bird's-eye view image tends to be small in the direction of enlargement. However, when characters drawn on the road surface or the like are erroneously assessed as edge lines, in the bird's-eye view image the areas of high luminance which are the letter portions and the areas of low luminance which are the road surface portion are intermixed. In this case, in the bird's-eye view image the luminance change in the enlargement direction tends to be large. Therefore, it is possible to recognize edge lines detected by erroneous assessment and to raise the precision of detection of three-dimensional objects by assessing luminance changes in a bird's-eye view image along edge lines as in the present example.

In the present example, when the luminance change in an edge line detected by the edge line detection unit 36 is greater than the predetermined threshold value, the edge line is determined to have been detected by erroneous assessment. In a case in which a captured image acquired by the camera 10 is converted into a bird's-eye view image, a three-dimensional object included in the captured image tends to appear in the bird's-eye view image in an enlarged state. For example, as described above, when a tire of another vehicle VX is enlarged, the one region that is the tire is enlarged, and therefore there is a tendency for the luminance change in the bird's-eye view image in the direction of enlargement to be small. However, in a case in which characters drawn on the road surface or the like are erroneously assessed as edge lines, in the bird's-eye view image the areas of high luminance which are the letter portions and the areas of low luminance which are the road surface portion are intermixed. In this case, in the bird's-eye view image the luminance change in the enlargement direction tends to be large. Therefore, it is possible to recognize edge lines detected by erroneous assessment and to raise the precision of detection of three-dimensional objects by assessing luminance changes in a bird's-eye view image along edge lines as in the present example. The three-dimensional object detection units 33, 37 can also transmit detection results to an external vehicle controller to report to passengers and to control the vehicle.

Final Determination of Three-Dimensional Objects

Returning to FIG. 3, the three-dimensional object detection device 1 of the present example is provided with at least one of the above-described two three-dimensional object detection units 33 (or three-dimensional object detection units 37), the three-dimensional object assessment unit 34, the stationary object assessment unit 38, and the control unit 39. Based on the detection results of the three-dimensional object detection unit 33 (or three-dimensional object detection unit 37), the three-dimensional object assessment unit 34 performs final determination as to whether a detected three-dimensional object is another vehicle VX present in the detection areas A1, A2. The three-dimensional object detection unit 33 (or three-dimensional object detection unit 37) performs three-dimensional object detection reflecting determination results of the stationary object assessment unit 38. The stationary object assessment unit 38 determines whether a three-dimensional object detected by the three-dimensional object detection unit 33 (or three-dimensional object detection unit 37) is the shadow of trees present along the road traveled by the host vehicle V.

The stationary object assessment unit 38 in the present embodiment detects the shadows of trees (hereinbelow be referred to as "tree shadows"). When trees are present between the host vehicle V and the sun or another light source, there are cases in which the shadows of trees may appear in the detection areas A1, A2. Trees have a plurality of different constituent forms such as trunks, thick branches, thin branches, long branches, short branches, leaves, and the like. Each of these components behaves differently in the same environment. For example, even when the wind is blowing strongly (wind speed), the trunk hardly moves at all and the position thereof is unchanged, but thick branches and short branches sway somewhat, and the positions thereof also fluctuate somewhat. Thin branches, long branches and leaves sway greatly, and the positions thereof change greatly. Thus, the shape of a portion of a tree does not change, but other portions change, and accordingly a portion of the shadow of the tree does not change in shape or position, but other portions change in shape or position. Analyzing a captured image of the shadows of trees by portion, periodic features and regular features appear strongly in the shadows of trunk portions, but periodic features and regular features do not appear strongly in the shadows of leaf portions. Accordingly, when the shadows of trees are analyzed as a single video, it is difficult to discover prominent features even in periodic features or in regular features. That is, it is difficult to determine the features of the shadows of trees based on periodic features, or based on regular features.

Below, periodic features (periodicity) and regular or irregular features (irregularity) of the shadows of trees are compared with those of other stationary objects.

Figure 20:
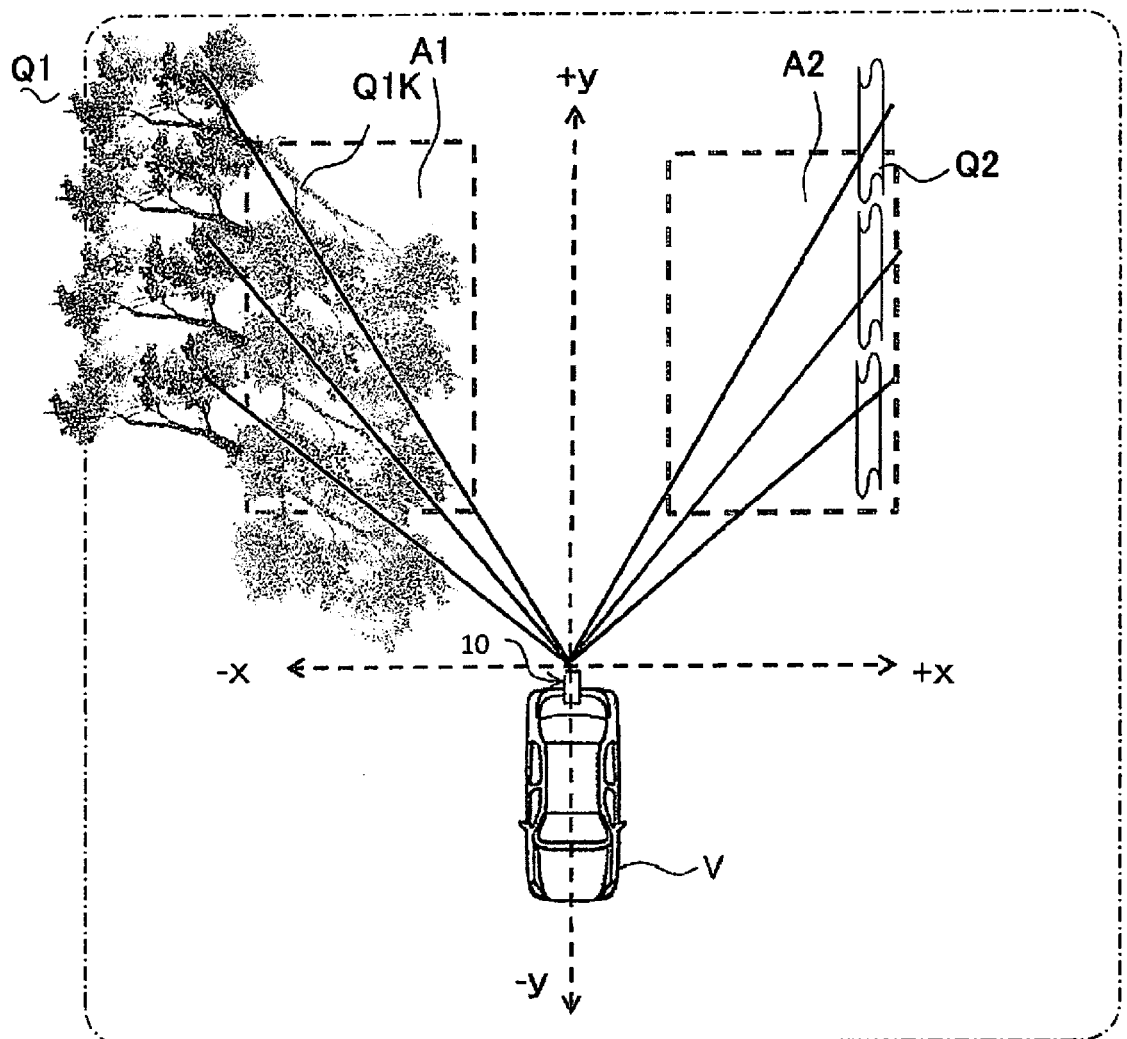
FIG. 20 is a first view illustrating a detection area in which a tree shadow appears.

As illustrated in FIG. 20, a structure (stationary object) such as a guard rail provided at constant intervals on a shoulder of the traveled road has a constant shape, and features extracted from a captured image thereof appear periodically, so that periodicity is higher than for the above-described tree shadows. An artificial structure such as a guard rail is immovable in its entirety and preserves the same shape over time, and there is no variability in features extracted from a captured image thereof, and therefore irregularity is lower (regularity is higher) than for the above-described tree shadows.

Figure 21:
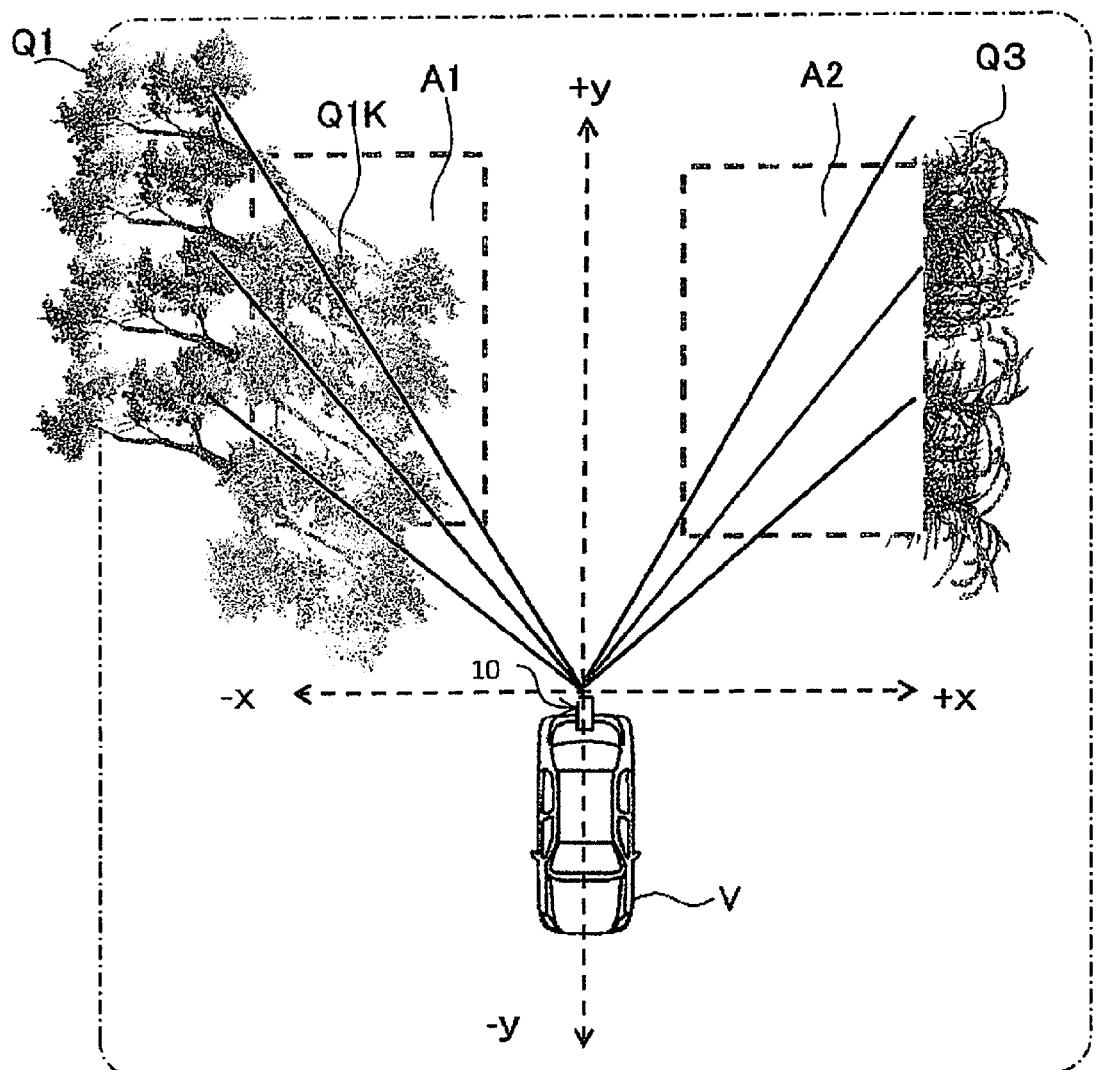
FIG. 21 is a second view illustrating a detection area in which a tree shadow appears.

As illustrated in FIG. 21, grass (a stationary object) grows along the shoulder of traveled roads, and the shape thereof is indefinite, and consequently features extracted from a captured image thereof appear aperiodically, and therefore periodicity can be said to be lower than for the above-described tree shadows. Natural objects such as grass are of indefinite shape overall and do not preserve the same shape over time, and therefore variability is seen in features extracted from captured images thereof, and therefore irregularity can be said to be higher (regularity is lower) than for the above-described tree shadows. This is because grass has no portions with high rigidity like the trunk of a tree, and there is a marked tendency for the shape to change according to wind, rain, and other aspects of the external environment. Image information of snow that has accumulated on a road shoulder also tends to exhibit the same features as image information of grass.

Figure 22:
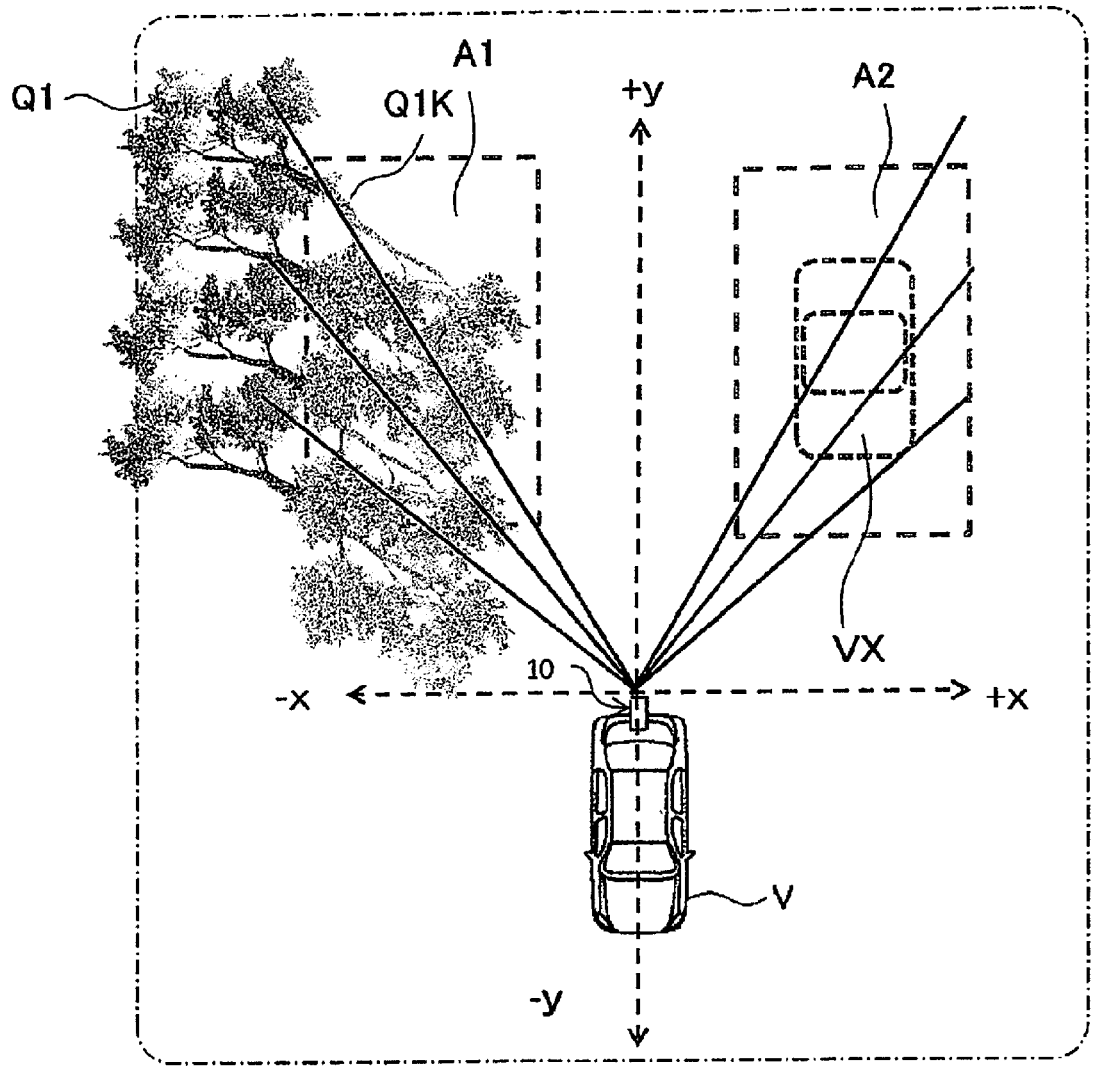
FIG. 22 is a third view illustrating a detection area in which a tree shadow appears.

The other vehicle VX that is finally detected by the three-dimensional object detection device 1 of the present embodiment travels in an adjacent lane adjacent to the travel lane of the host vehicle V, as illustrated in FIG. 22, but the timing with which the other vehicle VX is present in the detection areas A1, A2 cannot be controlled, and it may not be possible to periodically extract features from captured images, and so it can be said that periodicity is lower than the shadows of trees, described above, present along the road traveled by the host vehicle V. However, other vehicles VX have a common basic structure, and preserve the same shape over time, and therefore there is no variability in features extracted from captured images thereof, and irregularity is lower (regularity is higher) than for the above-described tree shadows.

When the periodicity evaluation value is low and the irregularity is also low, there is a strong possibility that the detected three-dimensional object is another vehicle.

FIG. 23 illustrates the relationship H between periodicity evaluation values and irregularity evaluation values for guard rails and other structures Q2, tree shadows Q1, grass and snow Q3, and another vehicle VX.

As illustrated in FIG. 23, in relation to periodicity, a guard rail or other structure Q2 is disposed regularly on the road shoulder, and therefore there is a tendency to exhibit a periodicity evaluation value equal to or greater than a predetermined threshold value (second periodicity evaluation threshold value). The travel interval of other vehicles VX cannot be controlled, and thus the periodicity evaluation value tends to be less than a predetermined threshold value (first periodicity evaluation threshold value). As illustrated in the drawing, in relation to irregularity, the shapes of a guard rail or other structure Q2 and of another vehicle VX are constant, and thus tend to exhibit a low irregularity evaluation value.

Although the inventors have proposed a method for using points with high periodicity such as guard rails and other structures Q2, and a method for using points with high irregularity such as grass, snow and other natural objects Q3 as methods for differentiating stationary objects among a variety of three-dimensional objects included in a captured image, there has been the problem as described above of differentiating the shadows of trees (tree shadows) Q1, which have intermediate periodicity as well as intermediate irregularity, from grass and snow Q3.

The three-dimensional object detection device 1 of the present embodiment has as an object the detection of other vehicles VX, and therefore it may be thought that differentiation as "stationary objects other than other vehicles VX" is sufficient, without differentiating guard rails and other structures Q2 or grass and snow Q3.

However, in order to precisely detect "another vehicle VX" that affects travel of the host vehicle V, image processing and object detection processing must be designed according to the features of images for detection, depending on whether objects other than other vehicles VX are moving bodies or stationary objects, are three-dimensional objects or planar objects, or whether the objects other than other vehicles VX are grass/snow or are tree shadows. For example, the shape of a guard rail Q2 can be predicted, and therefore processing can be performed to predict the image area in which a guard rail Q2 is included and apply feedback to image processing. It is thought that there is a limit to the height of grass Q3, and therefore processing can be performed to validate the certainty of a determination that an object is grass Q3. In these ways, processing can be performed according to the features of objects. Thus, in order to improve the precision of detection of three-dimensional objects, objects to be excluded from detection (objects not for detection) must be accurately differentiated.

In the three-dimensional object detection device 1 of the present embodiment, features of other vehicles VX, guard rails Q2, grass/snow Q3, and tree shadows Q1 are each analyzed from the two perspectives of periodicity and irregularity, and based on periodicity and irregularity, tree shadows Q1 can be accurately differentiated from the figures of various objects included in captured images.

The stationary object assessment unit 38 can perform processing to determine shadows of trees based on differential waveform information, or processing to determine shadows of trees based on edge information.

First, processing for determining tree shadows based on differential waveform information is described. The stationary object assessment unit 38 calculates a periodicity evaluation value for evaluating the periodicity of differential waveform information based on differential waveform information generated by the three-dimensional object detection unit 33, and calculates an irregularity evaluation value for evaluating the irregularity of the differential waveform information based on the differential waveform information.

No limit in particular is imposed on the method for calculating the periodicity evaluation value based on differential waveform information, and determination can be performed based on the extent of repetition with a predetermined period of features extracted from the differential waveform information. For example, when the number of peaks extracted from differential waveform information is equal to or greater than a predetermined value, variability between peaks is less than a predetermined value, and the difference in area of peak portions of the differential waveform information (ratio of area differences for peaks) is smaller according to the vehicle speed of the host vehicle V, the periodicity can be determined to be high.

No limit in particular is imposed on the method for calculating the irregularity evaluation value based on differential waveform information, and determination can be performed based on the extent of variability in features extracted from differential waveform information. For example, when the number of peaks extracted from differential waveform information is less than a predetermined value, variability between peaks is equal to or greater than a predetermined value, and the difference in area of peak portions of the differential waveform information (ratio of area differences for peaks) is greater according to the vehicle speed of the host vehicle V, the irregularity can be determined to be high. A specific method for calculating periodicity and irregularity based on differential waveform information is described in detail below.

Processing for determining shadows of trees based on edge information is described next. The stationary object assessment unit 38 calculates a periodicity evaluation value for evaluating the periodicity of edge information based on edge information generated by the three-dimensional object detection unit 37, and calculates an irregularity evaluation value for evaluating the irregularity of the edge information based on the edge information.

No limit in particular is imposed on the method for calculating the periodicity evaluation value based on edge information, and determination can be performed based on the extent of repetition with a predetermined period of features extracted from edge information. For example, when the number of peaks extracted from edge information is equal to or greater than a predetermined value, variability between peaks is less than a predetermined value, and the difference in edge amounts of peak portions of edge information is smaller according to the vehicle speed of the host vehicle V, the periodicity can be determined to be high. A specific method for calculating periodicity based on edge information is described in detail below.

No limit in particular is imposed on the method for calculating the irregularity evaluation value based on edge information, and determination can be performed based on the extent of variability of features extracted from edge information. For example, when the number of peaks extracted from edge information is less than a predetermined value, variability between peaks is equal to or greater than a predetermined value, and the difference in edge amounts of peak portions of edge information is greater according to the vehicle speed of the host vehicle V, the irregularity can be determined to be high.

A specific method for calculating periodicity and irregularity based on edge information is described in detail below.

The stationary object assessment unit 38 determines that a three-dimensional object detected by the three-dimensional object detection unit 33 is the shadow of trees present along the road traveled by the host vehicle V when the calculated periodicity evaluation value is greater than or equal to a first periodicity evaluation threshold value and less than a second periodicity evaluation threshold value, and the calculated irregularity evaluation value is less than a predetermined irregularity evaluation threshold value. As a result, shadows of trees Q3, which have intermediate periodicity and irregularity, can be differentiated. The first periodicity evaluation value is smaller than the second periodicity evaluation value.

The first periodicity evaluation threshold value and second periodicity evaluation threshold value described below can be set to different values for cases in which periodicity is determined based on differential waveform information and for cases in which periodicity is determined based on edge information. The irregularity evaluation threshold value can be set to different values for cases in which irregularity is determined based on differential waveform information and for cases in which irregularity is determined based on edge information.

Although no limit in particular is imposed, the second periodicity evaluation threshold value can be set based on periodicity determined experimentally for guard rails and other structures Q2. When a periodicity evaluation value is equal to or greater than the preset second periodicity evaluation threshold value, a detected three-dimensional object can be determined to be a guard rail or other structure Q2. The periodicity of guard rails and other structures Q2 and the periodicity of tree shadows Q3 can be differentiated comparatively clearly, and therefore by setting the second periodicity evaluation threshold value based on the periodicity of guard rails and other structures Q2, tree shadows Q3 and grass/snow Q2 can be accurately differentiated from guard rails and other structures Q2.

The first periodicity evaluation threshold value can be set based on the periodicity of other vehicles VX or other moving bodies, determined experimentally. That is, a detected three-dimensional object can be determined to be a moving body such as, e.g., another vehicle VX when the periodicity evaluation value is less than the first periodicity evaluation threshold value. Although the periodicity of other vehicles VX and the periodicity of grass/snow Q2 are both low, a difference enabling differentiation can be discerned, and therefore by setting the first periodicity evaluation threshold value based on the periodicity of other vehicles VX, tree shadows Q3 and grass/snow Q2 can be accurately differentiated from other vehicles VX.

Similarly, the irregularity evaluation threshold value can be set based on the irregularity of grass/snow Q3 or the irregularity of tree shadows Q1, determined experimentally. That is, a three-dimensional object detected by the three-dimensional object detection unit 33 can be determined to be grass or snow Q3 present along the road traveled by the host vehicle V when the periodicity evaluation value is equal to or greater than the first periodicity evaluation threshold value and less than the second periodicity evaluation threshold value and the irregularity evaluation value is equal to or greater than the irregularity evaluation threshold value, and a three-dimensional object detected by the three-dimensional object detection unit 33 can be determined to be tree shadows Q1 present along the road traveled by the host vehicle V when the irregularity evaluation value is less than the irregularity evaluation threshold value. Grass/snow Q2 and tree shadows Q1 all have irregularity, and differentiation of same is not easy, but by differentiating tree shadows Q1 or grass/snow Q2 based on the irregularity evaluation value after narrowing down to tree shadows Q1 and grass/snow Q2 based on the irregularity evaluation value as in the present embodiment, tree shadows Q1 can be accurately differentiated from grass/snow Q2.

When the brightness detected by the brightness sensor 50 is less than a predetermined value, the stationary object assessment unit 38 of the present embodiment changes the first periodicity evaluation threshold value to a high value. When the brightness is less than a predetermined value, that is, when conditions are dark, the periodicity of grass/snow Q3 and tree shadows Q1 is difficult to detect, and therefore the stationary object assessment unit 38 can change the first periodicity evaluation threshold value, which is a lower-limit threshold value for determining grass/snow Q3 and tree shadows Q1, to a high value. Under dark conditions, the periodicity of other vehicles VX is also difficult to detect, and therefore for safety it is preferable that it be made easier to determine that a three-dimensional object is another vehicle VX. As a result, snow/grass Q3 and tree shadows Q1 can be accurately determined without failing to detect other vehicles VX even in dark conditions.

In addition, the stationary object assessment unit 38 of the present embodiment references map information 383 associating each position with information as to whether the position is in an urban area or in a suburban area, and when the current position detected by the current position detection device 60 is in an urban area, changes the first periodicity evaluation threshold value to a low value. Whether each position is in an urban area or is in a suburban area can be defined in advance according to the quantity of structures along the road and the like.

In general, numerous buildings, billboards, signs, and other structures are provided along roads in urban areas, and the shadows of these structures may be included in the detection areas A1, A2. Periodicity is low because these structures are not disposed at constant intervals, and when the shadows of these structures overlap with the shadows of trees and grasses along the road, there is a tendency for the periodicity to be lowered. That is, in urban areas where there are numerous billboards, signs, and other structures, there is a tendency for the periodicity of tree shadows Q1 or of grass/snow Q3 included in the detection areas A1, A2 of the road to become low. Accordingly, when the current position belongs to an urban area, the stationary object assessment unit 38 of the present embodiment can change the first periodicity evaluation threshold value, which is a lower-limit threshold value to determine grass/snow Q3 and tree shadows Q1, to a low value. As a result, even in urban zones, the periodicity of grass/snow Q3 and tree shadows Q1 can be accurately determined.

When the periodicity evaluation value is less than the first periodicity evaluation threshold value, the stationary object assessment unit 38 of the present embodiment determines that the detected three-dimensional object is a moving body. Similarly, when the periodicity evaluation value is less than the first periodicity evaluation threshold value and the irregularity evaluation value is less than the predetermined irregularity evaluation threshold value, the stationary object assessment unit 38 determines that the detected three-dimensional object is a moving body. In particular, when either among the periodicity evaluation value and the irregularity evaluation value is low, the stationary object assessment unit 38 determines that the probability of another vehicle among moving bodies is high.

The three-dimensional object assessment unit 34 is described next. The three-dimensional object assessment unit 34 of the present embodiment makes final determination as to whether a three-dimensional object detected by the three-dimensional object detection unit 33, 37 is another vehicle VX present in the detection areas A1, A2. Specifically, when the three-dimensional object detection result by the three-dimensional object detection unit 33, 37 continues over a predetermined length of time T, the three-dimensional object assessment unit 34 determines that the three-dimensional object is another vehicle VX present in the detection areas A1, A2. Although no limit in particular is imposed, when the number of peaks and peak values of the differential waveform extracted from differential waveform information, the travel speed and the like are in predetermined value ranges, and the state has continued for a predetermined time or longer, the three-dimensional object assessment unit 34 may make a final determination as to whether the three-dimensional object is another vehicle VX present in the detection areas A1, A2, or when edge continuity, normalized value of the sum, amount of edges and the like extracted from edge information are within predetermined value ranges, and the state has continued over a predetermined time or longer, the three-dimensional object assessment unit 34 may make a final determination as to whether the three-dimensional object is another vehicle VX present in the detection areas A1, A2.

When the three-dimensional object detected by the three-dimensional object detection unit 33, 37 is continuously detected over a predetermined time or longer, the three-dimensional object assessment unit 34 of the present embodiment determines that the three-dimensional object is another vehicle VX present in the right-side detection area or the left-side detection area.

Specifically, when the three-dimensional object assessment unit 34 has determined that the detected three-dimensional object is another vehicle VX present in a detection area A1, A2, processing to report to passengers or the like is executed. The three-dimensional object assessment unit 34 can suppress determination of the detected three-dimensional object as another vehicle VX according to a control command of the control unit 38.

The control unit 39 is described next. When in the previous processing a figure of tree shadows Q1 was included in a captured image, and it was determined by the stationary object assessment unit 38 that shadows of trees were included in the detection areas A1, A2, the control unit 39 of the present embodiment can generate a control command to be executed in the next processing by any one or more among the three-dimensional object detection unit 33, 37, the three-dimensional object assessment unit 34, the stationary object assessment unit 38, and the control unit 39 itself.

A control command of the present embodiment is a command to control operations of units such that a detected three-dimensional object is determined to be another vehicle VX. When shadows of trees are included in the detection areas A1, A2, there is a strong possibility that the detected three-dimensional object is the shadows of trees, and therefore a control command is issued to prevent erroneous determination as another vehicle VX. The computer 30 of the present embodiment is a computer, and therefore control commands for three-dimensional object detection processing, three-dimensional object determination processing, and stationary object determination processing may be incorporated in processing programs in advance, or may be transmitted at the time of execution. Control commands of the present embodiment may be commands to lower the sensitivity when a three-dimensional object is detected based on differential waveform information, or commands to lower the sensitivity when a three-dimensional object is detected based on edge information. When determination that a three-dimensional object is another vehicle VX is suppressed, a control command may be a command having the result of stopping processing to determine the detected three-dimensional object to be another vehicle or having the result of causing a detected three-dimensional object to be determined not to be another vehicle.

When the detected three-dimensional object is determined by the stationary object assessment unit 38 to have a strong possibility of being shadows of trees, the control unit 39 of the present embodiment transmits a control command to suppress the detection of the three-dimensional object and determination that the detected three-dimensional object is another vehicle VX to the three-dimensional object detection unit 33, 37 or to the three-dimensional object assessment unit 34, whereby it becomes difficult for the three-dimensional object detection unit 33, 37 to detect the three-dimensional object. It becomes difficult for the three-dimensional object assessment unit 34 to determine that a detected three-dimensional object is another vehicle VX present in the detection area A.

When the detected three-dimensional object is determined by the stationary object assessment unit 38 to have a strong possibility of being shadows of trees, the control unit 39 may generate and output to the three-dimensional object detection unit 33, 37 a control command with the content of stopping processing to detect three-dimensional objects, or may generate and output to the three-dimensional object assessment unit 34 a control command with the content of determining that the detected three-dimensional object is not another vehicle, whereby an action effect similar to that described above can be obtained.

Below, specific control commands outputted by the control unit 39 are described.

If in the previous processing the detected three-dimensional object was determined by the stationary object assessment unit 38 to have a strong possibility of being shadows of trees, the control unit 39 determines that there is a strong possibility that shadows of trees are included in the detection areas A1, A2, and that there is a strong possibility of the occurrence of an error in processing based on image information. When three-dimensional object detection is performed using the ordinary method without modification, there are cases in which a three-dimensional object detected based on the figure of tree shadows Q included in the detection areas A1, A2 is erroneously determined to be another vehicle VX. Accordingly, in the next processing, the control unit 39 of the present embodiment changes threshold values relating to differences in pixel values when generating differential waveform information to be higher in order to suppress erroneous determination that a three-dimensional object detected based on the figure of tree shadows Q is another vehicle VX. Thus, when tree shadows Q1 are included in the detection areas A1, A2, detection of a three-dimensional object or determination that a three-dimensional object is another vehicle VX can be suppressed by changing determination threshold values to be higher, and therefore erroneous detection arising from tree shadows Q1 can be prevented.

First, control commands for cases in which a three-dimensional object is detected based on differential waveform information are described. As described above, the three-dimensional object detection unit 33 detects a three-dimensional object based on differential waveform information and a first threshold value $\alpha$. When it is determined by the stationary object assessment unit 38 that the detected three-dimensional object has a strong possibility of being shadows of trees, the control unit 39 of the present embodiment generates a control command to make the first threshold value α high such that it becomes difficult to detect a three-dimensional object, and outputs the control command to the three-dimensional object detection unit 33. The first threshold value α is the first threshold value α for determining the peak of the differential waveform $DW_t$ in step S7 of FIG. 1 (see FIG. 5). The control unit 39 can also output to the three-dimensional object detection unit 33 a control command to make higher or lower a threshold value p relating to the difference in pixel values in differential waveform information.

When it is determined by the stationary object assessment unit 38 that the detected three-dimensional object has a strong possibility of being shadows of trees, the control unit 39 of the present embodiment can output to the three-dimensional object detection unit 33 a control command to count the number of pixels indicating a predetermined difference in the differential image of the bird's-eye view images and output lower values for the frequency distribution. Frequency-distributed values obtained by counting the number of pixels indicating a predetermined difference in the differential image of bird's-eye view images are the vertical-axis values of the differential waveform $DW_t$ generated in step S5 of FIG. 11. When it was determined in the previous processing that the detected three-dimensional object has a strong possibility of being shadows of trees, the control unit 39 determines based on the tree shadows Q1 included in the detection areas A1, A2 that there is a strong possibility of erroneous detection of another vehicle VX. Accordingly, in the next processing, the frequency-distributed values of the differential waveform $DW_t$ are changed to be low and outputted such that it becomes difficult to detect a three-dimensional object or other vehicle VX in the detection areas A1, A2. Thus, when it is determined that there is a strong possibility that a detected three-dimensional object is the shadows of trees, the output values are made low, whereby the detection sensitivity of other vehicles VX traveling adjacent to the lane of travel of the host vehicle V is adjusted, and consequently erroneous detection of another vehicle VX arising from tree shadows Q1 included in the detection areas A1, A2 can be prevented.

Control commands in cases in which the three-dimensional object is detected based on edge information are described next. Similarly to the above-described processing based on differential waveform information, when in the previous processing it was determined that the detected three-dimensional object has a strong possibility of being shadows of trees, the control unit 39 determines that there is a strong possibility of erroneous detection of another vehicle VX based on tree shadows Q1 included in the detection areas A1, A2. Accordingly, when it has been determined that there is a strong possibility that the detected three-dimensional object is shadows of trees, the control unit 39 outputs to the three-dimensional object detection unit 37 a control command to raise the predetermined threshold value relating to luminance used when detecting edge information. The predetermined threshold value relating to luminance used when detecting edge information is the threshold value θ for determining the normalized value of the sum of the continuity c of attributes of focus points Pa in step S29 of FIG. 17, or the second threshold value β for evaluating the amount of edge lines in step S34 of FIG. 18. That is, when it has been determined that the detected three-dimensional object has a strong possibility of being shadows of trees, the control unit 39 in the present embodiment generates and outputs to the three-dimensional object detection unit 37 a control command to make higher the threshold value θ used when detecting edge lines or the second threshold value β for evaluating the amount of edge lines, so as to make detection of three-dimensional objects difficult. Thus, when it has been determined that the detected three-dimensional object has a strong possibility of being shadows of trees, detection of a three-dimensional object or determination that a three-dimensional object is another vehicles VX can be suppressed by changing a threshold value for determination to a higher value, and therefore erroneous detection arising from tree shadows Q1 included in the detection areas A1, A2 can be prevented.

When the detected three-dimensional object has been determined by the stationary body determination unit 38 to have a strong possibility of being shadows of trees, the control unit 39 of the present embodiment outputs to the three-dimensional object detection unit 37 a control command to output a lower or higher amount of detected edge information. The detected amount of edge information is the normalized value of the sum of the continuity c of attributes of focus points Pa in step S29 of FIG. 17, or the amount of edge lines in step S34 of FIG. 18. When in the previous processing it has been determined that the detected three-dimensional object has a strong possibility of being shadows of trees, the control unit 39 determines that there is a strong possibility of erroneous detection of another vehicle VX based on tree shadows Q1 included in the detection areas A1, A2. Accordingly, in the next processing, the normalized value of the sum of continuity c of attributes of focus lines Pa or the amount of edge lines is changed to be low and outputted such that detection of a three-dimensional object, and determination that the three-dimensional object is another vehicle VX, are suppressed.

Specifically, when there is a strong possibility that the detected three-dimensional object is the shadow of trees, the frequency-distributed values of the differential waveform $DW_t$ are changed to be low and outputted. Thus, when there is a strong possibility that the detected three-dimensional object is the shadow of trees, detection of the three-dimensional object or determination that the three-dimensional object is another vehicle VX can be suppressed by making the outputted value low, and therefore erroneous detection arising from tree shadows Q1 included in the detection areas A1, A2 can be prevented.

When it has been determined by the stationary object assessment unit 38 that the detected three-dimensional object is a moving body, the control unit 39 of the present embodiment causes the three-dimensional object assessment unit 39 to make a final determination that the three-dimensional object is another vehicle. That is, the control unit 39 receives the determination of the stationary object assessment unit 38 that "the three-dimensional object is a moving body," and performs processing exhibiting the opposite effect of the above-described processing to "suppress determination that the three-dimensional object is another vehicle." Specifically, the control unit 39 exerts control, such that the three-dimensional object is easily determined to be another vehicle, by changing the threshold value relating to differences in pixel values when generating differential waveform information to a lower value, changing frequency-distributed values of the differential waveform $DW_t$ to higher values for output, lowering the predetermined threshold value relating to luminance used when detecting edge information, raising and outputting the amount of detected edge information, or the like.

In particular, when the stationary object assessment unit 38 determines that the periodicity evaluation value is less than the first periodicity evaluation threshold value and the irregularity evaluation value is less than the predetermined irregularity evaluation threshold value, and that the detected three-dimensional object is a moving body, the control unit 39 causes the three-dimensional object assessment unit 34 to determine that the three-dimensional object detected by the three-dimensional object detection unit 33, 37 is another vehicle.

Below, operation of the three-dimensional object detection device 1 of the present embodiment, and in particular operation of the control unit 39 and of the three-dimensional object assessment unit 34 and three-dimensional object detection unit 33, 37 upon acquisition of control commands, is described based on FIG. 24. The processing illustrated in FIG. 24 is current three-dimensional object detection processing performed after the previous three-dimensional object detection processing, using the results of the previous processing.

Figure 24:
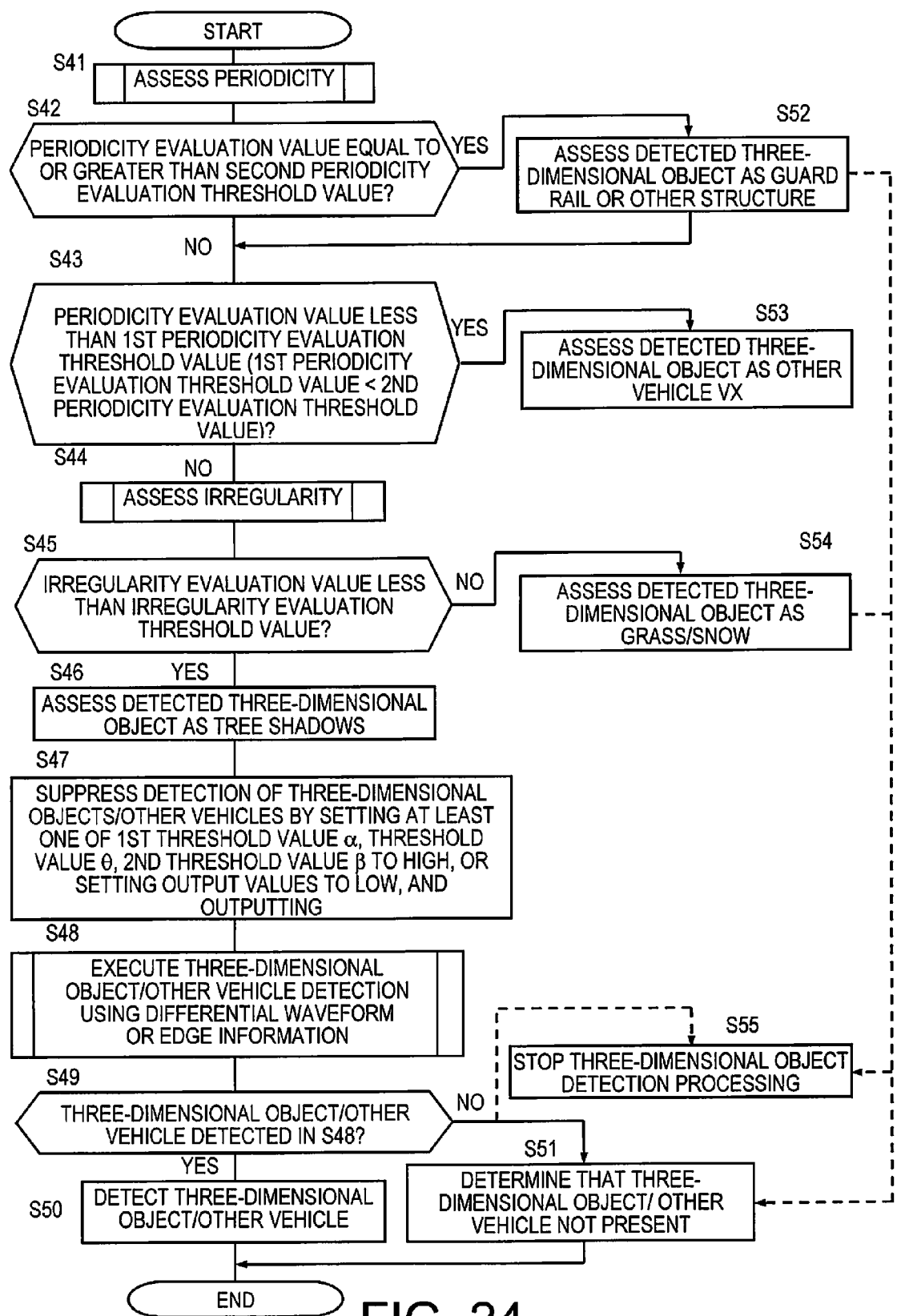
FIG. 24 is a flowchart of another example illustrating a control procedure including tree-shadow assessment processing.

First, in step S41 illustrated in FIG. 24, the stationary object assessment unit 38 assesses periodicity based on differential waveform information or edge information. Specifically, a periodicity evaluation value for assessing periodicity is calculated. No limit in particular is imposed, but the periodicity evaluation value can be determined to be higher when the number of peaks extracted from differential waveform information or edge information is equal to or greater than a predetermined value, variability between peaks is less than a predetermined value, and the area differences of peak portions of the differential waveform information (ratio of area differences to peaks) or differences in edge amounts of peak portions of edge information (ratio of edge differences to peak edge amounts) according to the speed of the host vehicle V are small. The specific method for periodicity evaluation is described in detail below.

Next, in step S42, the stationary object assessment unit 38 determines whether the calculated periodicity evaluation value is equal to or greater than the second periodicity evaluation threshold value. When the calculated periodicity evaluation value is equal to or greater than the second periodicity evaluation threshold value, processing proceeds to step S52, and the detected three-dimensional object is determined to be a guard rail or other structure Q2. When the calculated periodicity evaluation value is less than the second periodicity evaluation threshold value, processing proceeds to step S43.

In step S43, the stationary object assessment unit 38 determines whether the calculated periodicity evaluation value is less than the first periodicity evaluation threshold value. The first periodicity evaluation threshold value is a value lower than the second periodicity evaluation threshold value (a value evaluating the periodicity as low). When the calculated periodicity evaluation value is less than the first periodicity evaluation threshold value, processing proceeds to step S53, and the detected three-dimensional object is determined to have a strong possibility of being another vehicle VX. When the calculated periodicity evaluation value is equal to or greater than the first periodicity evaluation threshold value, that is, when the periodicity evaluation value is greater than or equal to the first periodicity evaluation threshold value and less than the second periodicity evaluation threshold value, processing proceeds to step S44. The processing to this step can narrow down the three-dimensional object to tree shadows Q1 and grass/snow Q3 based on periodicity.

Next, in step S44, the stationary object assessment unit 38 determines irregularity based on differential waveform information or edge information. No limit in particular is imposed, but the irregularity evaluation value can be determined based on the extent of variability of features extracted from differential waveform information or edge information. For example, the irregularity evaluation value can be determined to be higher when the number of peaks extracted from differential waveform information or edge information is less than a predetermined value, variability between peaks is equal to or greater than a predetermined value, and the area differences of peak portions of the differential waveform information (ratio of area differences to peaks) or differences in edge amounts of peak portions of edge information (ratio of edge differences to peak edge amounts) according to the speed of the host vehicle V are small. The specific method for irregularity evaluation is described in detail below.

In step S45, the stationary object assessment unit 38 determines whether the calculated irregularity evaluation value is less than the irregularity evaluation threshold value. When the calculated irregularity evaluation value is equal to or greater than the irregularity evaluation threshold value, processing proceeds to step S54, and the detected three-dimensional object is determined to be grass/snow Q2. When the calculated irregularity evaluation value is less than the irregularity evaluation threshold value, that is, the periodicity evaluation value is equal to or greater than the first periodicity evaluation threshold value and less than the second periodicity evaluation threshold value, and the irregularity evaluation value is less than the irregularity evaluation threshold value, processing proceeds to step S46.

In step S46, the stationary object assessment unit determines that the detected three-dimensional object is tree shadows Q1. In the next step S47, when the stationary object assessment unit 38 has determined that the three-dimensional object detected in the previous processing is shadows of trees (tree shadows Q1), the control unit 39 determines that there is a strong possibility of erroneous detection of another vehicle VX based on tree shadows Q1 included in the detection areas A1, A2, and exerts control to set the threshold values used in three-dimensional object detection processing and three-dimensional object determination processing to high values, or lowers and outputs the output values compared with threshold values, such that detection of a three-dimensional object and determination that the three-dimensional object is another vehicle VX in the next processing is suppressed. Specifically, a control command is transmitted to the three-dimensional object detection unit 33, 37 to change to a higher value any one or more among the first threshold value $\alpha$ used when determining the three-dimensional object from differential waveform information, the threshold value $\theta$ for generating edge information, and the second threshold value $\beta$ used when determining the three-dimensional object from edge information, so as to suppress three-dimensional object detection. In place of raising threshold values, the control unit 39 may generate and output to the three-dimensional object detection unit 33, 37 a control command to lower the output values for evaluation using threshold values. As described above, the first threshold value $\alpha$ is used to determine peaks in the differential waveform $DW_t$ in step S7 of FIG. 11. The threshold value $\theta$ is a threshold value for determining the normalized value of the sum of continuity c of attributes of focus points Pa in step S29 of FIG. 17, and the second threshold value $\beta$ is a threshold value for evaluating the amount of edge lines in step S34 of FIG. 18.

When output values are made high, the control unit 39 outputs to the three-dimensional object detection unit 33 a control command to count the number of pixels indicating the predetermined difference in the differential image of bird's-eye view images and make high and output the frequency-distributed value. The frequency-distributed value obtained by counting the number of pixels indicating the predetermined difference in the differential image of bird's-eye view images is the vertical-axis value of the differential waveform $DW_t$ generated in step S5 of FIG. 11. Similarly, the control unit 39 can output to the three-dimensional object detection unit 37 a control command to make high and output the detected edge information amount. The detected edge information amount is the normalized value of the sum of the continuity c of the attributes of focus points Pa in step S29 of FIG. 17, or the amount of edge lines in step S34 of FIG. 18. When it was determined in the previous processing that the light environment changes rapidly, the control unit 39 can output to the three-dimensional object detection unit 37 a control command to change and make high the normalized value of the sum of the continuity c of the attributes of focus points Pa or the amount of edge lines, such that it is difficult to detect a three-dimensional object in the next processing.

After changing the threshold values or output values, processing proceeds to step S48, a three-dimensional object is detected based on differential waveform information or edge information, and in step S49 a determination is made as to whether the three-dimensional object detected in step S48 is another vehicle VX. When the three-dimensional object is another vehicle VX, the determination result that another vehicle is present is outputted in step S50, and when the three-dimensional object is not another vehicle VX, the determination result that another vehicle is not present is outputted in step S51. The processing in step S48 and step S49 is common to processing to detect another vehicle VX based on differential waveform information described in FIGS. 11 and 12 above and to processing to detect another vehicle VX based on edge information described in FIGS. 17 and 18.

However, when a three-dimensional object is not detected in step S49, processing proceeds to step S55, and processing to detect a three-dimensional object may be stopped, or processing may proceed to step S51, and a determination made that the detected three-dimensional object is not another vehicle VX and that another vehicle VX is not present.

Finally, the method for evaluating periodicity and the method for evaluating irregularity are described. As the method for evaluating the periodicity of feature points extracted from a captured image and the method for evaluating the irregularity of feature points extracted from a captured image, methods known at the time of filing can be applied appropriately. For example, the method for evaluation of periodicity of a subject using a method of detection of periodic objects disclosed in PCT/JP2012/053834, previously filed by the present applicant, and the method for evaluation of irregularity using a method of detection of irregularity of a subject disclosed in Japanese Patent Application No. 2011-198007, can be applied appropriately.

In the following, processing of the stationary object assessment unit 38 is mainly described regarding the method of evaluating periodicity or irregularity, but the stationary object assessment unit 38 can cause a portion of the processing to be performed by the positional alignment unit 32 or three-dimensional object detection unit 33, or the luminance difference calculation unit 35, edge line detection unit 36, or three-dimensional object detection unit 37, and can then acquire the processing result and perform final determination of the periodicity or irregularity.

Figure 25:
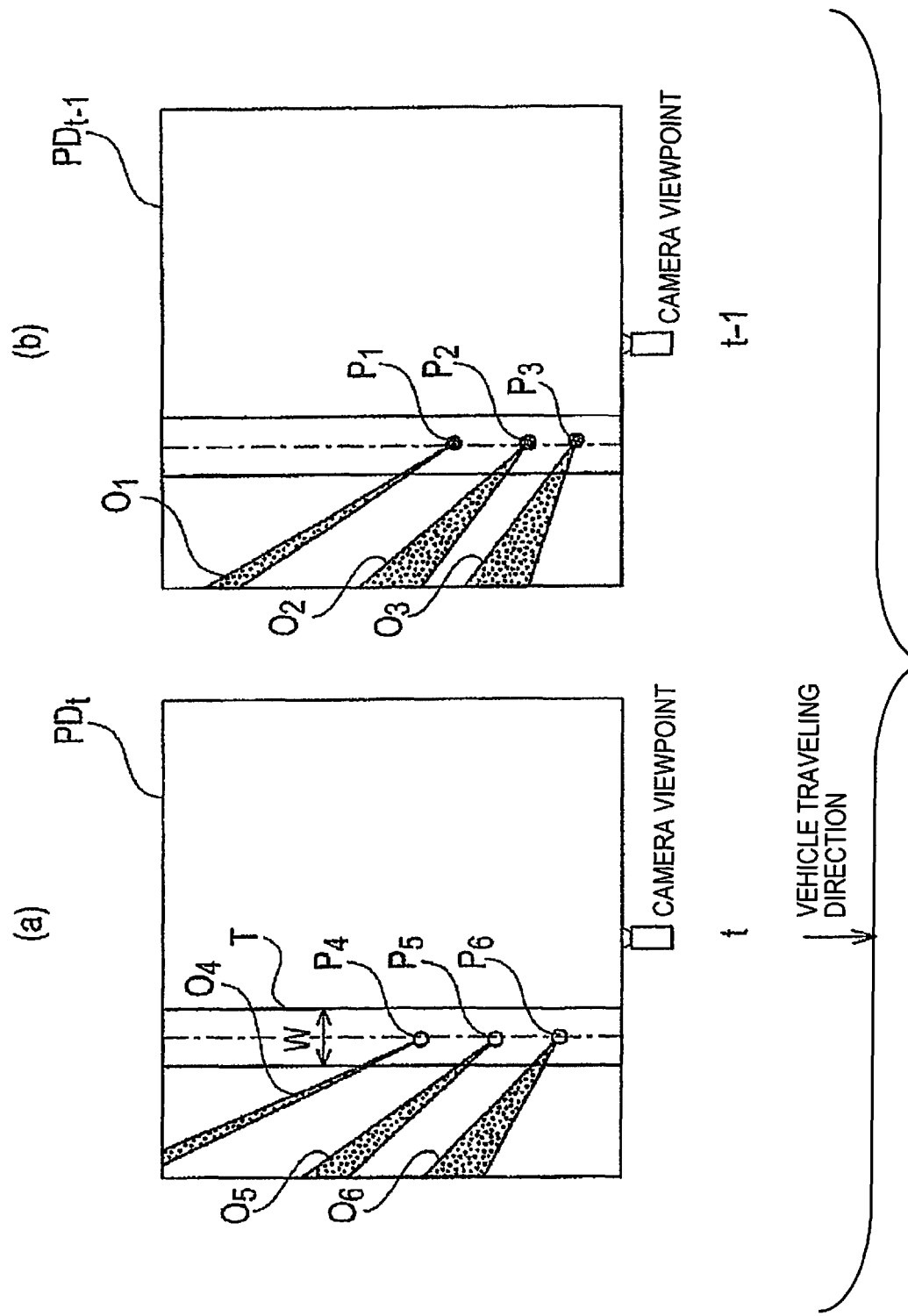
FIG. 25 is a diagram describing movement-amount candidate calculation processing, with part (a) illustrating a differential image PDt at time t, and part (b) illustrating a differential image PDt-1 at time t-1.

First, an example of the method of evaluation of periodicity based on differential waveform information is described. In the present example the stationary object assessment unit 38 calculates candidates for movement amounts of a plurality of three-dimensional objects detected by the three-dimensional object detection unit 33. Part (a) of FIG. 25 illustrates the differential image $PD_t$ at a time t, and part (b) of FIG. 25 illustrates the differential image $PD_{t-1}$ at time t−1. The stationary object assessment unit 38 detects ground points (feature points) of the three-dimensional object. Here ground points are points of contact of the three-dimensional object with the ground surface. Among the detected three-dimensional objects, the stationary object assessment unit detects the position closest to the camera 10 of the host vehicle V as a ground point.

As illustrated in FIG. 25, the stationary object assessment unit 38 detects a ground point P1 of the three-dimensional object O1, detects a ground point P2 of the three-dimensional object O2, and detects a ground point P3 of the three-dimensional object O3. Next, the stationary object assessment unit 38 sets an area T of width W for the differential image $PD_t$ at time t illustrated in part (a) of FIG. 25. At this time the stationary object assessment unit 38 sets areas T at locations corresponding to the ground points P1-P3 in the differential image $PD_{t-1}$ at time t−1.

Next, the stationary object assessment unit 38 detects ground points of three-dimensional objects from the data of the differential image $PD_t$ at time t. In this case also, the position closest to the camera 10 of the host vehicle V is detected as the ground point. In the present example, the stationary object assessment unit 38 detects a ground point P4 of the three-dimensional object O4, detects a ground point P5 of the three-dimensional object O5, and detects a ground point P6 of the three-dimensional object O6. The positional alignment unit 32, three-dimensional object detection unit 33 and stationary object assessment unit 38 extract feature points (ground points) of a plurality of three-dimensional objects from images and data of predetermined areas of bird's-eye view images.

The stationary object assessment unit 38 associates ground points with each other. That is, the ground point P4 is associated with the ground point P1, the ground point P5 is associated with the ground point P1, and the ground point P6 is associated with the ground point P1. Similarly, the ground points P4-P6 are associated with the ground points P2, P3.

The stationary object assessment unit 38 calculates the distances (that is, movement-amount candidates) of the associated ground points P1-P6. The stationary object assessment unit 38 then takes the calculated distances to be movement-amount candidates. The stationary object assessment unit 38 calculates a plurality of movement-amount distances for each three-dimensional object. Thus, the movement amount for a three-dimensional object is decided uniquely, in order to suppress situations in which the movement amount is erroneously calculated for periodic stationary objects the same image features of which appear periodically.

The reason for providing areas T is to associate ground points P1-P6 with stability even when errors occur in the alignment of the bird's-eye view images $PB_t$, $PB_{t-1}$ due to pitching, yawing, and the like of the host vehicle V. Association of the ground points P1-P6 is decided by processing to match luminance distributions around ground points of the bird's-eye view images $PB_t$, $PB_{t-1}$.

The stationary object assessment unit 38 counts the calculated movement-amount candidates and creates a histogram (waveform data). For example, when the distance between the ground point P1 and the ground point P4, the distance between the ground point P2 and the ground point P5, and the distance between the ground point P3 and the ground point P6 are the same, the stationary object assessment unit 38 sets the count value to "3." Thus, the stationary object assessment unit 38 counts movement-amount candidates and creates a histogram, and calculates waveform data corresponding to the distribution of ground points in the detection area.

The stationary object assessment unit 38 calculates the movement range in the bird's-eye view of periodic stationary objects based on the capture interval of the camera 10 and the travel speed of the host vehicle V as detected by the vehicle speed sensor 20. The stationary object assessment unit 38 calculates the movement range having a margin in a predetermined range (e.g. ±10 km/h) with respect to the speed of the host vehicle V. For example, when the capture interval of the camera 10 is 33 ms and the real distance covered by one pixel in the vehicle direction of advance is 5 cm, the speed of the three-dimensional object that moves one pixel in one control period is approximately 5.5 km/h. Considering that the precision of the bird's-eye view images PBt, PBt−1 worsens with vehicle movement, in order to accommodate this speed of approximately 5.5 km/h, a margin of approximately ±10 km/h is necessary.

The stationary object assessment unit 38 evaluates the periods of a plurality of three-dimensional objects detected by the three-dimensional object detection unit 33 and determines whether each three-dimensional object is a periodic stationary object. The stationary object assessment unit 38 determines whether the plurality of three-dimensional objects detected by the three-dimensional object detection unit 33 are periodic stationary objects based on the created histogram, calculated movement ranges, and periodicity evaluation values. Periodic stationary objects include, as objects having periodicity, the other vehicles VX, grass/snow Q3, tree shadows Q1, and guard rails and other structures Q2, indicated in FIG. 23.

Figure 26:
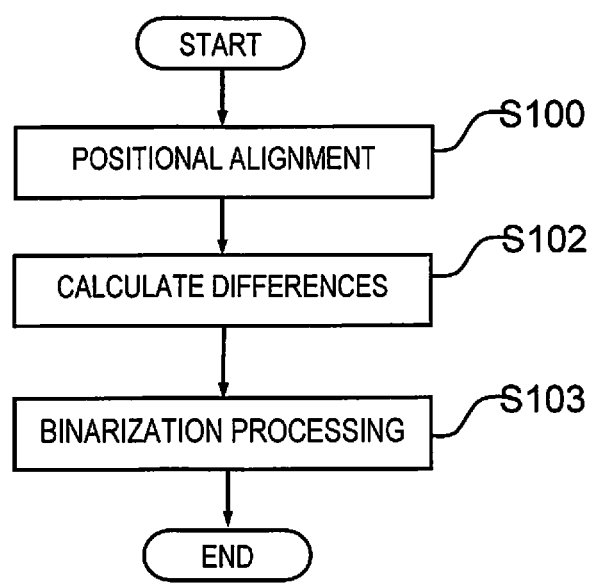
FIG. 26 is a flowchart illustrating processing of the positional alignment unit and the three-dimensional object detection unit.

The method of evaluation of periodicity, that is, the method of detection of periodic stationary objects is described next with reference to flowcharts. FIG. 26 is a flowchart illustrating processing of the positional alignment unit 32 and the three-dimensional object detection unit 33. The positional alignment unit 32 inputs data of bird's-eye view images PBt, PBt−1 at different times, as detected by the viewpoint conversion unit 31, and performs alignment (S100). The three-dimensional object detection unit 33 then takes the difference of the data of the aligned bird's-eye view images PBt, PBt−1 (S102). Then, the three-dimensional object detection unit 33 executes binarization processing based on a predetermined value and generates the data of a differential image PDt (S103).

Figure 27:
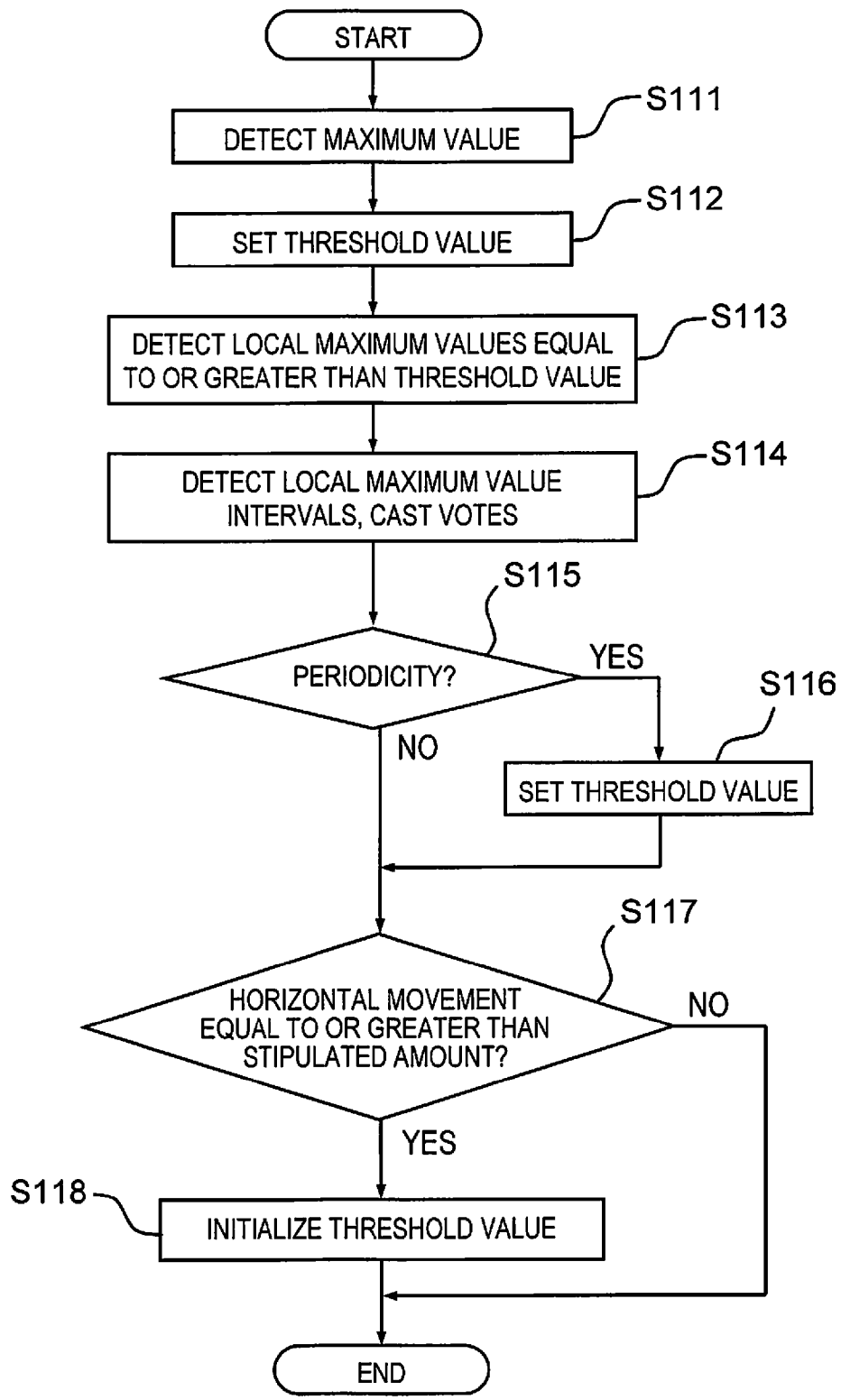
FIG. 27 is a flowchart illustrating processing of the periodicity evaluation unit.
Figure 28:
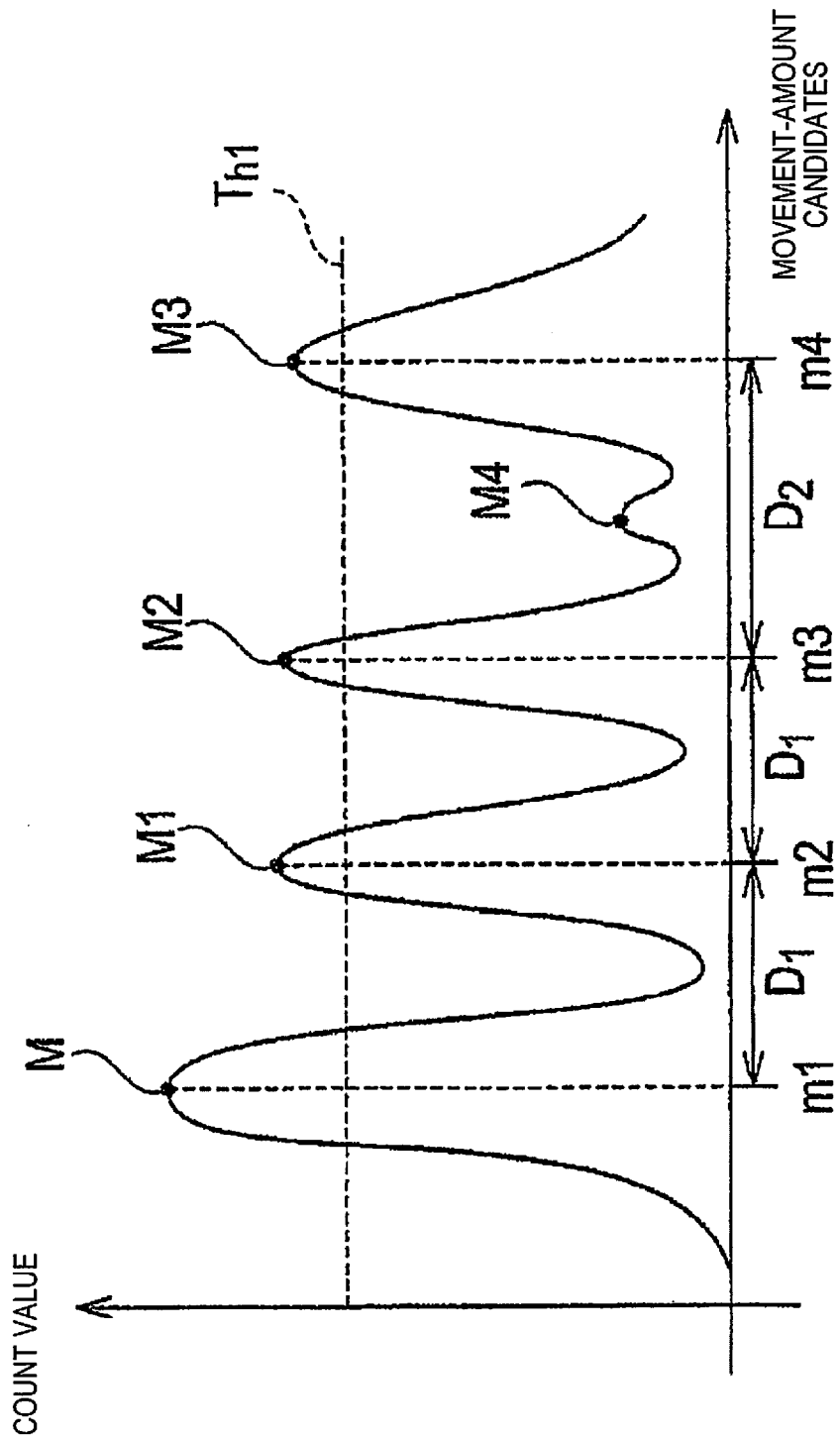
FIG. 28 is a diagram illustrating a generated histogram.

FIG. 27 is a flowchart illustrating processing to evaluate periodicity, detect periodic stationary object candidates, and assess the periodicity thereof, and FIG. 28 is a diagram illustrating an example of a generated histogram. As illustrated in FIG. 28, items for which the calculated movement-amount candidates are the same are counted. In the example illustrated in FIG. 28, there are a plurality of detections for the movement amounts m1, m2, m3, m4, and therefore the count values are high.

The stationary object assessment unit 38 detects the maximum value M (peak value; peak information) from the histogram (S111). Next, the stationary object assessment unit 38 sets a predetermined threshold value Th1 based on the maximum value M detected in step S111 (S112). Here the predetermined threshold value Th1 is set to 70% of the maximum value M. For example, when the count value of the maximum value M is "7," the predetermined threshold value Th1 is set to "4.9." In order to determine the predetermined threshold value Th1 from the maximum value M of the count values, a threshold value can be set that is appropriate even when the count value magnitudes change due to the positional relationship of the host vehicle V and the three-dimensional object, sunlight conditions, and the like. In the present embodiment, the predetermined threshold value Th1 is the value of 70% of the maximum value M, but is not limited thereto.

The stationary object assessment unit 38 detects the local maximum values M1-M3 (peak values; peak information) equal to or greater than the predetermined threshold value Th1 (S113). Here, when the maximum value M is, e.g., "7," the stationary object assessment unit 38 detects local maximum values M1-M3 having a count value of "5" or higher. The stationary object assessment unit 38 then determines that three-dimensional objects associated with movement-amount candidates corresponding to the local maximum values M1-M3 (including the maximum value M) (e.g., two three-dimensional objects having two ground points the distance between which matches any one of the local maximum values M1-M3) are periodic stationary object candidates.

The stationary object assessment unit 38 detects the interval (peak information) between the local maximum values M, M1-M3 (including the maximum value M), and casts a vote for the detected interval (S114). That is, in the example illustrated in FIG. 28, the number of votes for the interval D1 is "2," and the number of votes for the interval D2 is "1."

The stationary object assessment unit 38 assesses (evaluates) the periodicity (S115). At this time, the stationary object assessment unit 38 evaluates the periodicity based on whether the number of votes cast in step S114 is equal to or greater than a predetermined number of votes. The number of votes is one mode of a periodicity evaluation value, and the predetermined number of votes is one mode of a periodicity evaluation threshold value. The predetermined number of votes includes the predetermined number of votes as the above-described second periodicity evaluation threshold value set from the perspective of differentiating a guard rail or other structure Q2, and the predetermined number of votes as the first periodicity evaluation threshold value set from the perspective of differentiating other vehicles VX. Here the predetermined number of votes is taken to be half the number of detections of three-dimensional objects detected from the bird's-eye view image PBt. Accordingly, when the number of detections of three-dimensional objects detected from the bird's-eye view image PBt is "4," then the predetermined number of votes is "2." The predetermined number of votes is not limited to the above, and may be a fixed value.

If the assessment is that there is periodicity (S115: YES), the stationary object assessment unit 38 lowers the predetermined threshold value Th1 of step S112 (S116). The interval for lowering the predetermined threshold Th1 is generally approximately 1 second, and each time there is an assessment that there is periodicity, the predetermined threshold value Th1 is reset. Thus, the periodicity is determined from the positions of occurrence, that is, the intervals, of the local maximum values M, M1-M3 of the count values, and when it is determined that there is periodicity the predetermined threshold value Th1 is lowered, so that once periodicity has been determined it becomes easier to determine that there are periodic stationary objects. However, until periodicity is once determined, the predetermined threshold value Th1 is not lowered, and consequently erroneous detection of three-dimensional objects arising from errors in alignment and the like can be suppressed.

However, when the assessment is that there is no periodicity (S115: NO), processing proceeds to step S117 without lowering the predetermined threshold value Th1.

The stationary object assessment unit 38 determines periodicity from the number of votes (peak information) of occurrence positions (intervals) of the local maximum values M, M1-M3 equal to or greater than the predetermined threshold value Th1 based on the maximum value M of the fount values of movement-amount candidates. Accordingly, comparatively small local maximum values (e.g., the symbol M4 in FIG. 28) can be ignored, and determination of periodicity can be performed still more precisely without easily being affected by noise.

In step S117, the stationary object assessment unit S38 determines, based on information acquired from the controller of the host vehicle V, whether horizontal movement of the host vehicle V equal to or greater than a stipulated amount has been detected (S117). That is, the controller of the host vehicle V determines that lateral movement equal to or greater than the stipulated amount has been detected when a turn signal is turned on and a steering angle equal to or greater than a stipulated amount, determined from the vehicle speed detected by the vehicle speed sensor, has been detected.

When horizontal movement equal to or greater than the stipulated amount has been detected (S117: YES), the stationary object assessment unit 38 initializes the threshold value Th1 that was lowered in step S116 (S118). As a result, periodic stationary objects can be detected according to changes in the environment after changing lanes. However, when horizontal movement equal to or greater than the stipulated amount has not been detected (S117: NO), processing ends without initializing the predetermined threshold value Th1.

Figure 29:
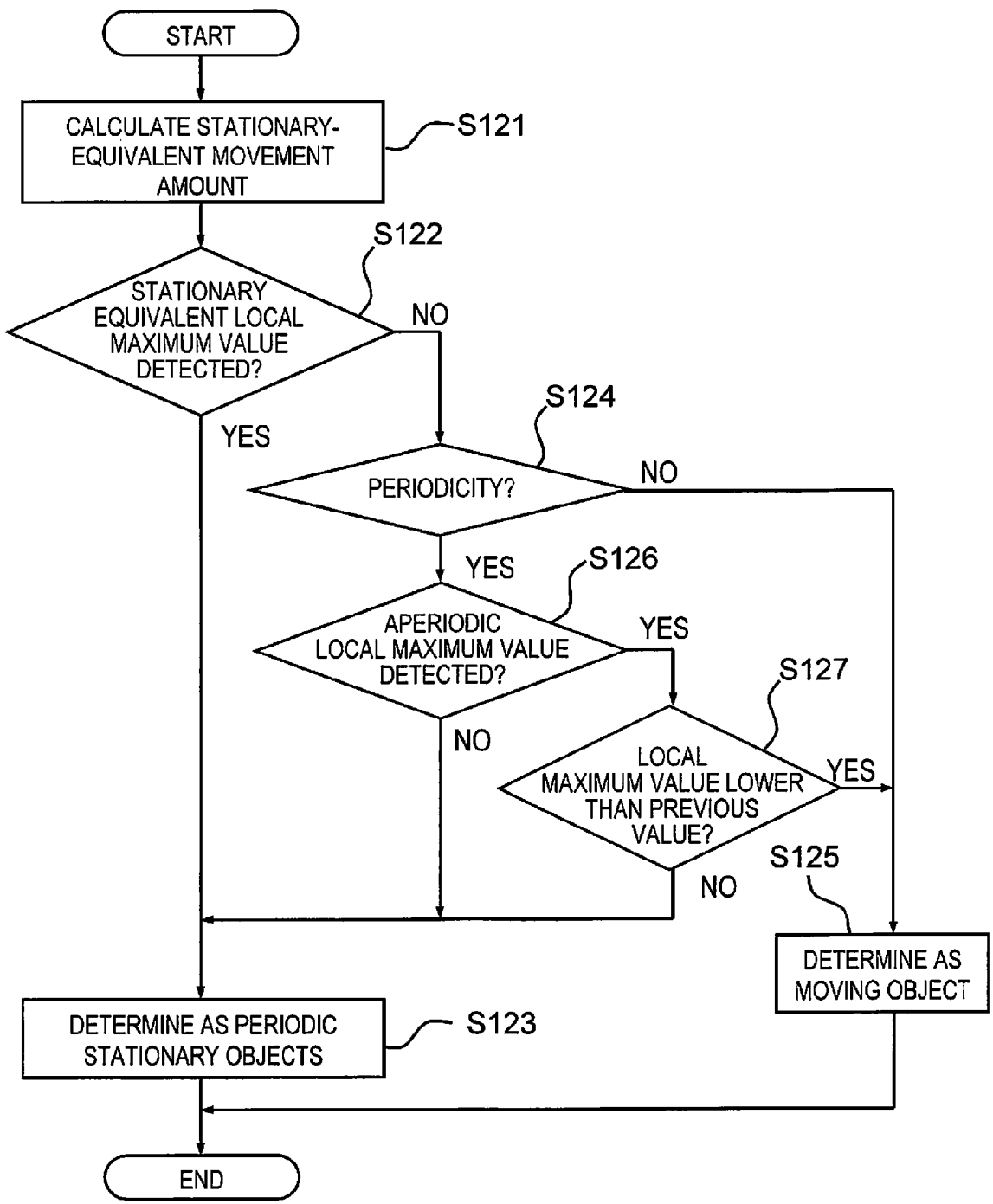
FIG. 29 is a diagram illustrating an operation procedure in periodicity evaluation processing.

FIG. 29 is a flowchart illustrating processing for periodic stationary object determination. The stationary object assessment unit 38 calculates a stationary equivalent movement amount (S121). That is, the stationary object assessment unit 38 calculates a bird's-eye view movement range of the periodic stationary object based on the capture interval of the camera 10 and the travel speed of the host vehicle V detected by the vehicle speed sensor 20. At this time, the stationary object assessment unit 38 calculates the movement range having a margin in a predetermined range with respect to the speed of the host vehicle V.

The stationary object assessment unit 38 determines whether the local maximum values M, M1, M3 (histogram peaks) are present in the range of the movement amounts detected in step S121 (S122). When the stationary object assessment unit 38 determines that any one of the local maximum values M, M1-M3 is present within the range of movement amounts (S122: YES), it is determined that periodic stationary objects are present (S123). Periodic stationary objects are often lined up with the same interval, and tend to have a large particular count value. Because periodic stationary objects are stationary, the count values of movement-amount candidates should be within a movement range which takes into consideration the speed of moving bodies and the like. Accordingly, when a "YES" determination is made in step S122, a plurality of three-dimensional objects is periodic stationary objects.

In step S122, when the stationary object assessment unit 38 determines that none of the local maximum values M, M1-M3 is present in the range of movement amounts (S122: NO), whether there is periodicity is determined in step S124. When it is not assessed that there is periodicity (S124: NO), then it is determined that the three-dimensional object is a moving object (S125). However, when in step S124 it is determined that there is periodicity (S124: YES), an aperiodic local maximum value is detected from the local maximum values with the predetermined threshold value Th1 or greater (S126). The aperiodic local maximum value is, e.g., equivalent to the local maximum value M3 illustrated in FIG. 28. This local maximum value M3 has an interval with adjacent local maximum values that is different from the other local maximum values M, M1, M2. Accordingly, the stationary object assessment unit 38 assesses the local maximum value M3 as an aperiodic local maximum value without periodicity.

If an aperiodic local maximum value could not be detected (S126: NO), then there is periodicity and an aperiodic local maximum value is not present, and therefore the stationary object assessment unit 38 determines that a periodic stationary object is present (S123).

However, when an aperiodic local maximum value could be detected (S126: YES), the stationary object assessment unit 38 determines whether the periodic local maximum values M, M1, M2 are lower than the previous values (S127). In this processing, the stationary object assessment unit 38 calculates the average value of the periodic local maximum values M, M1, M2 in the current processing, and also calculates the average value of the periodic local maximum values in the previous processing. The stationary object assessment unit 38 determines whether the average value of the current processing is reduced by a predetermined value or more from the average value of the previous processing.

When it is determined that the periodic local maximum values M, M1, M2 are lower than the previous values (S127: YES), the stationary object assessment unit 38 determines that another vehicle or the like has entered between the host vehicle V and periodic stationary objects, and detects a moving object (S125).

However, when it is determined that the periodic local maximum values M, M1, M2 are not lower than the previous values (S127: NO), the stationary object assessment unit 38 determines that another vehicle VX or the like has entered on the far side of the periodic stationary objects as seen from the host vehicle V, and detects the periodic stationary objects (S123).

Figure 30:
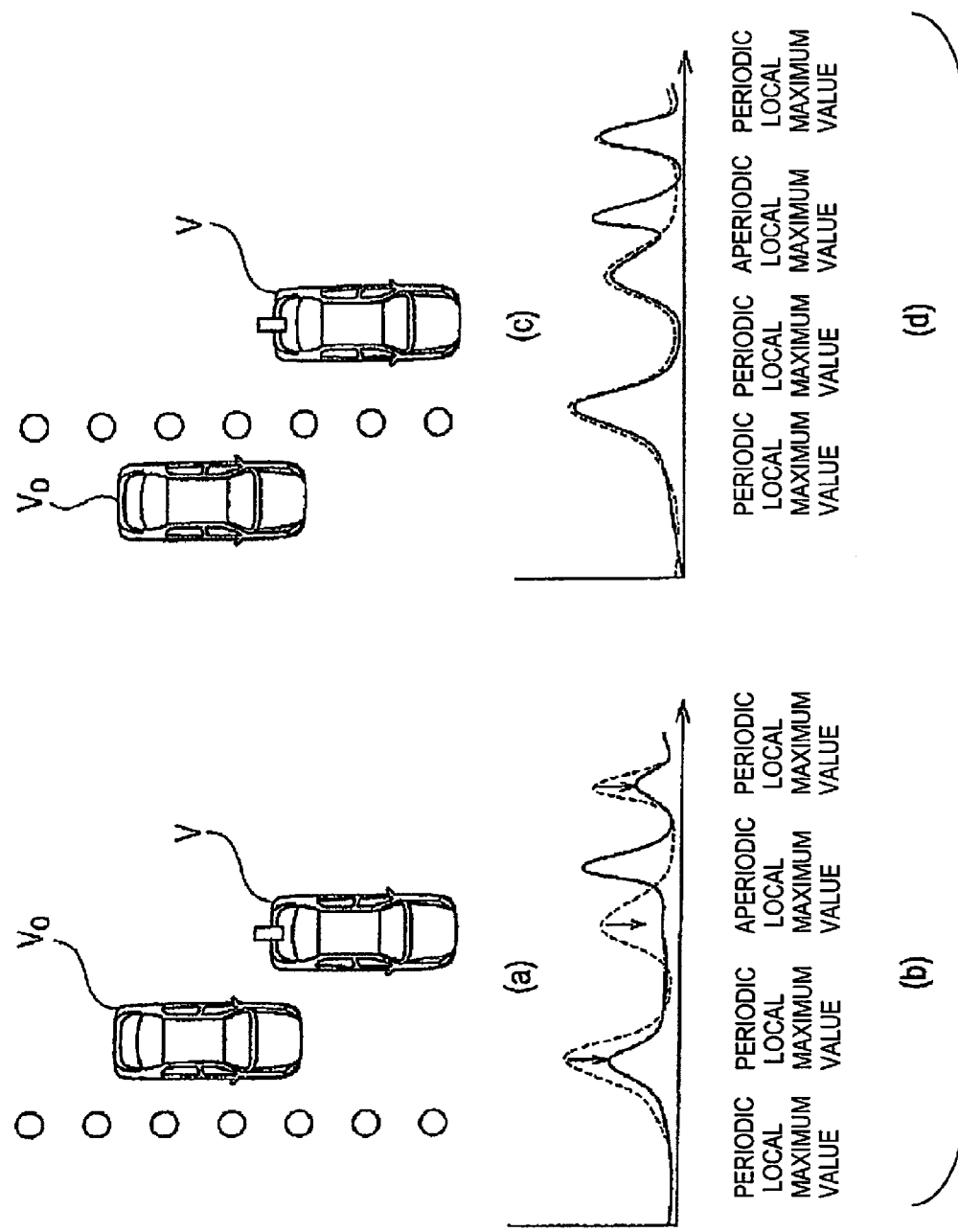
FIG. 30 is a view illustrating step S127 illustrated in FIG. 29, with part (a) illustrating a case in which another vehicle has entered on the near side of periodic stationary objects, part (b) illustrating a histogram for the situation of part (a), part (c) illustrating a case in which another vehicle has entered on the far side of periodic stationary objects, and part (d) illustrating a histogram for the situation of part (c).

FIG. 30 is a view for describing in detail step S127 illustrated in FIG. 29. Part (a) of FIG. 30 illustrates a case in which another vehicle V0 has entered on the near side of periodic stationary objects. Part (b) of FIG. 30 illustrates a histogram for the situation of FIG. 30. Part (c) of FIG. 30 illustrates a case in which another vehicle V0 has entered on the far side of periodic stationary objects. Part (d) of FIG. 30 illustrates a histogram for the situation of part (c) of FIG. 30. In part (b) of FIG. 30 and part (d) of FIG. 30, dashed lines are histograms prior to entry of the other vehicle, and solid lines are histograms after entry of the other vehicle.

It is assumed that another vehicle V0 has entered on the near side of the periodic stationary objects, as illustrated in part (a) of FIG. 30. At this time, image capture of the periodic stationary objects is blocked by the other vehicle V0, and therefore there is a tendency for the count value of the periodic local maximum value to be small, as illustrated in part (b) of FIG. 30. In particular, when the other vehicle V0 enters on the near side of the periodic stationary objects, there is the possibility that the other vehicle V0 is present at a position at which the host vehicle V could change lanes. Accordingly, in this case the stationary object assessment unit 38 detects the other vehicle V0 (moving object).

According to the three-dimensional object detection device 1 of the present embodiment, ground points (feature points) of a plurality of three-dimensional objects are extracted from images and data of a predetermined area of bird's-eye view images, histograms (waveform data) are calculated corresponding to the distribution of ground points in the predetermined detection areas, and based on whether the number of votes or the like (peak information) for the histogram peak values and peak intervals are equal to or greater than predetermined threshold values, a determination is made as to whether the plurality of three-dimensional objects are periodic stationary object candidates. The number of votes or the like (peak information) for the histogram peak values and peak intervals can be applied as a mode of a periodic evaluation value, and the above-described predetermined threshold values can be applied as a mode of periodic evaluation threshold values. According to the present method, the periodicity (repeating nature) of periodic stationary objects can be clearly extracted as peak information of waveform data, and periodic stationary object candidates can be more easily extracted from three-dimensional objects included in captured images. As a result, periodic stationary objects can be extracted more precisely.

An example of a method for evaluating periodicity based on edge information is described next. In the present example, the stationary object assessment unit 38 detects a distribution of edges. The stationary object assessment unit 38 can cause the edge detection unit 36 to detect the edge distribution and acquire the results. In order to detect the edges (feature points) of periodic stationary objects included in a bird's-eye view image, the stationary object assessment unit 38 calculates luminance differences for bird's-eye view image data obtained by viewpoint conversion by the viewpoint conversion unit 31. For each of a plurality of positions along perpendicular imaginary lines extending in perpendicular directions in real space, the stationary object assessment unit 38 calculates the luminance difference between two pixels near the position. Specifically, in a viewpoint-converted bird's-eye view image, a first perpendicular imaginary line equivalent to a line segment extending in a perpendicular direction in real space and a second perpendicular line segment equivalent to a line segment extending in a perpendicular direction in real space are set. The stationary object assessment unit 38 determines continuous luminance differences along the first perpendicular imaginary line between points on the first perpendicular imaginary line and points on the second perpendicular imaginary line.

Figure 31:
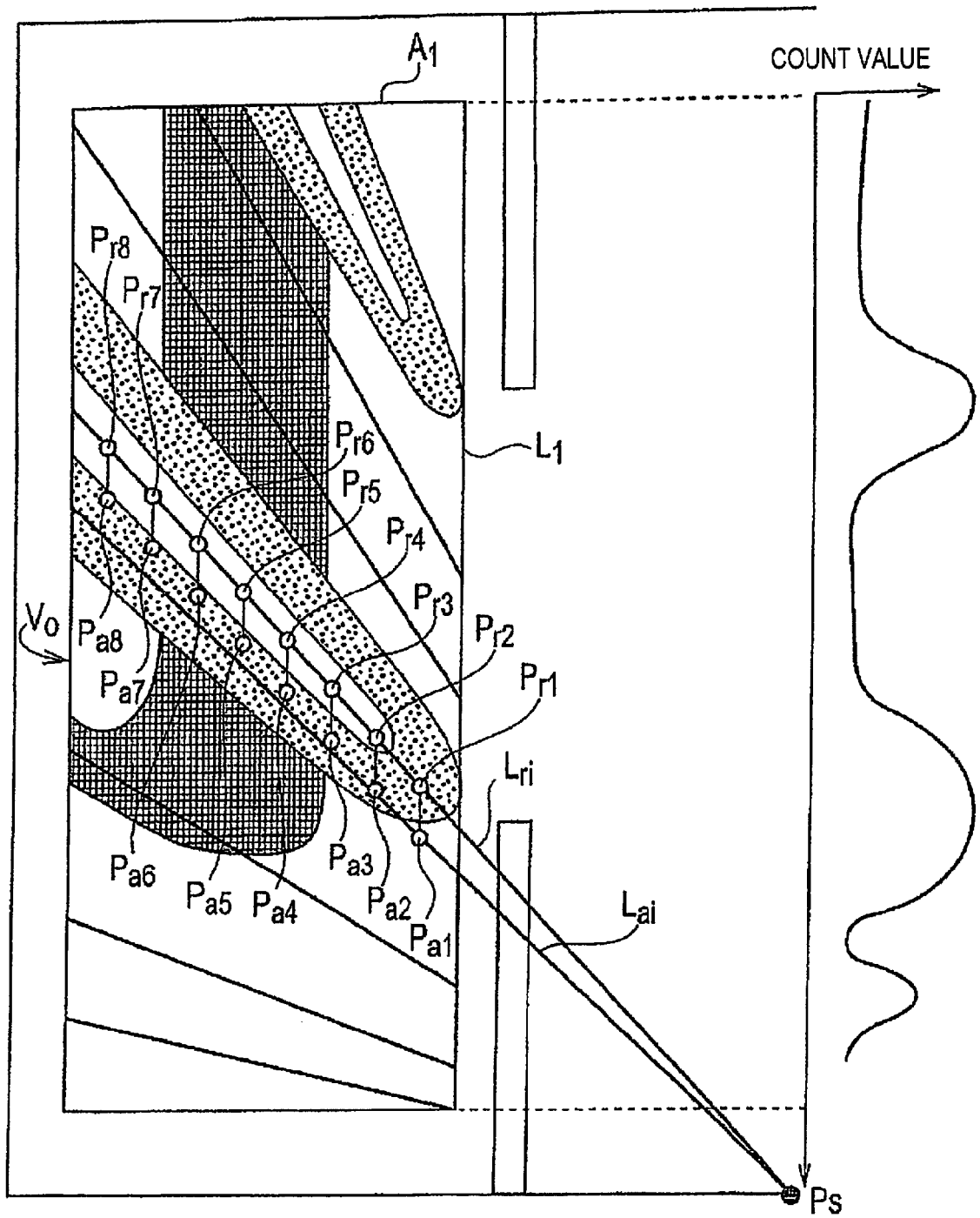
FIG. 31 is a view illustrating the edge distribution calculation processing, count processing, periodic-stationary object-candidate detection processing, and periodic-stationary object determination processing.

The stationary object assessment unit 38 sets a plurality of first perpendicular imaginary lines Kai (hereinbelow referred to as focus lines Lai) equivalent to line segments extending in perpendicular directions from a point on a ground line L1 in real space and passing through the detection area A1, as illustrated in FIG. 31. No limit in particular is imposed on the number of focus lines Lai. In the following explanation, it is assumed that n focus lines Lai (i=1 to n) are set.

The stationary object assessment unit 38 sets a plurality of second perpendicular imaginary lines Lri (hereinbelow referred to as reference lines Lri) corresponding respectively to the plurality of focus lines Lai, equivalent to line segments extending in perpendicular directions from the ground line Li in real space, and passing through the detection area A1. Each reference line Lri is set at a position distant by a predetermined distance (e.g. 10 cm) from the corresponding focus line Lai in real space. A line equivalent to a line segment extending in a perpendicular direction in real space is a line that spreads out in a radial direction from the position Ps of the camera 10 in a bird's eye view image.

The stationary object assessment unit 38 sets a plurality of focus points Paj on each focus line Lai. In the example illustrated in FIG. 31, focus points Pa1-Pa8 are set, but no limit in particular is imposed on the number of focus points Paj. In the following explanation, it is assumed that k focus points Paj (j=1 to k) are set.

The stationary object assessment unit 38 sets a plurality of reference points Prj corresponding to each of the focus points Paj on each of the reference lines Lri. The mutually corresponding focus points Paj and reference points Prj are set at substantially the same height in real space. It is not necessary that the focus points Paj and reference points Prj be at exactly the same height, and a certain amount of error that allows for the focus point Paj and the reference point Prj to be deemed to be at the same height is allowed.

The stationary object assessment unit 38 continuously determines luminance differences between mutually corresponding focus points Paj and reference points Prj along each focus line Lai. In the example illustrated in FIG. 31, the luminance difference between the first focus point Pa1 and the first reference point Pr1 is calculated, and the luminance difference between the second focus point Pa2 and the second reference point Pr2 is calculated. Similarly, the luminance differences are determined successively for the third through eighth focus points Pa3-Pa8 and the third through eighth reference points Pr3-Pr8.

When the luminance difference between a focus point Paj and reference point Prj is equal to or greater than a predetermined value, the stationary object assessment unit 38 assesses that an edge element is present between the focus point Paj and the reference point Prj. The stationary object assessment unit 38 counts the number of equivalent edge elements present along the focus line Lai. The stationary object assessment unit 38 stores the counted number of edge elements as an attribute of each focus line Lai. The stationary object assessment unit 38 executes the edge element detection and counting processes for all focus lines Lai. The lengths of portions of focus lines Lai overlapping with the detection area A1 are taken to be difference according to the positions of the focus lines Lai. The number of counted edge elements may be normalized by dividing by the lengths of overlapping portions of the corresponding focus lines Lai.

In the example illustrated in FIG. 31, another vehicle V0 is included in the detection area A1. It is assumed that a focus line Lai is set in the rubber portion of a tire of the other vehicle V0, and that a reference line Lri is set on the wheel of the tire at a distance corresponding to 10 cm therefrom. At this time the first focus point Pa1 and the first reference point Pr1 are positioned on the same tire portion, and therefore the luminance difference therebetween is small. However, the second to eighth focus points Pa2-Pa8 are positioned on the rubber portion of the tire, and the second to eighth reference points Pr2-Pr8 are positioned on the wheel portion of the tire, so that the luminance differences therebetween are large. When the luminance differences between the second to eighth focus points Pa2-Pa8 and the second to eighth reference points Pr2-Pr8 are equal to or greater than predetermined values, the stationary object assessment unit 38 detects the presence of an edge element between the second to eighth focus points Pa2-Pa8 and the second to eighth reference points Pr2-Pr8. The second to eighth focus points Pa2-Pa8 are seven points present along the focus line Lai, and therefore an edge element is detected seven times, and the count value for the edge element is "7."

The stationary object assessment unit 38 graphs the count values of edge elements obtained for the focus lines Lai, and obtains a waveform of the edge distribution (waveform data). Specifically, the stationary object assessment unit 38 plots the count values of edge elements in a plane with the edge element count value as the vertical axis and the position on the ground line L1 in real space of the focus line Lai as the horizontal axis. When the focus lines La1-Lan are set at equal intervals on the ground line L1 in real space, a waveform of the edge distribution can be obtained by lining up the count values of edge elements obtained for each focus line Lai in the order of the focus lines Lai-Lan. In the example illustrated in FIG. 31, the edge element count value is "7" at the position where the focus line Lai set on the rubber portion of the tire of the other vehicle V0 intersects the ground line L1 in the bird's-eye view image.

Thus, the stationary object assessment unit 38 totals the number of edge elements present along the perpendicular imaginary line for each of the plurality of perpendicular imaginary lines extending in perpendicular directions in real space. An edge distribution waveform (waveform data) is obtained based on the totaled number of edge elements.

The stationary object assessment unit 38 detects peaks of the edge distribution waveform. A peak is a point on the edge distribution waveform at which the count value of edge elements changes from increasing to decreasing. The stationary object assessment unit 38 detects peaks in an edge distribution waveform by, e.g., performing noise elimination processing using a low-pass filter, moving-average filter, or the like. Here a method may be used in which only peaks having values equal to or greater than a predetermined threshold value are detected as peaks. The predetermined threshold value can, e.g., be set to 60% of the maximum value of the edge distribution waveform.

The stationary object assessment unit 38 counts the number of peaks lined up at constant intervals among the detected peaks. Specifically, the distances between detected peaks are calculated, peaks for which the calculated peak-to-peak distance is within a predetermined range are extracted, and the number thereof is counted.

The stationary object assessment unit 38 assesses whether objects corresponding to counted peaks are equivalent to periodic stationary object candidates based on whether the number of counted peaks (peak information) is greater than or equal to a predetermined threshold value Th2. Specifically, when the counted number of peaks is equal to or greater than the predetermined threshold value Th2, the stationary object assessment unit 38 assesses the objects corresponding to the counted peaks to be periodic stationary object candidates. The threshold value Th2 is a value decided according to the type of periodic stationary object for detection, such as pylons, guard rail leg parts, utility poles, and the like, and can be determined through experiments or the like. Specifically, the threshold value Th2 is, e.g., set to a value of 3 or greater and 100 or less.

When periodic stationary object candidates are detected continuously for a predetermined length of time, the stationary object assessment unit 38 assesses the periodic stationary object candidates as periodic stationary objects. Specifically, when a state in which the number of peaks is equal to or greater than the predetermined threshold value Th2 is detected continuously for a predetermined length of time, it is determined that there is a strong possibility that the detected periodic stationary object candidates are periodic stationary objects. The stationary object assessment unit 38 assesses objects corresponding to the counted peaks to be periodic stationary objects. In the present example, the number of peaks counted in an edge distribution waveform is a mode of a periodicity evaluation value, and the threshold value Th2 is a mode of a periodicity evaluation threshold value. The threshold value Th2 includes a threshold value as the above-described second periodicity evaluation value set from the perspective of differentiating guard rails and other structures Q2, and a threshold value as the first periodicity evaluation threshold value set from the perspective of differentiating other vehicles VX. A "predetermined length of time" is a value decided according to the type of periodic stationary objects that are objects for detection, and can be determined through experiments or the like. Fixed values may be used, or the value may change according to the image capture interval of the camera 10 and the travel speed of the host vehicle V. Specifically, the "predetermined length of time" is, e.g., set to 0.1 to 5 seconds.

Figure 32:
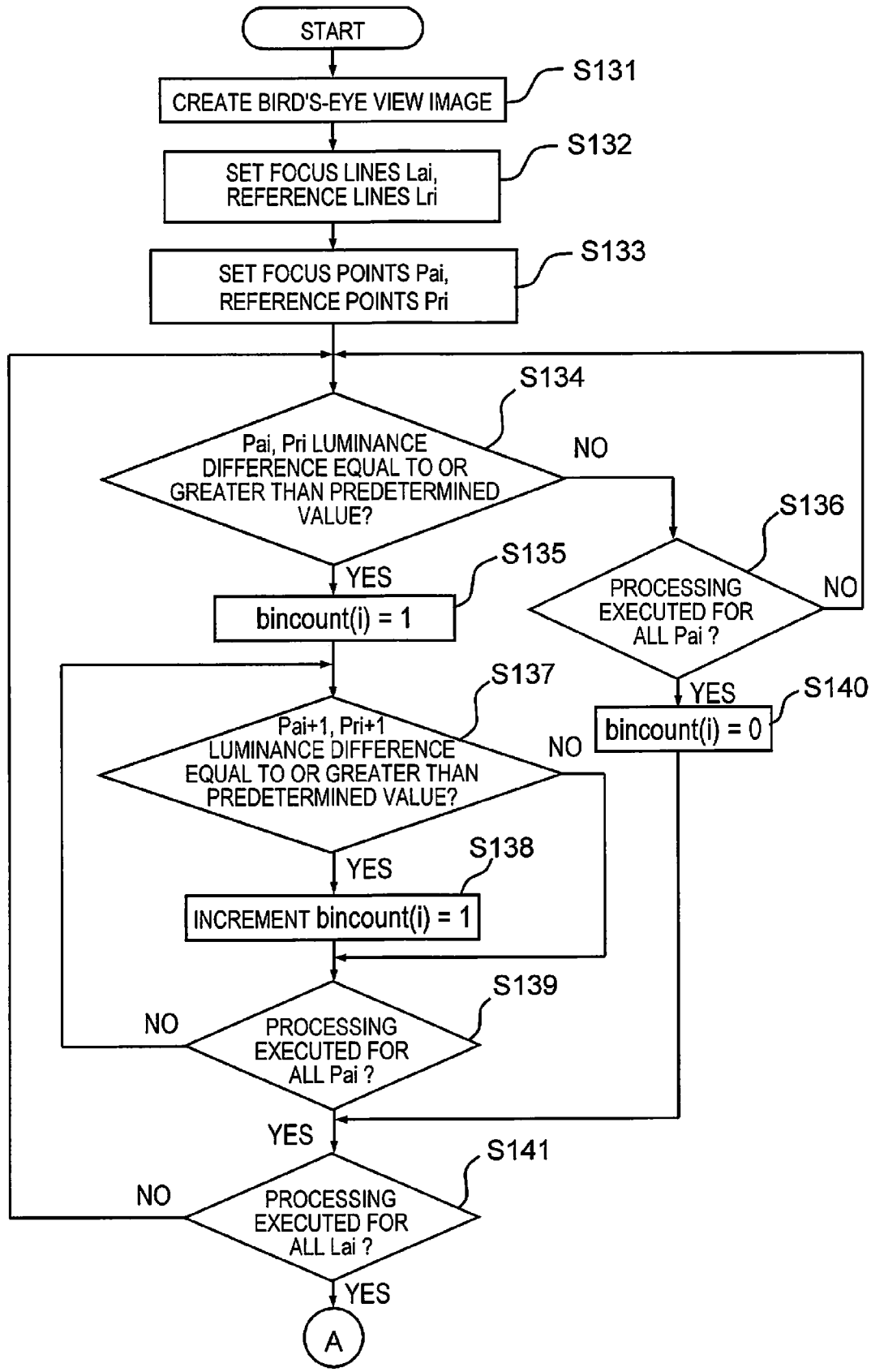
FIG. 32 is a first part of a flowchart illustrating an operation procedure in periodic-stationary object determination processing.
Figure 33:
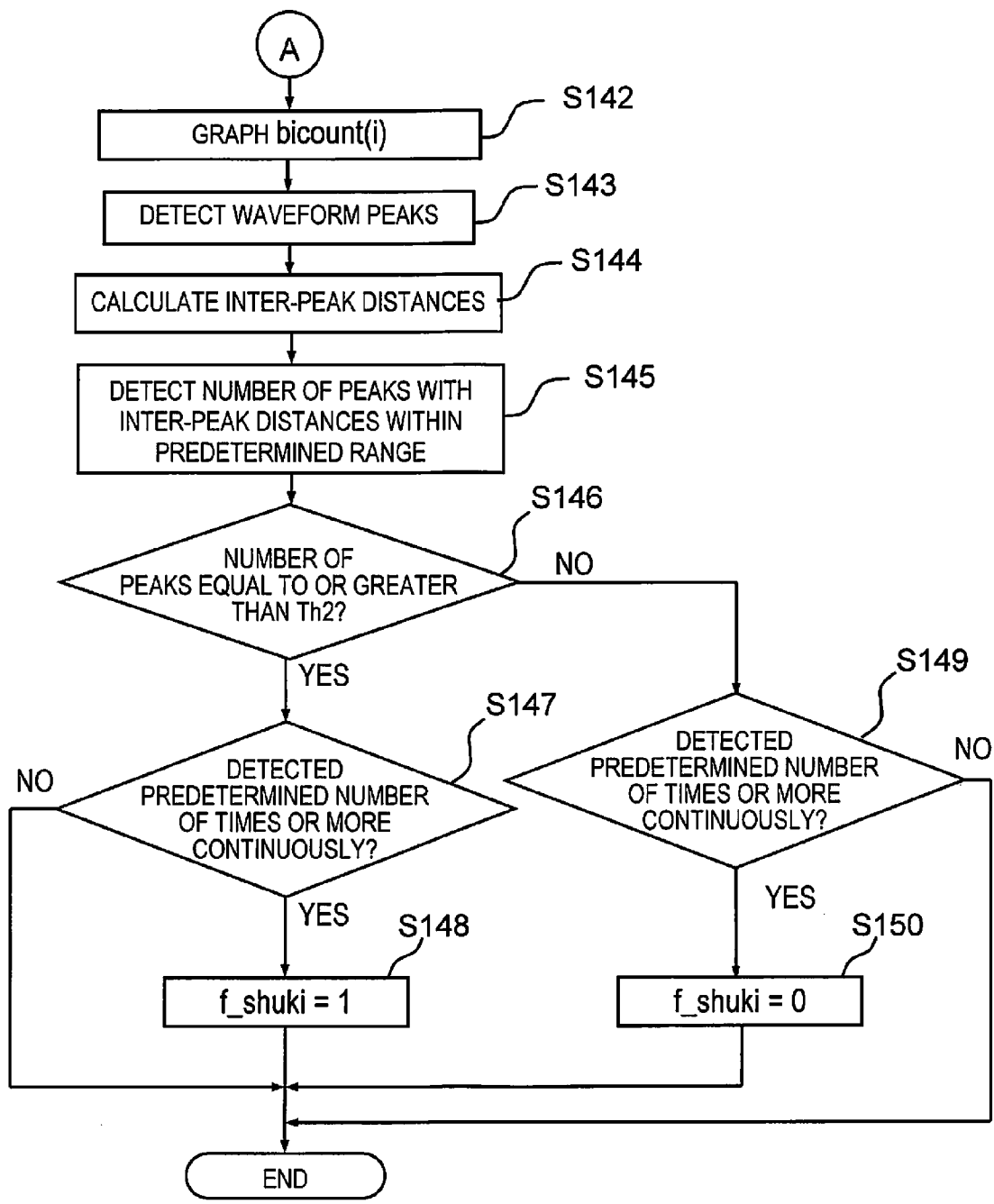
FIG. 33 is a second part of a flowchart illustrating an operation procedure in periodic-stationary object determination processing.

FIGS. 32 and 33 are flowcharts of processing to detect periodic stationary objects. In FIGS. 32 and 33, for convenience the processing for detection area A1 is described, but similar processing can be performed for detection area A2 as well.

As illustrated in FIG. 32, viewpoint conversion processing is performed in step S131 based on the resulting image capture data, and bird's-eye view image data is created. Next, in step S132, n focus lines Lai are set in the detection area A1, and n reference lines Lri corresponding respectively to the n focus lines Lai are set (i=1 to n). The stationary object assessment unit 38 sets the focus lines Lai extending in perpendicular directions from points on the ground line L1 in real space, and sets the reference lines Lri equivalent to line segments extending in perpendicular directions from points on the ground line L1 in real space, and removed by a predetermined distance from the corresponding focus lines Lai in real space.

In step S133, the stationary object assessment unit 38 sets k focus points Paj on each of the focus lines Lai, and sets k reference points Prj corresponding respectively to the focus points Paj (j=1 to k). The mutually corresponding focus points Paj and reference points Prj are set so as to be at substantially the same height in real space.

In step S134, the stationary object assessment unit 38 assesses whether the luminance difference between a mutually corresponding focus point Paj and reference point is equal to or greater than a predetermined value. When the luminance difference is assessed to be equal to or greater than the predetermined value, it is determined that an edge element is present between the focus point Paj for determination and the reference point Prj, and in step S135 "1" is substituted for the count value (bincount(i)) of the ith focus line Lai. In step S134, when the luminance difference has been assessed as less than the predetermined value, it is determined that an edge element is not present between the focus point Paj for determination and the reference point Prj, and processing proceeds to step S136.

In step S136, the stationary object assessment unit 38 assesses whether the processing of step S134 has been executed for all the focus points Paj on the focus line Lai that is currently being processed. When the assessment is that the processing of step S134 has not been executed for all the focus points Paj, processing returns to step S134, the luminance difference for the next focus point Paj+1 and reference point Prj+1 is determined, and whether the luminance difference is equal to or greater than the predetermined value is assessed. Thus, the stationary object assessment unit 38 successively and continuously determines luminance differences between focus points Paj and reference points Prj along a focus line Lai, and when the determined luminance values are equal to or greater than a predetermined value, determines that an edge element is present.

After the stationary object assessment unit 38 substitutes "1" for the count value (bincount(i)) of the first focus line Lai in step S135, processing proceeds to step S137, the luminance difference between the next focus point Paj+1 and reference point Prj+1 is determined, and whether the luminance difference is equal to or greater than the predetermined value is assessed. When the luminance value is assessed as being equal to or greater than the predetermined value, the stationary object assessment unit 38 determines that an edge element is present between the focus point Paj+1 for determination and the reference point Prj+1, and in step S138, increments the count value (bincount(i)) for the ith focus line Lai.

In step S137, when the luminance value has been assessed as less than the predetermined value, the stationary object assessment unit 38 determines that an edge element is not present between the focus point Paj+1 for determination and the reference point Pjr+1, and so skips step S138 and proceeds to the processing of step S139.

In step S139, the stationary object assessment unit 38 assesses whether the processing of step S134 or of step S137 has been executed for all the focus points Paj on the focus line Lai currently being processed. When the assessment is that the processing has not been executed for all the focus points Paj, processing returns to step S137, the luminance difference for the next focus point Paj+1 and reference point Prj+1 is determined, and whether the luminance difference is equal to or greater than the predetermined value is assessed. In step S139, when the assessment is that the processing has been executed for all the focus points Paj, processing proceeds to step S141. The stationary object assessment unit 38 counts the number of edge elements present along the focus line Lai, and stores the counted number of edge elements as the attribute (bincount(i)) for the focus line Lai.

In step S136, when the assessment is that the processing of step S134 has been executed for all the focus points Paj, the stationary object assessment unit 38 determines that an edge element is not present on the focus line Lai of current processing. In step S140, the stationary object assessment unit 38 substitutes "0" for bincount(i), and processing proceeds to step S141. In step S141, when the above-described processing has been executed for all n focus lines Lai, processing proceeds to step S142, and when the above-described processing has not been executed, the processing of step S134 and later is performed.

In step S142, the stationary object assessment unit 38 graphs the count values bincount(i) (i=1 to n) of the edge elements obtained for each of the n focus lines Lai, and obtains an edge distribution waveform. Specifically, edge element count values are plotted on a plane with the count value as the vertical axis and the position on the ground line L1 of the focus line Lai in real space as the horizontal axis. Next, in step S143, the edge distribution waveform peaks are detected. In step S144, distances between the detected peaks are calculated. In step S145, peaks for which the calculated peak-to-peak distance is within a predetermined range are extracted, and the number thereof is counted. The stationary object assessment unit 38 may also cause the edge line detection unit 36 and three-dimensional object detection unit 37 to perform the edge detection processing, and acquire the processing results.

In step S146, the stationary object assessment unit 38 assesses whether the number of counted peaks is equal to or greater than the predetermined threshold value Th2. When the assessment is that the number of peaks is equal to or greater than the predetermined threshold value Th2, the stationary object assessment unit 38 assesses the objects corresponding to the peaks to be periodic stationary object candidates, and processing proceeds to step S147.

In step S147, the stationary object assessment unit 38 determines whether the state in which the number of peaks is equal to or greater than the predetermined threshold value Th2 has been detected continuously for a predetermined number of times or more. When it is determined that the state in which the number of peaks is equal to or greater than the predetermined threshold Th2 has been detected continuously for the predetermined number of times or more, the stationary object assessment unit 38 determines that the objects corresponding to the counted peaks are periodic stationary objects, and in step S148 substitutes "1" for the flag f_shuki. However, when in step S147 it is determined that the state in which the number of peaks is equal to or greater than the predetermined threshold Th2 has not been detected continuously for the predetermined number of times or more, the stationary object assessment unit 38 skips step S148 and maintains the value of the flag f_shuki.

In step S147, when the number of peaks has been assessed as less than the predetermined threshold value Th2, processing proceeds to step S149, and in step S149 the stationary object assessment unit 38 determines whether the state in which the number of peaks is less than the predetermined threshold value Th2 has been detected continuously for a predetermined number of times or more. In the present example, the number of detections of the state in which the number of peaks is less than the predetermined threshold value Th2 is a mode of the periodicity evaluation value, and the predetermined number of times can be taken to be a mode of the periodicity evaluation threshold value. The predetermined number of times can include a number of times as the above-described second periodicity evaluation threshold value set from the perspective of differentiating guard rails or other structures Q2, and a threshold value as the first periodicity evaluation threshold value set from the perspective of differentiating other vehicles VX. The above-described threshold value Th2 and predetermined number of times can both be set as periodicity evaluation threshold values. When it is determined that the state in which the number of peaks is less than the predetermined threshold value Th2 has been detected continuously for the predetermined number of times or more, the stationary object assessment unit 38 determines that the object corresponding to the counted peaks is not a periodic stationary object, and in step S150 substitutes "0" for the flag f_shuki. However, in step S149, when the state in which the number of peaks is less than the predetermined threshold value Th2 has not been detected continuously for the predetermined number of times or more, the stationary object assessment unit 38 skips step S150 and maintains the value of the flag f_shuki.

According to the three-dimensional object detection device 1 and the three-dimensional object detection method of the present embodiment, edges (feature points) of a plurality of three-dimensional objects are extracted from image data of a predetermined area of a bird's-eye view image, an edge distribution waveform (waveform data) corresponding to the edge distribution in the predetermined area is calculated, and based on whether the number of peaks of the edge distribution waveform (peak information) is greater than or equal to a predetermined threshold value, a determination is made as to whether the plurality of three-dimensional objects are periodic stationary object candidates. Accordingly, similarly to the first embodiment, periodicity (the repeating nature) of periodic stationary objects can be clearly extracted as peak information of waveform data, and periodic stationary object candidates can be more easily extracted from the three-dimensional objects included in the captured image. As a result, periodic stationary objects can be extracted more precisely.

The number of edge elements present along a perpendicular imaginary line is totaled for each of a plurality of perpendicular imaginary lines extending in perpendicular directions in real space, and an edge distribution waveform is obtained based on the totaled number of edge elements. When the number of peaks in the edge distribution waveform is equal to or greater than the predetermined threshold value Th2, the plurality of three-dimensional objects are assessed as periodic stationary object candidates. Accordingly, even when no assessment is made as to whether a plurality of detected three-dimensional objects is stationary objects or moving objects, detection is performed reliably and periodic stationary object candidates having a stronger possibility of being periodic stationary objects can be more easily detected when edges extending in perpendicular directions are lined up with high density.

An example of a method for determining irregularity based on edge information is described next.

From bird's-eye view image data for the detection areas A1, A2 that has been viewpoint-converted by the viewpoint conversion unit 331, the stationary object assessment unit 38 detects irregular edge points that do not satisfy a predetermined condition for artificial three-dimensional objects and that are lined up irregularly. Here, the predetermined condition for artificial three-dimensional objects is the lining-up of edge points with a predetermined density or higher in substantially a straight line in the bird's-eye view image data for the detection areas A1, A2. In processing to determine irregularity, the stationary object assessment unit 38 can cause the edge line detection unit 36 and three-dimensional object detection unit 37 to execute edge information processing, and can acquire the processing results.

Figure 34:
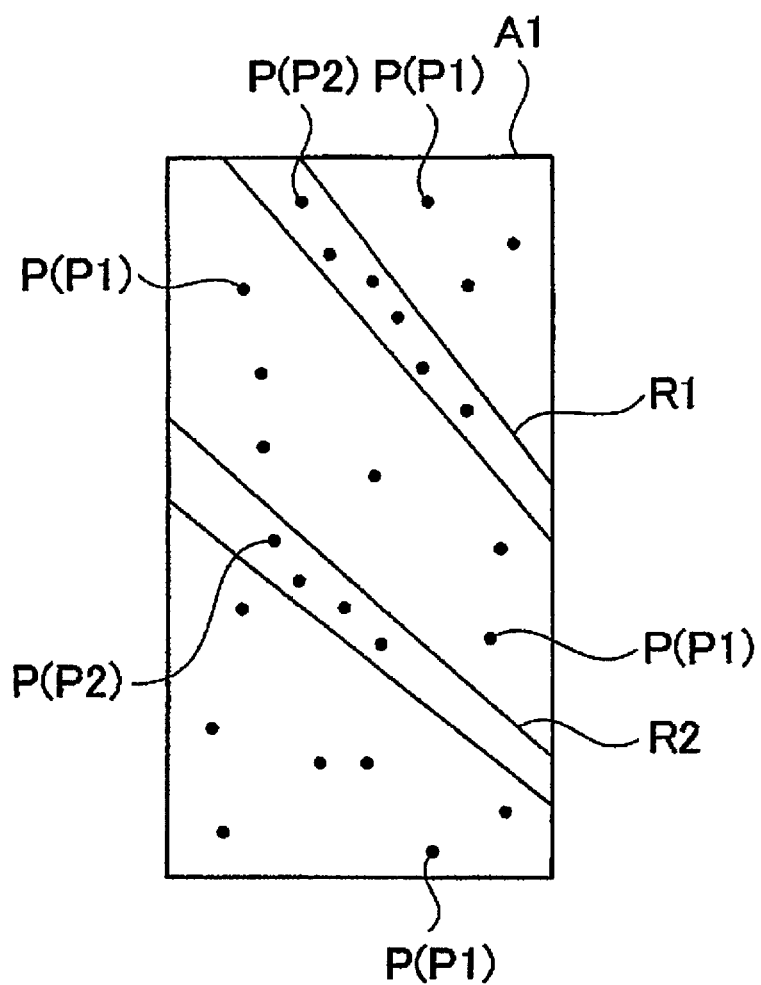
FIG. 34 is a diagram illustrating edge points in bird's-eye view image data for a detection area.

FIG. 34 is a diagram illustrating edge points in bird's-eye view image data for detection area A1. As illustrated in FIG. 34, a plurality of edge points P are present in the bird's-eye view image data for the detection area A1, of which the edge points P positioned within the areas R1, R2 are lined up with the predetermined density or higher in substantially a straight line, and the predetermined condition for an artificial three-dimensional object is satisfied. However, the edge points P positioned outside the areas R1, R2 are not lined up with the predetermined density or higher in substantially a straight line, and do not satisfy the predetermined condition for an artificial three-dimensional object. Among the plurality of edge points P, the stationary object assessment unit 38 detects the edge points P positioned outside the areas R1, R2 as irregular edge points P1.

The stationary object assessment unit 38 detects edge points P from the bird's-eye view image data for the detection areas A1, A2. The edge point detection processing detects edge points P by, e.g., applying a Laplacian filter to the bird's-eye view image data and performing binarization processing.

Among the detected edge points P, the stationary object assessment unit 38 detects regular edge points P2 satisfying the predetermined condition for artificial three-dimensional objects and lined up regularly. In the bird's-eye view image data for the detection areas A1, A2, the stationary object assessment unit 38 detects regular edge points P2, with the condition that edge points P are lined up in a radial direction from the camera 10 with a predetermined density or higher. As an example, the stationary object assessment unit 38 defines a straight line extending in radial directions from the camera 10, and decides an area accommodating a predetermined number of pixels (e.g., 10 pixels) from the straight line. The stationary object assessment unit 38 determines that the edge points P in the area are lined up substantially in a straight line, and determines whether the pixels are lined up with the predetermined density or higher by determining whether edge points P in the area are positioned within a predetermined distance from each other (predetermined pixels).

When edge points P and regular edge points P2 are detected, the stationary object assessment unit 38 detects the number of irregular edge points P1 as the number obtained by subtracting the number of regular edge points P2 from the number of detected edge points P. The stationary object assessment unit 38 determines whether at least one among grass, and snow including patches of mud or dirt, is present in the detection areas A1, A2. When making the determination, the stationary object assessment unit 38 references the number of detected irregular edge points P1.

Figure 35:
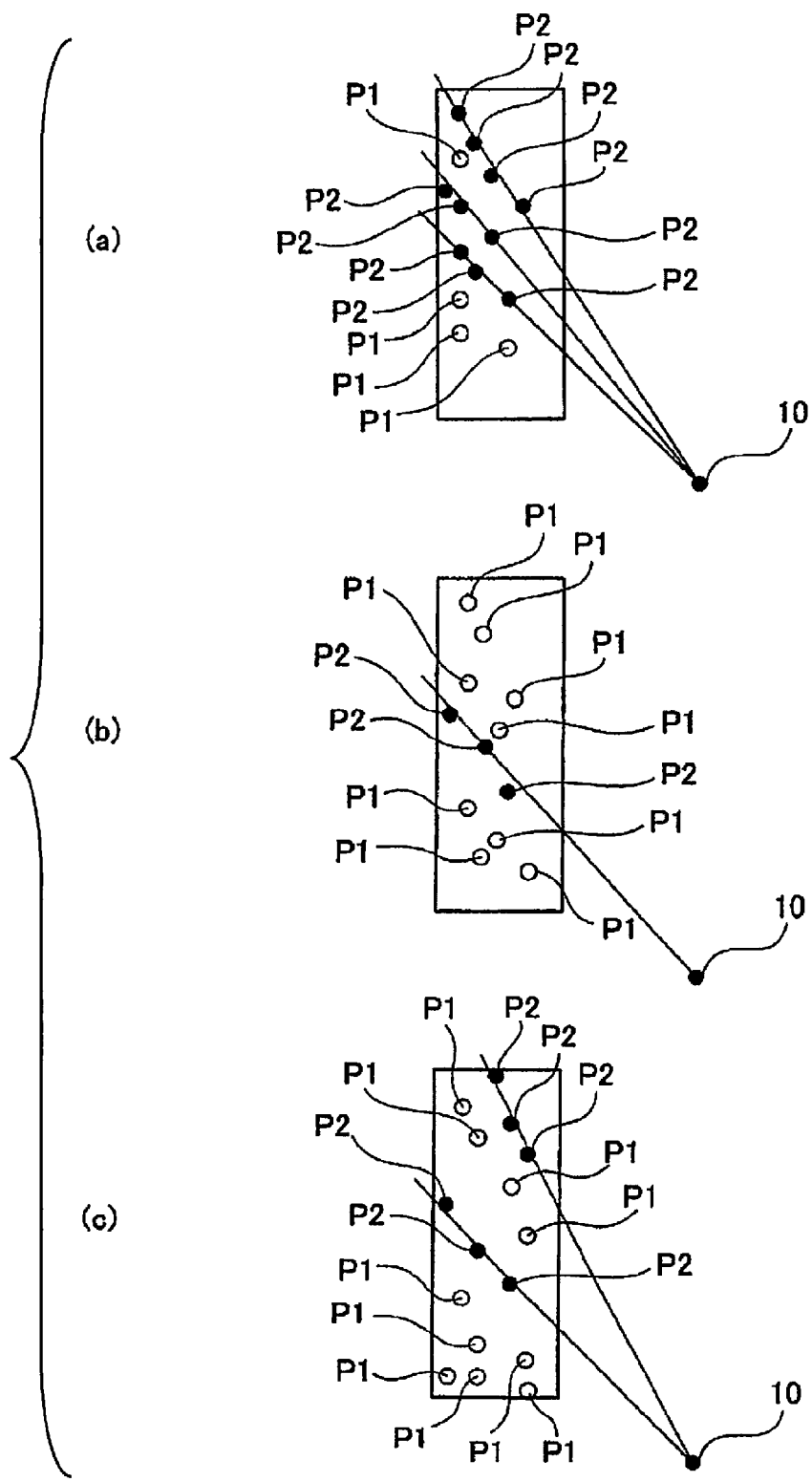
FIG. 35 is a diagram illustrating edge points in bird's-eye view image data, with part (a) illustrating edge points of a vehicle (tire portion), part (b) illustrating edge points of grass, and part (c) illustrating edge points of snow.

FIG. 35 is a diagram illustrating edge points P in bird's-eye view image data of the detection area A1, in which part (a) of FIG. 35 illustrates edge points P of a vehicle (tire portion), part (b) of FIG. 35 illustrates edge points P of grass, and part (c) of FIG. 35 illustrates edge points P of snow. The vehicle (tire) is an artificial object. Accordingly, the edge points P tend to line up regularly. Accordingly, as illustrated in part (a) of FIG. 35, for a vehicle there is a tendency for the number of irregular edge points P1 to be small and the number of regular edge points P2 to be large. However, because grass and snow are not artificial objects, as illustrated in part (b) of FIG. 35 and part (c) of FIG. 35, there are few edge points P lined up with high density in substantially a straight line (that is, regular edge points P2), and there are many irregular edge points P1. The stationary object assessment unit 38 can determine grass and snow by comparing the number of irregular edge points P1 with a predetermined threshold value. The value of irregular edge points P1 is a mode of an irregularity evaluation value, and the predetermined threshold value for comparison is a mode of an irregularity evaluation threshold value. The predetermined threshold value includes at least a threshold value set from the perspective of differentiating tree shadows Q1 and grass/snow Q3 as the irregularity evaluation threshold value described above.

It is desirable that the stationary object assessment unit 38 detect grass and snow based on the ratio of the number of irregular edge points P1 to the number of edge points P or to the number of regular edge points P2. The number of edge points P may be affected by and change due to the light environment at the time of image capture. Accordingly, the stationary object assessment unit 38 can more accurately determine the presence of grass and snow with less influence from the light environment by comparing the above-described ratio with a predetermined threshold value than by simply comparing the number of irregular edge points P1 with a predetermined threshold value. Here, the ratio of the number of irregular edge points P1 to the number of edge points P or to the number of regular edge points P2 is a mode of an irregularity evaluation value, and the predetermined threshold value relating to the compared ratio is a mode of an irregularity evaluation threshold value. The predetermined threshold value includes at least a threshold value set from the perspective of differentiating tree shadows Q1 and grass/snow Q3 as the irregularity evaluation threshold value described above.

Figure 36:
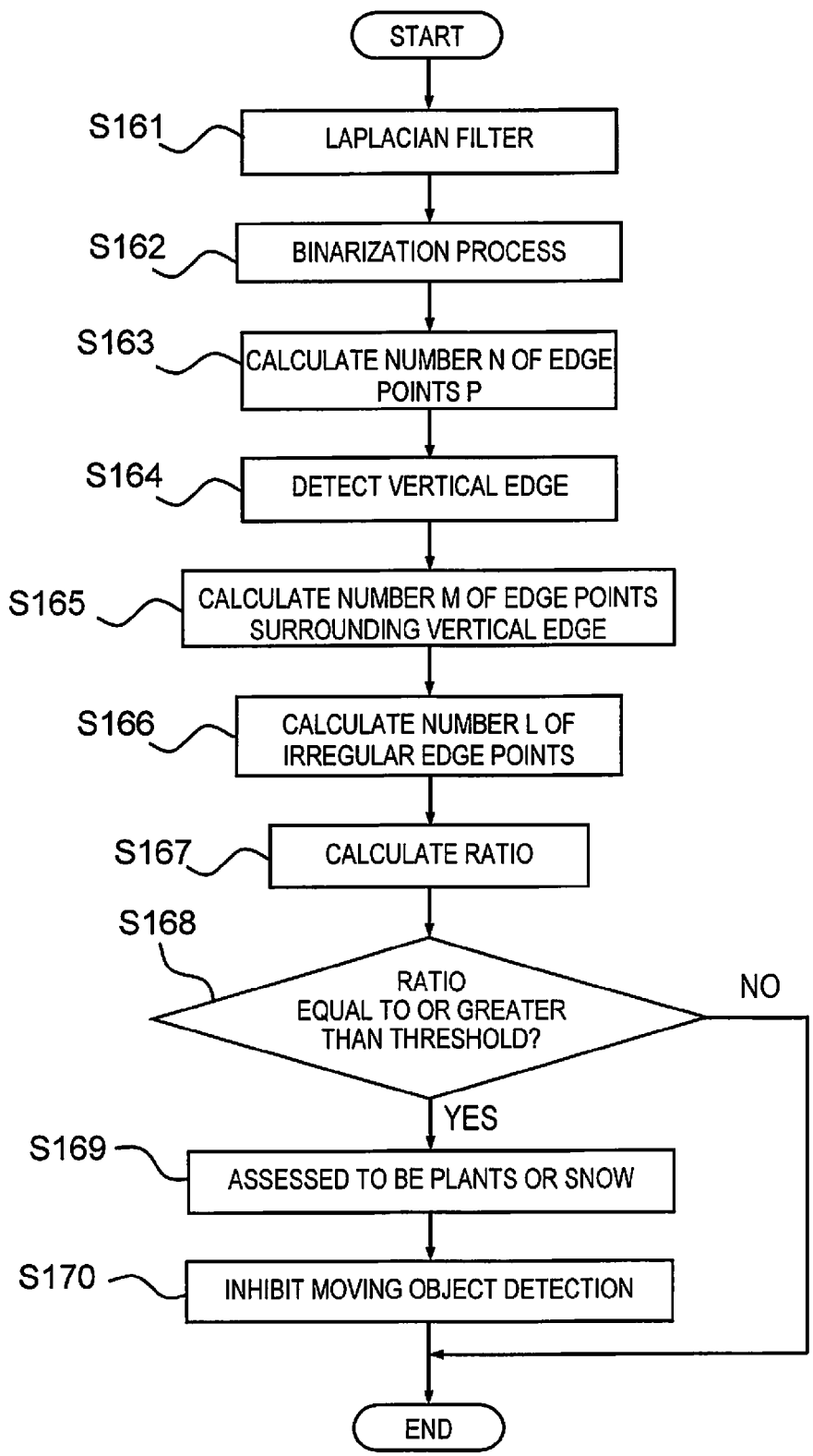
FIG. 36 is a flowchart illustrating irregularity evaluation processing.

The method for evaluating irregularity of the present embodiment, and more specifically, the method for detecting highly irregular grass and snow, is described next. FIG. 36 is a flowchart illustrating the method for detecting snow and grass of the present embodiment. As illustrated in FIG. 36, first the stationary object assessment unit 38 applies a Laplacian filter to bird's-eye view image data obtained by viewpoint conversion (S161). As a result, pixel values of pixels corresponding to edge points P become larger, and the pixel values of other pixels become smaller.

The stationary object assessment unit 38 then performs binarization processing of the image to which the Laplacian filter was applied (S162), and edge points P are made distinct. The stationary object assessment unit 38 then counts the number of edge points P (S163). In the processing of steps S164 and S165, the stationary object assessment unit 38 detects regular edge points P2 under the condition for an artificial three-dimensional object that edge points P are lined up with a predetermined density or higher in a radial direction from the camera 10, and the number M of the regular edge points P2 is counted. That is, the stationary object assessment unit 38 first detects perpendicular edges (S164), and then counts the number M of edge points P near perpendicular edges (e.g., within 10 pixels from a perpendicular edge) (S165).

The stationary object assessment unit 38 then calculates the number L of irregular edge points P by subtracting the number M of regular edge points P2 calculated in step S165 from the number N of edge points counted and calculated in step S163 (S166). The stationary object assessment unit 38 calculates a ratio (S167). Here, the stationary object assessment unit 38 calculates the ratio of the number L of irregular edge points P1 to the number N of edge points P or the number M of regular edge points P2 from the formula L/N or L/M. When L/N or L/M is included, the ratio may be obtained by adding or subtracting, or multiplying or dividing another number.

The stationary object assessment unit 38 then determines whether the ratio calculated in step S167 is equal to or greater than a predetermined threshold value (S168). When it is determined that the ratio is equal to or greater than the predetermined threshold value (S168: YES), the number of irregular edge points P1 is large, and so there is a strong possibility that grass or snow is present in the detection areas A1, A2. Accordingly, the stationary object assessment unit 38 determines that grass or snow is present in the detection areas A1, A2 (S169). The control unit 39 transmits a control command for suppressing the detection or determination of a three-dimensional object to the three-dimensional object detection unit 37 or three-dimensional object assessment unit 34 (S170). As a result, the three-dimensional object detection unit 37 or three-dimensional object assessment unit 34 differentiates the presence of a figure originating in grass or snow in the detection areas A1, A2, and can be made not to erroneously detect grass or snow as another vehicle VX.

However, when it is determined that the ratio is not equal to or greater than the predetermined value (S168: NO), the stationary object assessment unit 38 determines that a figure of grass or snow is not present in the detection areas A1, A2.

According to the method for detecting grass/snow based on irregularity determination of the present embodiment, irregular edge points P lined up irregularly that do not satisfy the predetermined condition for artificial three-dimensional objects are detected, and whether grass or snow is present is determined based on the number of irregular edge points P1. Here, when an artificial object such as a vehicle enters the detection areas A1, A2, because the object is artificial, there is a tendency for edge points P to be lined up regularly. However, in the case of grass and snow, the object is not artificial, and therefore edge points P are not lined up regularly. Accordingly, the former and the latter can be discriminated from the number L of irregular edge points P1. Therefore, the precision of determination of grass and snow can be improved.

Edge points P are detected from image data in the detection areas A1, A2, and regular edge points P2 satisfying the predetermined condition for artificial three-dimensional objects and lined up regularly are detected, and the latter are subtracted from the former. Accordingly, upon ascertaining all the edge points P, the irregular edge points P1 lined up irregularly can be detected by subtracting the regular edge points P2.

Based on the ratio of the number L of irregular edge points P1 to the number N of edge points P or to the number M of regular edge points P2, whether at least one among grass and snow is present in the detection areas A1, A2 can be determined. Accordingly, even in cases in which a larger or smaller number of edge points P are detected due to differences in the light environment, the number N of edge points P or the number M of regular edge points P2 and the number L of irregular edge points P1 are similarly detected in greater or in fewer numbers. Accordingly, the ratio itself is not readily affected by the light environment. Therefore, grass and snow can be detected without being easily affected by changes in the light environment.

Regular edge points P1 are extracted in a state in which image data of the detection areas A1, A2 is in a bird's-eye view, and with the condition that edge points are lined up in substantially a straight line with a density equal to or greater than a predetermined density. Accordingly, regular edge points P1 can easily be detected for straight-line components such as artificial objects and the like, and regular edge points P1 cannot be easily detected for grass and snow. Accordingly, grass and snow can be more accurately detected.

In the state of a bird's-eye view of the image data of the detection areas A1, A2, regular edge points P2 are detected with the condition that edge points P are lined up in radial directions from the camera 10 with a predetermined density or higher. Accordingly, it is possible to obtain edge points in perpendicular directions of three-dimensional objects that are vehicles by detecting components extending in perpendicular directions in real space as regular edge points P2, and the difference between vehicles and grass or snow can therefore be made clear.

The above-described edge irregularity can be ascertained as features of differential image information in the present invention. That is, when generating differential image information, a frequency distribution is obtained by counting the number of pixels indicating a predetermined difference in the differential image along a direction of collapse of a three-dimensional object when viewpoint conversion into a bird's-eye view image is performed, pixels indicating the predetermined difference in the differential image are handled as edges in the irregularity processing, and irregularity can be determined by applying the above-described method based on the frequency distribution of the pixels.

The three-dimensional object detection device 1 of the present embodiment of the present invention, configured and operating as described above, exhibits the following advantageous results.

(1) In accordance with the three-dimensional object detection device 1 of the present embodiment, periodicity evaluation values for evaluating periodicity and irregularity evaluation values for evaluating irregularity are calculated based on differential waveform information or edge information of a captured image, and when periodicity evaluation values are within a predetermined value range and irregularity evaluation values are equal to or greater than a predetermined threshold value, the inclusion in the image information of the shadows of trees having periodicity and irregularity can be differentiated. Therefore, erroneous detection of the shadows of trees present along the road traveled by the vehicle as another vehicle traveling in an adjacent lane adjacent to the lane of travel of the host vehicle can be prevented. As a result, a three-dimensional object detection device that detects another vehicle VX traveling in an adjacent lane adjacent to the lane of travel of the host vehicle can be provided.

Similar advantageous results are exhibited for processing based on differential waveform information and for processing based on edge information.

(2) In accordance with the three-dimensional object detection device 1 of the present embodiment, when the periodicity evaluation value is equal to or greater than the first periodicity evaluation threshold value and less than the second periodicity evaluation threshold value, and the irregularity evaluation value is equal to or greater than the irregularity evaluation threshold value, the three-dimensional object detected by the three-dimensional object detection unit 33 can be determined to be grass or snow Q3 present along the road traveled by the host vehicle V. Grass/snow Q2 and tree shadows Q1 all have irregularity, and differentiation is not easy, but after narrowing-down to tree shadows Q1 and grass/snow Q2 based on the periodicity evaluation value, it is possible to accurately differentiate tree shadows Q1 from grass/snow Q2 by then differentiating tree shadows Q1 or grass/snow Q2 based on the irregularity evaluation value as in the present embodiment.

(3) In accordance with the three-dimensional object detection device 1 of the present embodiment, when the periodicity evaluation value is equal to or greater than the second periodicity evaluation threshold value that has been set, the detected three-dimensional object can be determined to be a guard rail or other structure Q2. The periodicity of guard rails or other structures Q2 and the periodicity of tree shadows Q3 can be differentiated comparatively clearly, and therefore by setting the second periodicity evaluation threshold value based on the periodicity of guard rails and other structures Q2, tree shadows Q3 and grass/snow Q2 can be accurately differentiated from guard rails and other structures Q2. As a result, tree shadows Q1 can be accurately differentiated.

(4) In accordance with the three-dimensional object detection device 1 of the present embodiment, when the periodicity evaluation value is less than the first periodicity evaluation threshold value, the detected three-dimensional object can be determined to be a moving body such as another vehicle VX. Although the periodicity of another vehicle VX and the periodicity of grass/snow Q2 are both low, a difference enabling differentiation can be found, and therefore by setting the first periodicity evaluation threshold value based on the periodicity of other vehicles VX, tree shadows Q3 and grass/snow Q2 can be accurately differentiated from other vehicles VX. As a result, tree shadows Q1 can be accurately differentiated.

(5) In accordance with the three-dimensional object detection device 1 of the present embodiment, under dark conditions in which object periodicity is difficult to detect, the first periodicity evaluation threshold value, which is a lower-limit threshold value to determine grass/snow Q3 and tree shadows Q1, is changed to a high value, and therefore it becomes easier to determine that a three-dimensional object is another vehicle VX. As a result, even under dark conditions, tree shadows Q1 can be accurately determined without failing to detect other vehicles VX. Under dark conditions, the periodicity of other vehicles VX is also difficult to detect, and therefore it is preferable from the perspective of securing safety that determination of three-dimensional objects as other vehicles VX be made easier.

(6) In accordance with the three-dimensional object detection device 1 of the present embodiment, when the current position belongs to an urban area, the first periodicity evaluation threshold value, which is a lower-limit threshold value to determine grass/snow Q3 and tree shadows Q1, is changed to a low value, and therefore the periodicity of tree shadows Q1 can be accurately determined even in urban zones where numerous billboard towers, signs, and other structures are present and there is a tendency for the periodicity of tree shadows Q1 or grass/snow Q3 included in the detection areas A1, A2 of the road to be low.

(7) When a three-dimensional object detected in the previous processing was determined to be shadows of trees present along the road traveled by the host vehicle V, it is possible to adjust the detection sensitivity by changing the first threshold value $\alpha$ to be higher such that other vehicles VX traveling adjacent to the lane of travel of the host vehicle V are more difficult to detect. Therefore, the erroneous detection of the figure of tree shadows Q1 as another vehicle VX traveling in an adjacent lane can be prevented.

(8) When a three-dimensional object detected in the previous processing was determined to be shadows of trees present along the road traveled by the host vehicle V, it is possible to adjust the detection sensitivity by lowering output values when generating differential waveform information such that other vehicles VX traveling adjacent to the lane of travel of the host vehicle V are more difficult to detect. Therefore, the erroneous detection of the figure of tree shadows Q1 as another vehicle VX traveling in an adjacent lane can be prevented.

(9) When a three-dimensional object detected in the previous processing was determined to be shadows of trees present along the road traveled by the host vehicle V, it is possible to adjust the detection sensitivity by changing determination threshold values to be higher when generating edge information such that other vehicles VX traveling adjacent to the lane of travel of the host vehicle V are more difficult to detect. Therefore, the erroneous detection of the figure of tree shadows Q1 as another vehicle VX traveling in an adjacent lane can be prevented.

(10) When a three-dimensional object detected in the previous processing was determined to be shadows of trees present along the road traveled by the host vehicle V, it is possible to adjust the detection sensitivity by lowering output values when generating edge information such that other vehicles VX traveling adjacent to the lane of travel of the host vehicle V are more difficult to detect. Therefore, the erroneous detection of the figure of tree shadows Q1 as another vehicle VX traveling in an adjacent lane can be prevented.

(11) Similar actions and similar advantageous results can be obtained from the method of detection of three-dimensional objects of the present embodiment. Similar actions and similar advantageous results are exhibited whether for processing based on differential waveform information, or for processing based on edge information.

The camera 10 corresponds to the image-capturing means of the present invention, the viewpoint conversion unit 31 corresponds to the image conversion means of the present invention, the positional alignment unit 32 and three-dimensional object detection unit 33 correspond to the three-dimensional object detection means of the present invention, the luminance difference calculation unit 35, edge line detection unit 36 and three-dimensional object detection unit 37 correspond to the three-dimensional object detection means of the present invention, the three-dimensional object assessment unit 34 corresponds to the three-dimensional object assessment means, the stationary object assessment unit 38 corresponds to the stationary object assessment means, the control unit 39 corresponds to the control means, the vehicle speed sensor 20 corresponds to the vehicle speed sensor, the brightness sensor 50 corresponds to the brightness detection means, and the current position detection device 60 corresponds to the current position detection means.

The invention claimed is:

1. A three-dimensional object detection device comprising:
   an image-capturing unit arranged to capture images rearward of a host vehicle, which is equipped with the three-dimensional object detection device;
   an image conversion unit programmed to convert images obtained by the image-capturing unit into bird's-eye view images;
   a three-dimensional object detection unit programmed to detect a presence of a three-dimensional object within a detection area of the bird's-eye view images, which is set on at least one of a right rearward side and a left rearward side of the host vehicle, based on differential waveform information that is obtained by aligning the bird's-eye view images obtained at different times by the image conversion unit, and generating the differential waveform information by creating a frequency distribution from frequency-distributed values obtained by counting a number of pixels along a direction of collapse of the three-dimensional object that indicate a predetermined difference in a differential image of the bird's-eye view images that were positionally aligned to detect the presence of the three-dimensional object within the detection area;

a stationary object assessment unit programmed to calculate a periodicity evaluation value for evaluating a periodicity of the differential waveform information based on the differential waveform information, to calculate an irregularity evaluation value for evaluating the irregularity of the differential waveform information based on the differential waveform information, and to assess that the three-dimensional object detected by the three-dimensional object detection unit is a shadow of a tree present along a road traveled by the host vehicle when the periodicity evaluation value is equal to or greater than a first periodicity evaluation threshold value and less than a second periodicity evaluation threshold value and the irregularity evaluation value is less than a predetermined irregularity evaluation threshold value;

a three-dimensional object assessment unit programmed to assess whether the three-dimensional object detected by the three-dimensional object detection unit is another vehicle present in the detection area; and a control unit programmed to suppress determination by the three-dimensional object assessment unit of the detected three-dimensional object as another vehicle when the detected three-dimensional object was determined by the stationary object assessment unit as a shadow of a tree present along the road traveled by the host vehicle.

2. A three-dimensional object detection device comprising:

an image-capturing unit arranged to capture images rearward of a host vehicle, which is equipped with the three-dimensional object detection device;

an image conversion unit programmed to convert an image obtained by the image-capturing unit into a bird's-eye view image;

a three-dimensional object detection unit programmed to detect a presence of a three-dimensional object within a detection area of the bird's-eye view image, which is set on at least one of a right rearward side and a left rearward side of the host vehicle, based on edge information having a luminance difference between mutually adjacent image areas equal to or greater than a predetermined threshold value along a direction in which a three-dimensional object collapses when viewpoint conversion to the bird's-eye view image is performed;

a stationary object assessment unit programmed to calculate a periodicity evaluation value for evaluating the periodicity of the edge information based on the edge information, to calculate an irregularity evaluation value for evaluating the irregularity of the edge information based on the edge information, and to assess that the three-dimensional object detected by the three-dimensional object detection unit is a shadow of a tree present along a road traveled by the host vehicle when the periodicity evaluation value is equal to or greater than a first periodicity evaluation value and less than a second periodicity evaluation value and the irregularity evaluation value is less than a predetermined irregularity evaluation threshold value;

a three-dimensional object assessment unit programmed to assess whether the three-dimensional object detected by the three-dimensional object detection unit is another vehicle present in the detection area; and a control unit programmed to suppress determination by the three-dimensional object assessment unit of the detected three-dimensional object as another vehicle when the detected three-dimensional object was determined by the stationary object assessment unit as a shadow of a tree present along the road traveled by the host vehicle.

3. The three-dimensional object detection device according to claim 1, wherein the stationary object assessment unit is further programmed to assess that the three-dimensional object detected by the three-dimensional object detection unit is a moving body when the periodicity evaluation value is less than the first periodicity evaluation threshold value.

4. The three-dimensional object detection device according to claim 1, further comprising a brightness detection unit configured to detect brightness of the surroundings of the host vehicle, the stationary object assessment unit is further programmed to change the first periodicity evaluation threshold value to a high value when the brightness detected by the brightness detection unit is less than a predetermined value.

5. The three-dimensional object detection device according to claim 1, further comprising a present-position detection unit configured to detect a current position of the host vehicle, the stationary object assessment unit is further programmed to reference map information to assess whether the current position is an urban area or a suburban area, and the stationary object assessment unit is further programmed to change the first periodicity evaluation threshold value to a low value when the current position detected by the current position detection unit is included in an urban area.

6. The three-dimensional object detection device according to claim 1, wherein when the detected three-dimensional object was determined by the stationary object assessment unit to be a shadow of a tree present along the road traveled by the host vehicle, the control unit generates and outputs a control command to the three-dimensional object assessment unit that either stop determination processing of the three-dimensional object or causes a determination that the detected three-dimensional object is not another vehicle.

7. The three-dimensional object detection device according to claim 3, wherein the three-dimensional object detection unit detects the three-dimensional object based on the differential waveform information and a first threshold value $\alpha$; and when the detected three-dimensional object was determined by the stationary object assessment unit to be a shadow of a tree present along the road traveled by the host vehicle, the control unit outputs to the three-dimensional object detection unit a control command for changing the first threshold value $\alpha$ to a higher value such that the three-dimensional object becomes more difficult to detect.

8. The three-dimensional object detection device according to claim 7, wherein
when the detected three-dimensional object was determined by the stationary object assessment unit to be a shadow of a tree present along the road traveled by the host vehicle, the control unit generates a control command for lowering the frequency-distributed values obtained by counting the number of pixels indicating a predetermined difference in a differential image of the bird's-eye view images and outputs the control command to the three-dimensional object detection unit.

9. The three-dimensional object detection device according to claim 1, wherein
the stationary object assessment unit determines that the three-dimensional object detected by the three-dimensional object detection unit is a moving body when the calculated periodicity evaluation value is less than the first periodicity evaluation threshold value and the calculated irregularity evaluation value is less than the predetermined irregularity evaluation threshold value; and
the control unit causes the three-dimensional object assessment unit to determine that the three-dimensional object is another vehicle when the detected three-dimensional object was determined to be a moving body by the stationary object assessment unit.

10. The three-dimensional object detection device according to claim 2, wherein
the stationary object assessment unit is further programmed to assess that the three-dimensional object detected by the three-dimensional object detection unit is a moving body when the periodicity evaluation value is less than the first periodicity evaluation threshold value.

11. The three-dimensional object detection device according to claim 2, further comprising
a brightness detection unit configured to detect brightness of the surroundings of the host vehicle, the stationary object assessment unit is further programmed to change the first periodicity evaluation threshold value to a high value when the brightness detected by the brightness detection unit is less than a predetermined value.

12. The three-dimensional object detection device according to claim 2, wherein
when the detected three-dimensional object was determined by the stationary object assessment unit to be a shadow of a tree present along the road traveled by the host vehicle, the control unit generates and outputs a control command to the three-dimensional object assessment unit that either stop determination processing of the three-dimensional object or causes a determination that the detected three-dimensional object is not another vehicle.

13. The three-dimensional object detection device according to claim 10, wherein
the three-dimensional object detection unit detects the three-dimensional object based on the edge information and a second threshold value β; and
when the detected three-dimensional object was determined by the stationary object assessment unit to be a shadow of a tree present along the road traveled by the host vehicle, the control unit outputs to the three-dimensional object detection unit a control command for changing the second threshold value β to a higher value such that the three-dimensional object is more difficult to detect.

14. The three-dimensional object detection device according to claim 13, wherein
the control unit outputs to the three-dimensional object detection unit a control command for outputting a lower value for the edge information when the three-dimensional object was determined by the stationary object assessment unit to be a shadow of a tree present along the road traveled by the host vehicle.

15. A three-dimensional object detection method comprising:
performing viewpoint conversion of images of a rearward area of a host vehicle into bird's-eye view images in which the images were captured by a camera mounted on the host vehicle;
positionally aligning the bird's-eye view images at obtained different times;
generating differential waveform information by creating a frequency distribution from frequency-distributed values obtained by counting a number of pixels along a direction of collapse of a three-dimensional object that indicate mediating a predetermined difference in a differential image of the bird's-eye view images;
detecting a three-dimensional object present in a detection area set on at least one of a right rearward side and a left rearward side of the host vehicle based on the differential waveform information;
determining whether the three-dimensional object is another vehicle present in the detection area;
calculating a periodicity evaluation value for evaluating a periodicity of the differential waveform information based on the differential waveform information;
calculating an irregularity evaluation value for evaluating AN irregularity of the differential waveform information based on the differential waveform information;
determining that the three-dimensional object detected is a shadow of a tree present along a road traveled by the host vehicle when the periodicity evaluation value is equal to or greater than a first periodicity evaluation threshold value and less than a second periodicity evaluation threshold value and the irregularity evaluation value is less than a predetermined irregularity evaluation threshold value; and
suppressing determination of the three-dimensional object that was detected as another vehicle when the three-dimensional object was determined as a shadow of a tree present along the road traveled by the host vehicle.

16. A three-dimensional object detection method comprising:
performing viewpoint conversion of an image of a rearward area of a host vehicle into a bird's-eye view image in which the image was captured by a camera mounted on the host vehicle;
detecting a presence of a three-dimensional object within a detection area of the bird's-eye view image, which is set on at least one of a right rearward side and a left rearward side of the host vehicle, based on edge information having a luminance difference between mutually adjacent image areas equal to or greater than a predetermined threshold value along a direction in which a three-dimensional object collapses when viewpoint conversion to the bird's-eye view image is performed;
calculating a periodicity evaluation value for evaluating a periodicity of the edge information based on the edge information;
calculating an irregularity evaluation value for evaluating an irregularity of the edge information based on the edge information;
determining that the three-dimensional object detected is a shadow of a tree present along a road traveled by the host vehicle when the periodicity evaluation value is equal to or greater than a first periodicity evaluation value and less than a second periodicity evaluation value and the irregularity evaluation value is less than a predetermined irregularity evaluation threshold value; and, suppressing determination of the three-dimensional object that was detected as another vehicle when the three-dimensional object was determined as a shadow of a tree present along the road traveled by the host vehicle.

* * * * *